United States Patent
Soule et al.

(10) Patent No.: US 12,462,279 B2
(45) Date of Patent: Nov. 4, 2025

(54) METHODS AND SYSTEMS FOR PERSONALIZING A PROSPECTIVE VISITOR EXPERIENCE AT A NON-PROFIT VENUE

(71) Applicant: Olive Seed Industries, LLC, Woodinville, WA (US)

(72) Inventors: Christine Soule, Woodinville, WA (US); Charles H. Cella, Pembroke, MA (US); Richard Spitz, Woodinville, WA (US)

(73) Assignee: Olive Seed Industries, LLC, Woodinville, WA (US)

( * ) Notice: Subject to any disclaimer, the term of this patent is extended or adjusted under 35 U.S.C. 154(b) by 0 days.

(21) Appl. No.: 16/908,033

(22) Filed: Jun. 22, 2020

(65) Prior Publication Data

US 2020/0320579 A1     Oct. 8, 2020

Related U.S. Application Data

(63) Continuation of application No. 16/905,222, filed on Jun. 18, 2020, now abandoned, which is a
(Continued)

(51) Int. Cl.
*G06Q 30/0279* (2023.01)
*G01C 21/20* (2006.01)
(Continued)

(52) U.S. Cl.
CPC ....... *G06Q 30/0279* (2013.01); *G01C 21/206* (2013.01); *G06F 3/013* (2013.01);
(Continued)

(58) Field of Classification Search
CPC .. G06Q 30/0279; G06Q 10/047; G06Q 20/20; G06Q 30/0201; G06Q 30/0203;
(Continued)

(56) References Cited

U.S. PATENT DOCUMENTS 6,362,900 B1   3/2002  Squilla et al.
7,620,636 B2   11/2009 Fasciano
(Continued)

FOREIGN PATENT DOCUMENTS

CA    2887283 A1   4/2014
CA    3028646 A1   6/2019
(Continued)

OTHER PUBLICATIONS

M. Majd and R. Safabakhsh, "Impact of machine learning on improvement of user experience in museums," 2017 Artificial Intelligence and Signal Processing Conference (AISP), 2017, pp. 195-200, doi: 10.1109/AISP.2017.8324080.*
(Continued)

*Primary Examiner* — Allan J Woodworth, II
(74) *Attorney, Agent, or Firm* — RMCK Law Group, PLC

(57) ABSTRACT

A method for providing personalized non-profit venue visit recommendations to a visitor at a non-profit venue, comprising: providing a management interface for management of a set of multimedia assets; receiving a mapping of multimedia assets to a display in at least one site plan; receiving metadata for the set of multimedia assets; providing an interface for receiving data indicating personal interests of a visitor, including visitor-provided preference data and passively-collected visitor interaction data; receiving personal interest data for a plurality of non-profit venue visitors; receiving preference data relating to a prospective visitor; applying a machine learning system to analyze the metadata, the data indicating personal interests of the visitor, the personal interest data for the plurality of non-profit venue visitors, and the preference data relating to the prospective visitor; and generating a selection or sequence of
(Continued)

non-profit venue location recommendations for the prospective visitor.

20 Claims, 26 Drawing Sheets

Related U.S. Application Data continuation of application No. PCT/US2019/045220, filed on Aug. 6, 2019, application No. 16/908,033 is a continuation of application No. PCT/US2019/045220, filed on Aug. 6, 2019.

(60) Provisional application No. 62/715,018, filed on Aug. 6, 2018.

(51) Int. Cl.

| | |
|---|---|
| *G06F 3/01* | (2006.01) |
| *G06F 3/0482* | (2013.01) |
| *G06F 16/435* | (2019.01) |
| *G06F 16/438* | (2019.01) |
| *G06F 16/587* | (2019.01) |
| *G06F 16/953* | (2019.01) |
| *G06F 16/9535* | (2019.01) |
| *G06F 16/954* | (2019.01) |
| *G06N 20/00* | (2019.01) |
| *G06Q 10/047* | (2023.01) |
| *G06Q 20/20* | (2012.01) |
| *G06Q 30/02* | (2023.01) |
| *G06Q 30/0201* | (2023.01) |
| *G06Q 30/0203* | (2023.01) |
| *G06Q 30/0207* | (2023.01) |
| *G06Q 30/0214* | (2023.01) |
| *G06Q 30/0217* | (2023.01) |
| *G06Q 30/0251* | (2023.01) |
| *G06Q 30/0282* | (2023.01) |
| *G06Q 50/00* | (2024.01) |
| *G06T 5/77* | (2024.01) |
| *G06T 11/00* | (2006.01) |
| *G06T 11/60* | (2006.01) |
| *G06V 20/20* | (2022.01) |
| *G06V 20/52* | (2022.01) |
| *G06V 40/16* | (2022.01) |
| *H04L 9/40* | (2022.01) |
| *H04L 67/12* | (2022.01) |
| *H04L 67/50* | (2022.01) |
| *H04N 7/15* | (2006.01) |
| *H04N 21/2187* | (2011.01) |
| *H04W 4/021* | (2018.01) |
| *H04W 4/024* | (2018.01) |
| *H04W 4/029* | (2018.01) |
| *H04W 4/10* | (2009.01) |
| *H04W 4/12* | (2009.01) |
| *H04W 4/33* | (2018.01) |
| *H04W 4/80* | (2018.01) |
| *H04W 12/06* | (2021.01) |
| *H04W 12/08* | (2021.01) |
| *H04W 12/084* | (2021.01) |
| *G06K 7/14* | (2006.01) |
| *G06Q 50/26* | (2012.01) |
| *H04W 12/64* | (2021.01) |

(52) U.S. Cl.
CPC .......... *G06F 3/0482* (2013.01); *G06F 16/435* (2019.01); *G06F 16/438* (2019.01); *G06F 16/587* (2019.01); *G06F 16/953* (2019.01); *G06F 16/9535* (2019.01); *G06F 16/954* (2019.01); *G06N 20/00* (2019.01); *G06Q 10/047* (2013.01); *G06Q 20/20* (2013.01); *G06Q 30/0201* (2013.01); *G06Q 30/0203* (2013.01); *G06Q 30/0207* (2013.01); *G06Q 30/0214* (2013.01); *G06Q 30/0217* (2013.01); *G06Q 30/0224* (2013.01); *G06Q 30/0236* (2013.01); *G06Q 30/0261* (2013.01); *G06Q 30/0267* (2013.01); *G06Q 30/0271* (2013.01); *G06Q 30/0281* (2013.01); *G06Q 30/0282* (2013.01); *G06Q 50/01* (2013.01); *G06T 5/77* (2024.01); *G06T 11/00* (2013.01); *G06T 11/60* (2013.01); *G06V 20/20* (2022.01); *G06V 20/52* (2022.01); *G06V 40/16* (2022.01); *G06V 40/176* (2022.01); *H04L 63/0861* (2013.01); *H04L 67/12* (2013.01); *H04L 67/535* (2022.05); *H04N 7/15* (2013.01); *H04N 21/2187* (2013.01); *H04W 4/021* (2013.01); *H04W 4/024* (2018.02); *H04W 4/029* (2018.02); *H04W 4/10* (2013.01); *H04W 4/12* (2013.01); *H04W 4/33* (2018.02); *H04W 4/80* (2018.02); *H04W 12/068* (2021.01); *H04W 12/08* (2013.01); *H04W 12/084* (2021.01); *G06K 7/1417* (2013.01); *G06Q 50/26* (2013.01); *G06V 2201/10* (2022.01); *H04W 12/64* (2021.01)

(58) Field of Classification Search
CPC .......... G06Q 30/0207; G06Q 30/0214; G06Q 30/0217; G06Q 30/0224; G06Q 30/0236; G06Q 30/0261; G06Q 30/0267; G06Q 30/0271; G06Q 30/0282; G06Q 50/01; H04W 4/024; H04W 4/33; H04W 4/029; H04W 4/80; H04W 12/068; H04W 12/63; H04W 12/084; H04W 4/021; H04W 4/10; H04W 4/12; H04W 12/08; G06F 16/435; G06F 16/438; G06F 16/587; G06F 16/953; G06F 16/9535; G06F 16/954; G06F 3/013; G06F 3/0482; G06N 20/00; G01C 21/206; G06K 9/00221; G06K 9/00315; G06K 9/00671; G06K 9/00771; G06K 7/1417; G06K 2209/27; G06T 5/005; G06T 11/00; G06T 11/60; H04L 63/0861; H04L 67/12; H04L 67/22; H04N 7/15; H04N 21/2187
USPC .............................. 705/14.1–14.73
See application file for complete search history.

(56) References Cited

U.S. PATENT DOCUMENTS

| | | | |
|---|---|---|---|
| 7,656,312 | B2 | 2/2010 | Fellenstein et al. |
| 7,921,036 | B1 | 4/2011 | Sharma et al. |
| 8,473,421 | B2 | 6/2013 | Scalisi |
| 8,675,016 | B2 | 3/2014 | Vetterli et al. |
| 8,965,410 | B2 | 2/2015 | Clark et al. |
| 9,064,282 | B1* | 6/2015 | Carpenter ............... G06Q 30/08 |
| 9,131,028 | B2 | 9/2015 | Nguyen et al. |
| 9,271,133 | B2 | 2/2016 | Rodriguez |
| 9,418,115 | B2 | 8/2016 | Ganick et al. |
| 9,702,713 | B2 | 7/2017 | Jung et al. |
| 9,858,538 | B1* | 1/2018 | Johansson .......... G01C 21/3484 |
| 9,886,845 | B2 | 2/2018 | Rhoads et al. |
| 10,009,868 | B1 | 6/2018 | Reyes et al. |
| 10,026,102 | B2 | 7/2018 | Mihalik et al. |
| 10,360,566 | B2 | 7/2019 | Brown et al. |
| 10,382,373 | B1 | 8/2019 | Yang et al. |
| 10,433,106 | B2 | 10/2019 | Sahadi |
| 10,491,979 | B1* | 11/2019 | Stradley ................ G06F 1/1632 |

(56) References Cited

U.S. PATENT DOCUMENTS

| | | |
|---|---|---|
| 10,502,576 B2 | 12/2019 | Trigoni et al. |
| 10,623,366 B1 | 4/2020 | Liyanage et al. |
| 10,636,062 B1 | 4/2020 | Mossoba et al. |
| 10,636,066 B2 | 4/2020 | Proietti et al. |
| 10,636,207 B1 | 4/2020 | Swidersky et al. |
| 10,685,406 B1 | 6/2020 | Niderberg et al. |
| 10,769,542 B1 | 9/2020 | Dhalwani et al. |
| 10,810,595 B2 | 10/2020 | Gospodinov |
| 10,859,382 B1 | 12/2020 | Swidersky et al. |
| 10,991,015 B2 | 4/2021 | Soderstrom |
| 11,022,442 B1 | 6/2021 | Paskaris et al. |
| 11,151,481 B1 * | 10/2021 | Sun .................. G06V 40/161 |
| 2002/0174003 A1 | 11/2002 | Redmann et al. |
| 2003/0154114 A1 | 8/2003 | Lucarelli |
| 2004/0097242 A1 | 5/2004 | Hull et al. |
| 2005/0065809 A1 | 3/2005 | Henze |
| 2005/0192025 A1 | 9/2005 | Kaplan |
| 2006/0129312 A1 | 6/2006 | Chou et al. |
| 2008/0249723 A1 | 10/2008 | McAllister et al. |
| 2009/0141048 A1 | 6/2009 | Fujimoto et al. |
| 2009/0319306 A1 | 12/2009 | Chanick |
| 2010/0023250 A1 | 1/2010 | Mays et al. |
| 2010/0164990 A1 | 7/2010 | Doorn |
| 2010/0198626 A1 | 8/2010 | Cho et al. |
| 2010/0205176 A1 | 8/2010 | Ji et al. |
| 2010/0235245 A1 | 9/2010 | Grossman et al. |
| 2011/0105092 A1 | 5/2011 | Felt et al. |
| 2011/0133892 A1 | 6/2011 | Nohr |
| 2011/0295749 A1 | 12/2011 | Scalisi |
| 2011/0307478 A1 | 12/2011 | Pinckney et al. |
| 2012/0054302 A1 | 3/2012 | Priyadarshan et al. |
| 2012/0105644 A1 | 5/2012 | Purvis et al. |
| 2012/0109954 A1 * | 5/2012 | White ................. G06Q 40/02 |
| | | 707/737 |
| 2012/0176477 A1 | 7/2012 | Givon |
| 2012/0185512 A1 | 7/2012 | McCully et al. |
| 2012/0192235 A1 | 7/2012 | Tapley et al. |
| 2012/0278721 A1 | 11/2012 | Beidel |
| 2013/0085832 A1 | 4/2013 | Witherspoon, Jr. et al. |
| 2013/0111574 A1 | 5/2013 | Celante et al. |
| 2013/0137464 A1 | 5/2013 | Kramer et al. |
| 2013/0183924 A1 | 7/2013 | Saigh et al. |
| 2013/0232030 A1 | 9/2013 | Gockeler et al. |
| 2013/0257906 A1 | 10/2013 | Tang et al. |
| 2013/0273968 A1 | 10/2013 | Rhoads et al. |
| 2013/0275886 A1 | 10/2013 | Haswell et al. |
| 2013/0282421 A1 | 10/2013 | Graff et al. |
| 2013/0317944 A1 | 11/2013 | Huang et al. |
| 2013/0332509 A1 | 12/2013 | Schwartz et al. |
| 2014/0019867 A1 | 1/2014 | Lehtiniemi et al. |
| 2014/0052490 A1 | 2/2014 | Barr et al. |
| 2014/0129942 A1 | 5/2014 | Rathod |
| 2014/0152698 A1 | 6/2014 | Kim et al. |
| 2014/0162693 A1 | 6/2014 | Nachter et al. |
| 2014/0172476 A1 | 6/2014 | Goulart |
| 2014/0172553 A1 | 6/2014 | Goulart |
| 2014/0228055 A1 | 8/2014 | Karaoguz |
| 2014/0237076 A1 | 8/2014 | Goldman et al. |
| 2014/0247279 A1 | 9/2014 | Nicholas et al. |
| 2014/0278860 A1 | 9/2014 | Lee et al. |
| 2014/0278861 A1 | 9/2014 | Bush et al. |
| 2014/0279012 A1 * | 9/2014 | Scofield ............ G06Q 30/0261 |
| | | 705/14.58 |
| 2014/0279034 A1 | 9/2014 | Samuel |
| 2014/0280316 A1 | 9/2014 | Ganick et al. |
| 2014/0358437 A1 * | 12/2014 | Fletcher ............. G01C 21/3484 |
| | | 701/533 |
| 2014/0358632 A1 * | 12/2014 | Graff ..................... H04L 63/08 |
| | | 705/7.29 |
| 2014/0358664 A1 | 12/2014 | Wheeler |
| 2014/0365313 A1 | 12/2014 | Reese et al. |
| 2015/0006426 A1 | 1/2015 | Sobhani et al. |
| 2015/0018015 A1 | 1/2015 | Clark et al. |
| 2015/0036926 A1 | 2/2015 | Choi et al. |
| 2015/0040074 A1 | 2/2015 | Hofmann et al. |
| 2015/0085056 A1 * | 3/2015 | Van Broeck ........... G06F 3/013 |
| | | 348/14.1 |
| 2015/0134556 A1 | 5/2015 | Spinner et al. |
| 2015/0142688 A1 | 5/2015 | Jackson et al. |
| 2015/0154667 A1 | 6/2015 | Hicks et al. |
| 2015/0161684 A1 | 6/2015 | Raikula |
| 2015/0170042 A1 | 6/2015 | Perkowitz et al. |
| 2015/0174481 A1 | 6/2015 | Tobin |
| 2015/0177006 A1 | 6/2015 | Schulz et al. |
| 2015/0241238 A1 | 8/2015 | Bass et al. |
| 2015/0242899 A1 | 8/2015 | Farhi |
| 2015/0254579 A1 | 9/2015 | Ford |
| 2015/0254903 A1 | 9/2015 | Sumner et al. |
| 2015/0262200 A1 | 9/2015 | Fredette |
| 2015/0286873 A1 | 10/2015 | Davis et al. |
| 2015/0310507 A1 | 10/2015 | Woodward et al. |
| 2015/0317829 A1 | 11/2015 | Carter et al. |
| 2015/0341549 A1 | 11/2015 | Petrescu et al. |
| 2015/0358390 A1 | 12/2015 | Starr et al. |
| 2015/0365517 A1 | 12/2015 | Tam |
| 2016/0063488 A1 * | 3/2016 | Gary, Jr. ................. G06Q 20/22 |
| | | 705/39 |
| 2016/0063993 A1 | 3/2016 | Dolan et al. |
| 2016/0080907 A1 | 3/2016 | Saleem |
| 2016/0117651 A1 | 4/2016 | Davis |
| 2016/0140227 A1 | 5/2016 | Lymberopoulos et al. |
| 2016/0148270 A1 | 5/2016 | Vigier et al. |
| 2016/0170998 A1 | 6/2016 | Frank et al. |
| 2016/0180402 A1 | 6/2016 | Sabah et al. |
| 2016/0205358 A1 | 7/2016 | Dickinson |
| 2016/0212591 A1 | 7/2016 | Kim et al. |
| 2016/0242010 A1 | 8/2016 | Parulski et al. |
| 2016/0335666 A1 | 11/2016 | Dodor et al. |
| 2016/0345163 A1 | 11/2016 | Monaghan et al. |
| 2016/0358459 A1 | 12/2016 | Singhar et al. |
| 2016/0364012 A1 * | 12/2016 | Govezensky ........... G06F 3/017 |
| 2017/0068872 A1 | 3/2017 | Short et al. |
| 2017/0193124 A1 | 7/2017 | Wong |
| 2017/0193792 A1 | 7/2017 | Rodriguez et al. |
| 2017/0228804 A1 * | 8/2017 | Soni ..................... H04L 67/535 |
| 2017/0249651 A1 | 8/2017 | Pulitzer |
| 2017/0249712 A1 | 8/2017 | Branscomb et al. |
| 2017/0270560 A1 | 9/2017 | Duggal et al. |
| 2017/0270827 A1 | 9/2017 | Channabasappa ........ A43B 3/34 |
| 2017/0301001 A1 * | 10/2017 | Wilkinson .......... G06Q 30/0269 |
| 2017/0307382 A1 * | 10/2017 | Kim ..................... G01C 21/206 |
| 2017/0315767 A1 | 11/2017 | Rao |
| 2017/0337494 A1 | 11/2017 | Deluca et al. |
| 2017/0364951 A1 | 12/2017 | Richardson |
| 2018/0014149 A1 | 1/2018 | Krzych et al. |
| 2018/0069817 A1 | 3/2018 | Constantinides |
| 2018/0073889 A1 | 3/2018 | Vigilante et al. |
| 2018/0075461 A1 * | 3/2018 | Hirakawa .......... G06Q 30/0269 |
| 2018/0126271 A1 | 5/2018 | Katzir |
| 2018/0145941 A1 | 5/2018 | Jeon et al. |
| 2018/0154962 A1 * | 6/2018 | Ko ........................... G06F 3/011 |
| 2018/0165371 A1 | 6/2018 | Tatro |
| 2018/0176441 A1 | 6/2018 | Burgess |
| 2018/0189714 A1 | 7/2018 | Azpitarte et al. |
| 2018/0240151 A1 | 8/2018 | D'Andrea et al. |
| 2018/0240176 A1 * | 8/2018 | Cronin ............... G06Q 30/0631 |
| 2018/0253576 A1 | 9/2018 | Talbot |
| 2018/0288213 A1 | 10/2018 | Bjontegard |
| 2018/0322514 A1 | 11/2018 | Sargent et al. |
| 2018/0336575 A1 | 11/2018 | Hwang et al. |
| 2018/0349413 A1 | 12/2018 | Shelby et al. |
| 2018/0349700 A1 | 12/2018 | Percuoco et al. |
| 2018/0350144 A1 | 12/2018 | Rathod |
| 2018/0352373 A1 | 12/2018 | Sahadi |
| 2018/0352378 A1 | 12/2018 | Sahadi |
| 2019/0043281 A1 | 2/2019 | Aman |
| 2019/0043493 A1 | 2/2019 | Mohajer et al. |
| 2019/0069147 A1 | 2/2019 | Charlton et al. |
| 2019/0095454 A1 * | 3/2019 | Sahadi ................. G06F 16/9537 |
| 2019/0215660 A1 | 7/2019 | Slushtz et al. |
| 2019/0279096 A1 * | 9/2019 | de Nijs ................ G06F 16/951 |
| 2019/0301888 A1 | 10/2019 | Gürel et al. |
| 2019/0313020 A1 * | 10/2019 | Snyder ................... H04N 23/69 |
| 2019/0378176 A1 | 12/2019 | O'Brien |

(56) References Cited

U.S. PATENT DOCUMENTS

| | | | |
|---|---|---|---|
| 2019/0394617 A1* | 12/2019 | Scully | H04W 4/40 |
| 2020/0033882 A1* | 1/2020 | Zysk, Jr. | G05D 1/247 |
| 2020/0111034 A1 | 4/2020 | Sahadi | |
| 2020/0126125 A1 | 4/2020 | Sanjay et al. | |
| 2020/0272676 A1 | 8/2020 | Priness et al. | |
| 2020/0302510 A1 | 9/2020 | Chachek et al. | |
| 2020/0380267 A1 | 12/2020 | Lee | |
| 2021/0134033 A1* | 5/2021 | Anttila | G06F 3/167 |
| 2023/0177259 A1 | 6/2023 | Rathus et al. | |

FOREIGN PATENT DOCUMENTS

| | | |
|---|---|---|
| CN | 109313630 A | 2/2019 |
| JP | 3103070 B2 | 10/2000 |
| JP | 2005031733 A | 2/2005 |
| JP | 2005275960 A | 10/2005 |
| KR | 20050109919 A | 11/2005 |
| KR | 20180057088 A | 5/2018 |
| WO | 0021009 A1 | 4/2000 |
| WO | 0042593 A1 | 7/2000 |
| WO | 0135600 A3 | 5/2001 |
| WO | 2006055211 A2 | 5/2006 |
| WO | 2007081320 A1 | 7/2007 |
| WO | 2010102325 A1 | 9/2010 |
| WO | 2014117771 A1 | 8/2014 |
| WO | 2015148693 A1 | 10/2015 |
| WO | 2016043663 A1 | 3/2016 |
| WO | 2016081626 A1 | 5/2016 |
| WO | 2016135536 A1 | 9/2016 |
| WO | 2016164607 A1 | 10/2016 |
| WO | 2017019650 A1 | 2/2017 |
| WO | 2017184646 A1 | 10/2017 |
| WO | 2019245578 A1 | 12/2019 |

OTHER PUBLICATIONS

PCT International Search Report and Written Opinion for International Application No. PCT/US2019/045220 mailed Feb. 17, 2020, 25 pages.

Abstract from Yu, Z. et al., "Personalized Travel Package With Multi-Point-of-Interest Recommendation Based on Crowdsourced User Footprints (English)," IEEE Transactions on Human-Machine Systems, vol. 46, Issue 1, pp. 151-158, Feb. 1, 2016 (Year: 2016), 2 pages.

Extended European Search Report dated Apr. 7, 2022 for European Patent Application No. 19846136.0, 5 pages.

Gil, A. et al., "Personalized multimedia touristic services for hybrid broadcast mobile receivers (English)," IEEE Transactions on Consumer Electronics, vol. 56, Issue 1, Apr. 16, 2010, 3 pages.

Lu, J. et al., "Location-based Intelligent Services of Scenic Areas," IEEE, Apr. 2012, pp. 1882-1885.

Martin, J. et al., "SCALEX—A Personalized Multimedia Information System for Museums and Exhibitions," Proceedings of the First International Conference on Automated Production of Cross Media Content for Multi-Channel Distribution (AXMEDIS '05), IEEE, Nov.-Dec. 2005, 4 pages.

Rubino, I. et al., "MusA: Using Indoor Positioning and Navigation to Enhance Cultural Experiences in a Museum," Sensors, Dec. 2013, www.mdpi.com/journal/sensors, vol. 13, pp. 17445-17471.

Villarrubia, G. et al., "Hybrid Indoor Location System for Museum Tourist Routes in Augmented Reality," IEEE, Jul. 2014, 8 pages.

Wirz, M. et al., "Inferring crowd conditions from pedestrians' location traces for real-time crowd monitoring during city-scale mass gatherings," 2012 IEEE 21st International WETICE, Jun. 2012, pp. 367-372.

U.S. Appl. No. 16/907,852, filed Jun. 22, 2020, Soule.
U.S. Appl. No. 16/907,904, filed Jun. 22, 2020, Soule.
U.S. Appl. No. 16/908,070, filed Jun. 22, 2020, Soule.

Aliannejadi, M. et al., "Personalized Ranking for Context-Aware Venue Suggestion," http://arXiv.org/licenses/nonexclusive-distrib/1.0/, May 20, 2017, 3 pages.

Celikten, E. et al., "Extracting Patterns of Urban Activity from Geotagged Social Data (Abstract)," ip.com, Apr. 15, 2016, 2 pages.

U.S. Appl. No. 16/907,513, filed Jun. 22, 2020, Soule.
U.S. Appl. No. 16/905,222, filed Jun. 18, 2020, Soule.
U.S. Appl. No. 16/907,278, filed Jun. 21, 2020, Soule.
U.S. Appl. No. 16/907,586, filed Jun. 22, 2020, Soule.
U.S. Appl. No. 16/907,540, filed Jun. 22, 2020, Soule.
U.S. Appl. No. 16/907,662, filed Jun. 22, 2020, Soule.
U.S. Appl. No. 16/907,803, filed Jun. 22, 2020, Soule.
U.S. Appl. No. 16/907,977, filed Jun. 22, 2020, Soule.
U.S. Appl. No. 16/907,710, filed Jun. 22, 2020, Soule.
U.S. Appl. No. 16/907,946, filed Jun. 22, 2020, Soule.
U.S. Appl. No. 16/908,106, filed Jun. 22, 2020, Soule.
U.S. Appl. No. 16/908,000, filed Jun. 22, 2020, Soule.

Balduini, M. et al., "Recommending Venues Using Continuous Predictive Social Media Analytics," IEEE Internet Computing, vol. 18, Issue 5, Sep. 2014, pp. 28-35.

Chianese, A. et al., "SmARTweet: A Location-Based Smart Application for Exhibits and Museums," 2013 International Conference on Signal-Image Technology & Internet-Based Systems, 2013 IEEE, pp. 408-415.

Yu, Z. et al., Personalized Travel Package With Multi-Point-of-Interest Recommendation Based on Crowdsourced User Footprints, IEEE Transactions on Human-Machine Systems, Feb. 2016, vol. 46, Issue 1, pp. 151-158.

Aman, M.S. et al., "Sensing and classifying indoor environments: An Iot based portable tour guide system," 2017 IEEE Sensors Applications Symposium (SAS), Jan. 2017, pp. 1-6.

Ayala, I. et al., "iMuseumA: An Agent-Based Context-Aware Intelligent Museum System," Sensors, Nov. 2014, vol. 14, pp. 21213-21246, www.mdpi.com/journal/sensors.

Buvaneswari, N. et al., "Comprehensive Personalized Recommendation Technologies," 2016 Fifth International Conference on Recent Trends in Information Technology, IEEE, Apr. 2016, 5 pages.

De Almeida, P. et al., "Interactive character as a virtual tour guide to an online museum exhibition," International Conference on Computers in Education. 2002 Proceedings, Jan. 2002, vol. 1, 11 pages.

Ng, K.H. et al., "Treasure codes: augmenting learning from physical museum exhibits through treasure hunting," Personal and Ubiquitous Computing, Mar. 2018, vol. 22, pp. 739-750.

Osche, P. et al., "Walk the line: Toward an efficient user model for recommendations in museums," 11th International Workshop on Semantic and Social Media Adaptation and Personalization (SMAP 2016), Oct. 2016, pp. 83-88.

Skift Meetings Studio Team, "7 Top Tech Ways to Measure Traffic at Trade Shows," Jun. 2017, 11 pages.

Wirz, M. et al., "Probing crowd density through smartphones in city-scale mass gatherings," EPJ Data Science, 2013, https://epjdatascience.springeropen.com/counter/pdf/10.1140/epjds17.pdf, 24 pages.

* cited by examiner

METHODS AND SYSTEMS FOR PERSONALIZING A PROSPECTIVE VISITOR EXPERIENCE AT A NON-PROFIT VENUE

CROSS-REFERENCE TO RELATED APPLICATIONS

This application is: (i) a continuation of U.S. application Ser. No. 16/905,222 filed Jun. 18, 2020 and entitled METHODS AND SYSTEMS FOR PERSONALIZING VISITOR EXPERIENCE AT A NON-PROFIT VENUE USING MACHINE LEARNING TO GENERATE SELECTION OR SEQUENCE OF NON-PROFIT VENUE LOCATION RECOMMENDATIONS, and (ii) a bypass continuation of International Application No. PCT/US2019/045220 filed Aug. 6, 2019, published as WO 2020/033354 on Feb. 13, 2020, which claims priority to U.S. provisional application No. 62/715,018, filed on Aug. 6, 2018, each entitled METHODS AND SYSTEMS FOR PERSONALIZING GUEST EXPERIENCE AT A VENUE. Each of the above applications is hereby incorporated by reference as if fully set forth herein in its entirety.

TECHNICAL FIELD

This application relates to the field of personalizing visitor experience at a venue. More particularly this application relates to methods and systems for providing recommendations to visitors of a museum, zoo or other non-profit venue based on their interaction and enhancing participation in campaigns.

BACKGROUND

Non-profit venues such as museums, zoos, exhibition halls, and parks are typically supported at least in part by philanthropic donations from members, visitors and other supporters. Donated funds are used in part to support projects, such as the creation, maintenance and ongoing care for exhibits, subjects, animals, curated objects, and other items that are presented or curated within a venue, as well as other projects and activities (e.g., archeological digs, restoration projects, habitat preservation projects, and many others) that take place away from a venue but are associated with or represented in a venue. Such venues may often have a large number of physical points of interest for a visitor, representing different topics, projects, activities and the like. For example, an art museum may have separate rooms for different art styles like renaissance art, impressionism, cubism, surrealism, pop art etc. Similarly, an exhibition may include groupings of sculptures based on countries of origin and a park may have different sections based on various activities or themes.

Service providers and owners of non-profit venues such as museums, zoos, and parks are continually challenged to raise funds for their projects and other activities, as well as to offer favorable experiences for visitors. Traditionally, such venues have relied upon printed placards, audio-visual guides, mobile applications, and touchscreens to convey information to the visitors about various sections or specific objects like individual paintings, sculptures etc. However, conventional approaches contain generic information about items of interest and therefore fail to provide a personalized experience to a visitor based on the interests of the visitor. In turn, conventional approaches may fail to engage the personal philanthropic interests of a visitor, such as interest in supporting a particular project, as opposed to the venue or institution as a whole.

Applicant appreciates a need for improved methods and systems for creating and presenting personalized information to a visitor of a venue, such as a non-profit venue, in order to encourage philanthropic activity, such as donations, by the visitor.

SUMMARY

Methods and systems are provided herein for personalizing the experience for visitors (referred to herein in some cases as guests) of a museum, zoo or other non-profit venue, such as based on interests, location, or other contexts, including interest in particular items or topics and philanthropic interests. In embodiments, the personalizing of visitor experience may make use of location information of the visitor within the venue (including time-based location information, such as dwell time), as well as other information like demographic information, information about interests of a visitor, information about activities of a visitor, or the like. Such information may be utilized to personalize the experience of the visitor in various ways, such as for providing personalized recommendations (such as suggested routes to points of interest or locations in the venue), campaign participation and other philanthropic opportunities, improved photography or videography services, personalized multimedia content, digital guides and the like.

In embodiments, methods and systems for personalizing visitor experience at a museum, zoo or other non-profit venue include providing recommendations to visitors based on their interactions within the venue. In embodiments, interactions may be captured by one or more tracking systems within a venue, such as a location tracking system (e.g., using beacons, access points, or local proximity detection systems, such as NFC or Bluetooth systems) and/or interaction tracking systems (such as cameras, microphones, proximity detectors, motion detectors, touch detectors and the like). In embodiments, interactions may be tracked by analyzing the interactions of a visitor with a mobile device. In embodiments, interactions may be tracked by analyzing content captured by a mobile device, such as photographic, video and/or audio content recorded by the mobile device. For example, in embodiments, interactions may be captured by a mobile device, such as a mobile device of a visitor or one provided for use by a visitor. In embodiments, the recommendations may be provided by a software product running a program on a mobile computing device carried by the visitor, which when executed performs the steps of: analyzing the location of photographs taken by the visitor, analyzing the subjects of these photographs, analyzing the path of the visitor taken through the venue such as using RF beacons or other tracking systems, providing the information as an input, such as a feature vector, profile, or the like to a recommendation engine, and, using the results of the recommendation engine, suggesting other experiences for the visitor. In embodiments, the other experience is a donation or gifting opportunity related to an exhibit. In embodiments, the other experience is a visit to a different exhibit in the venue.

Provided herein is, a method for personalizing an experience of a visitor at a non-profit venue, comprising: executing an application on a mobile computing device carried by the visitor, which, when executed, performs the steps of: analyzing a path of the visitor taken through the venue based on data from a set of tracking systems recording an interaction of the visitor with a specific exhibit or other item associated with an ongoing campaign; upon detecting that an interaction by the visitor with the specific exhibit or other item exceeds a threshold, providing personalized information relating to the visitor to a recommendation engine; and, using results from the recommendation engine, presenting a relevant call-to-action to the visitor to participate in the campaign. In embodiments, the personalized information includes a feature vector or visitor profile. In embodiments, the campaign is a charitable project selected from the group consisting of a translation project, an art project, a clean water project, an education project, a building project, a missionary project, a disaster relief project, a restoration project, an acquisition project and combinations thereof. In embodiments, the recorded interaction of the visitor with the specific exhibit or other item is analyzed based on video taken of a face of the visitor. In embodiments, the recorded interaction of the visitor with the specific exhibit or other item is analyzed by the mobile computing device or by a platform in communication therewith using visual affect detection. In embodiments, the call-to-action is presented in response to the visitor requesting additional information about a campaign. In embodiments, the relevant call-to-action is selected from a group consisting of a request for a donation, a request for a subscription, a request to share on social media, a request to provide metadata about the visitor for display on an endorsement, a request to share the campaign with others, a request to be contacted further, a request to donate on behalf of another, a request to sponsor another campaign participant, a request for sponsorship by another to participate in the campaign and combinations thereof. In embodiments, the campaign has a set of goals and the application shows a degree of achievement of the set of goals in a graphical form. In embodiments, the steps further include the step of automatically subscribing the visitor to an ongoing email or push-messaging update about a status of the campaign.

An aspect provided herein includes an information technology platform for personalizing an experience of a visitor at a non-profit venue, the platform comprising a mapping and tracking system for storing a personalized tracking history of the visitor, for generating a live, digital map of the venue and for mapping and tracking venue elements, venue personnel, and a set of visitors at the non-profit venue. In embodiments, the digital map depicts location information selected from the group consisting of: exhibits; objects; meeting spots; popular photo and video locations; attractions; paths; the visitor; other visitors; visitors having a significance to the visitor including: friends, family, a tour group, a tour guide; a route associated with the visitor including: a recommended route, a pre-planned route, an actual route; entrances; exits; parking; a vehicle associated with the visitor; refreshments; dining; restrooms; retail shops; kiosks; security stations; information assistance stations; docent stations; employees of the venue and combinations thereof; and the digital map conveys information regarding a topic selected from the group consisting of a philanthropic opportunity, a campaign and combinations thereof. In embodiments, the digital map includes data selected from the group consisting of high-resolution imagery, high-resolution video, captioning, textual data, live video feed and combinations thereof.

In embodiments, supplemental media are provided by the platform to the visitor based on personalized tracking history; and the supplemental media are provided by a software product running a program on a mobile computing device carried by the visitor, which, when executed, performs the steps of: tracking a specific path of the visitor through the venue; storing the locations where the visitor stopped and waited; storing the specific path of the visitor on a remote server; providing the digital map to the visitor on the mobile computing device; and at a final end of a visit, assembling a multimedia presentation summarizing specific portions of the venue that the visitor visited and presenting the multimedia to the visitor. As used herein, "final end" distinguishes the temporal beginning of a visit from the temporal completion of the visit. The "final end" is coincident with the temporal completion of the visit. As used herein, "at the final end" means occurring in time at approximately the temporal completion of the visit. It is not necessary for the visitor 102 to have exited the venue 104 to have approximately completed the visit. In an example, at the final end can mean within 5 minutes of the visitor exiting the venue 104. Since the visitor 104 may linger near the exit for an extended, unpredictable period of time; and since the visitor 104 may back-track and revisit portions of the venue 104 after having neared the exit, "at the final end" of the visit means at a time wherein the visitor is within a certain distance from the exit, for example 20 meters, 50 meters, or 100 meters.

An aspect provided herein includes an information technology platform for personalizing an experience of a visitor at a non-profit venue, the platform comprising: a navigation system for providing a route and directions for the visitor to experience the venue. In embodiments, the provided route is based on goodwill or profit factors. In embodiments, the provided route is optimized to avoid lines or crowds. In embodiments, the visitor contributes to pre-planning the route before the route is provided. In embodiments, the provided route is conveyed via a mobile device to be carried by the visitor.

An aspect provided herein includes a method for personalizing an experience of a visitor at a non-profit venue, comprising: executing an application on a mobile computing device carried by the visitor, which, when executed, performs the steps of: analyzing a path of the visitor taken through the non-profit venue using a set of tracking systems; recording an interaction of the visitor with a specific venue exhibit associated with an ongoing campaign; retrieving demographic information related to the visitor from a database; providing a visitor vector to a recommendation engine, wherein the visitor vector includes the demographic information related to the visitor, wherein a personalized multimedia presentation is personalized to the visitor and presented to the visitor during the interaction of the visitor with the specific venue exhibit based on results output by the recommendation engine. In embodiments, the personalized multimedia presentation is presented in an application running on the mobile computing device separately from the venue exhibit. In embodiments, the specific exhibit includes a kiosk that presents the personalized multimedia presentation. In embodiments, the personalized multimedia presentation displays a name of the visitor or other information related to the visitor. In embodiments, the personalized multimedia presentation is personalized based on an education level, income level, language, developmental status, or age of the visitor. In embodiments, the developmental status of the visitor indicates that the visitor is a child. In embodiments, the visitor vector includes recorded visitor interaction data; the recorded visitor interaction data includes records of interactions of the visitor with a venue exhibit other than the specific venue exhibit; the recorded visitor interaction data demonstrates a degree of interest of the visitor in categories of information conveyed by the venue exhibit; the personalized multimedia presentation is personalized based on the categories of information in which the visitor has demonstrated a greater interest based on the recorded visitor interaction data from the interactions of the visitor with the venue exhibit other than the specific venue exhibit. In embodiments, the categories of information are selected from the group consisting of history, pictures, people, current activities and combinations thereof. In embodiments, the personalized multimedia presentation includes augmented reality.

An aspect provided herein includes an information technology platform for personalizing an experience of a visitor at a non-profit venue, the platform comprising: a network; a server in communication with the network; a mobile device to be carried by the visitor, the mobile device in communication with the server via the network, wherein the platform determines personalized information about the visitor; a recommendation engine included in the server, wherein the recommendation engine is to receive the personalized information about the visitor and to output a suggestion for a personalized experience for the visitor, wherein the platform conveys the suggestion for the personalized experience to the visitor, wherein the personalized experience is to encourage philanthropic activity; and a notification system for conveying a notification to the visitor. In embodiments, the notification is selected from the group consisting of: a message that multimedia content is available; navigation information; ticketing information; digital guidance; venue hours of operation; a donation opportunity; a philanthropic campaign message; a philanthropic campaign status update; parking information; refreshment information; dining information; retail sales information; security information; a gamification message; augmented photo data; augmented video data; a reward; a social connection; a popular location for photography; a popular location for videography; a restriction on photography for an exhibit or object; a payment confirmation; a donation confirmation; a message that a photo filter is available; a recommendation and combinations thereof. In embodiments, the information technology platform further comprises a management system for managing the platform. In embodiments, the information technology platform further comprises a management interface for accessing the management system. In embodiments, the management interface is for creating an interactive campaign; information about the campaign is displayed at multiple locations or sites via the management interface; the information about the campaign is displayed simultaneously at the multiple locations or sites; and participants at the multiple locations interact or participate in real-time communication via the management interface. In embodiments, a form of the real-time communication is selected from the group consisting of audio conferencing, video conferencing, virtual reality conferencing, augmented reality conferencing, collaborative text chat, collaborative editing and holographic conferencing. In embodiments, the management interface provides a heat map showing paths of a plurality of visitors through the venue. In embodiments, the management interface is for creating multiple templates of multimedia asset selections or sequences. In embodiments, the management interface is for creating interactive campaigns related to locations in a site plan. In embodiments, the management interface is for associating a live feed of multimedia to a site plan. In embodiments, the management interface is for creating interactive campaigns and displaying multimedia relating to the degree of progress towards a goal in the interactive campaign. In embodiments, the management interface is for designing interactive content. In embodiments, a development of different assets for location-based kiosks and mobile applications is performed via the management interface. In embodiments, content for different venue locations is developed simultaneously via the management interface.

An aspect provided herein includes an information technology platform for personalizing an experience of a visitor at a non-profit venue, the platform comprising: a network; a server in communication with the network; a mobile device to be carried by the visitor, the mobile device in communication with the server via the network, wherein the platform determines personalized information about the visitor; a recommendation engine included in the server, wherein the recommendation engine is to receive the personalized information about the visitor and to output a suggestion for a personalized experience for the visitor, wherein the platform conveys the suggestion for the personalized experience to the visitor, wherein the personalized experience is to encourage philanthropic activity; and a notification system for conveying advertising content to the visitor. In embodiments, the personalized information includes a present location of the visitor; the advertising content is related to a specific exhibit in a plurality of exhibits located at the non-profit venue; and a location of the specific exhibit is closest to the visitor compared to each other location of the exhibits in the plurality of exhibits. In embodiments, the information technology platform further comprises a navigation system for providing a route and directions for the visitor to experience the venue. In embodiments, the provided route is based on goodwill or profit factors. In embodiments, the provided route is optimized to avoid lines or crowds. In embodiments, the visitor contributes to pre-planning the route before the route is provided. In embodiments, the provided route is conveyed via the mobile device.

An aspect provided herein includes a method for augmenting a photograph taken by the visitor at a non-profit venue comprising: executing an application on a mobile computing device carried by the visitor, which, when executed, performs the steps of: analyzing an original photograph taken by the visitor to determine a location of a subject of the original photograph; determining a set of characteristics of the original photograph; accessing digital imagery from a database of high-resolution imagery of the venue; creating a high-resolution digital image having a corresponding set of characteristics to those of the original photograph by using the digital imagery from the database; masking the original photograph based on differences between the high-resolution digital image and original photograph taken by the visitor; and compositing the original photograph with the high-resolution digital image to create a high-resolution composite photograph. In embodiments, the high-resolution imagery includes a 3D model of the location of the subject. In embodiments, the high-resolution imagery contains 3-dimensional metadata. In embodiments, the high-resolution imagery includes video. In embodiments, the high-resolution imagery includes a light-field photographic image. In embodiments, the method further comprises re-shading images of human subjects captured in the original photograph to blend with the high-resolution imagery from the database. In embodiments, the method further comprises providing the high-resolution composite photograph to the visitor on a website or within the application on the mobile computing device carried by the visitor. In embodiments, the set of characteristics includes at least one of location, orientation, point of view and lighting characteristics.

Provided herein is a method for augmenting a video taken by a visitor at a non-profit venue comprising: executing an application on a mobile computing device carried by the visitor, which, when executed, performs the steps of: analyzing an original video taken by the visitor to determine locations of subjects of the original video; determining a set of characteristics of the original video; accessing digital imagery from a database of high-resolution imagery of the venue; creating a high-resolution motion path sequence of images having a corresponding set of characteristics to those of the original video by using the digital imagery from the database; masking the original video based on differences between the high-resolution motion path sequence of images and the original video taken by the visitor; compositing the original video with the high-resolution motion path sequence of images to create a high-resolution composite video.

In embodiments, the high-resolution imagery includes a 3D model of the locations of the subjects. In embodiments, the high-resolution imagery contains 3-dimensional metadata. In embodiments, the high-resolution imagery includes video. In embodiments, the high-resolution imagery includes a light-field photographic image. In embodiments, the method further comprises re-shading images of human subjects captured in the original video to blend with the high-resolution imagery from the database. In embodiments, the method further comprises providing the high-resolution composite video to the visitor on a website or within the application on the mobile computing device carried by the visitor. In embodiments, the set of characteristics includes at least one of location, orientation, lighting, and motion path characteristics.

An aspect provided herein includes a method for providing supplemental media to a visitor at a non-profit venue, comprising: executing an application on a mobile computing device carried by the visitor, which, when executed, performs the steps of: tracking a specific path of the visitor through the venue using a set of tracking systems; tracking locations where the visitor stopped and waited; storing the specific path of the visitor on a remote server; providing a digital map to the visitor on the mobile computing device carried by the visitor; determining, from the specific path of the visitor stored on the remote server, whether or not the visitor had come into proximity of certain exhibits or objects depicted on the digital map; and in response to the determining, selectively allowing the visitor to view information about the exhibits or objects on the digital map if the visitor had come into proximity of the exhibits or the objects. In embodiments, the information is selected from the group consisting of high-resolution imagery, video, captioning, textual data, live video feed, donation information, and combinations thereof. In embodiments, the set of tracking systems includes a Radio Frequency (RF) beacon, an access point, an Indoor Positioning System (IPS), a Global Positioning System (GPS), a local proximity detection system, a Quick Response (QR) code scanning system, or an image recognition system. In embodiments, the local proximity detection system includes at least one of a Near-Field Communication (NFC) system, a Wi-Fi system, an RF system, a cellular system, an Internet of Things (IoT) system, and a Bluetooth system. In embodiments, the method further comprises selectively preventing the visitor from viewing the information about the exhibits or the objects on the digital map if the visitor had not come into proximity of the exhibits or the objects.

Provided herein are methods and systems for providing supplemental media to a visitor at a non-profit venue, comprising: a software product running a program on a mobile computing device carried by the visitor, which when the program is executed, performs the steps of: analyzing photographs taken by the visitor; accessing digital imagery from a database of high-resolution imagery to identify a location in the venue of a set of exhibits depicted in the photographs; creating archivable regions in stored imagery allocated to the visitor; and allowing the visitor to activate the archivable region to retrieve additional information about the set of exhibits depicted in the photographs. In embodiments, the additional information includes a call-to-action allowing the visitor to participate in a fundraising campaign. In embodiments, the additional information includes a call-to-action allowing the visitor to share a fundraising campaign with an other visitor. In embodiments, the additional information includes a call-to-action allowing the visitor to provide personal information or a photograph to be shared in a virtual wall relating to the set of exhibits. In embodiments, the additional information is selected from the group consisting of high-resolution imagery, video, captioning, textual data, live video feed, donation information, and combinations thereof. In embodiments, the additional information includes suggestions of other exhibits popular with people who took photographs of the exhibit.

An aspect provided herein includes an information technology platform for personalizing an experience of a visitor at a non-profit venue, the platform comprising: a network; a server in communication with the network; a mobile device to be carried by the visitor, the mobile device in communication with the server via the network, wherein the platform determines personalized information about the visitor; and a donation impact viewing system for presenting media or information to the visitor based on a photograph taken by a visitor, wherein the media or information relates to the donation impact of a donation related to a point of interest. In embodiments, the media or information depicts or is related to the point of interest prior to donation efforts or campaign initiation. In embodiments, media or information depicts or is related to the point of interest upon completion of a donation or campaign benchmark or goal. In embodiments, the media or information depicts a status of a campaign with respect to donation goals. In embodiments, the media or information is presented to the visitor with a request for the visitor to donate.

An aspect provided herein includes a method for providing a visitor to a non-profit venue a campaign participation opportunity based on an interaction of the visitor, comprising: executing a program on a mobile computing device carried by the visitor, which, when executed, performs the steps of: analyzing a path of the visitor taken through the non-profit venue using a set of tracking systems; recording the interaction of the visitor with a specific venue exhibit associated with an ongoing campaign; retrieving a set of target locations and multimedia hints from a server; displaying the multimedia hints on the mobile computing device; confirming that the visitor has arrived at at least one target location in the set of target locations; and conveying a reward notification to the visitor in response to each target location that the program confirmed as having been visited by the visitor. In embodiments, the confirming that the visitor has arrived at at least one target location in the set of target locations, further comprises: conveying a question to the visitor, wherein information for a correct response to the question is located at the at least one target location; receiving an input in response to the question from the visitor via the mobile computing device; comparing the input in response to the question from the visitor to a correct answer received from the server; and verifying that the input in response to the question from the visitor matches the correct answer received from the server. In embodiments, the confirming that the visitor has arrived at at least one target location in the set of target locations further comprises scanning a QR code using a camera wherein the camera is located in the mobile computing device. In embodiments, the confirming that the visitor has arrived at at least one target location in the set of target locations, further comprises: accepting a picture of the at least one target location taken on a camera wherein the camera is located in the mobile computing device; and using image recognition to compare the picture to an image retrieved from a server.

Provided herein is a system for reducing a wait time for a visitor of a venue, comprising: a mobile application module running on a mobile computing device carried by the visitor that communicates with one or more wireless beacons or tracking systems proximate to the venue while the visitor is at least one of traveling to the venue and queueing to enter the venue; a provisioning module for activating a portable digital guide; an entry module running on a portable device for identifying and checking-in visitors; and a notification module for notifying venue workers, wherein the notification module is to automatically notify the provisioning module to provision an available digital guide by pre-filling the available digital guide with personalized visitor information, and to notify at least one of the venue workers to retrieve the digital guide and to meet the visitor where the visitor is expected to enter the venue. In embodiments, the venue is at least one of a museum and a zoo. In embodiments, the notification module is to provide the venue worker with an image and a name of the visitor, a coordinate of where the visitor is expected to enter the venue, and at least one of a travel speed of the visitor and an estimated time of arrival of the visitor at the coordinate. In embodiments, the tracking system includes a Radio Frequency (RF) beacon, an access point, an Indoor Positioning System (IPS), a Global Positioning System (GPS), a local proximity detection system, a Quick Response (QR) code scanning system, or an image recognition system. In embodiments, the local proximity detection system includes at least one of a Near-Field Communication (NFC) system, a Wi-Fi system, an RF system, a cellular system, an Internet of Things (IoT) system, and a Bluetooth system.

Provided herein are methods and systems for developing content for personalized museum, zoo or other non-profit venue experiences for a mobile computing device comprising: providing an interface for management of multimedia assets, receiving an assignment of multimedia assets relating to specific physical and/or virtual locations in one or more site plans, receiving categorical and/or topical metadata to associate with multimedia assets, providing an interface for receipt of personalized interest data for a museum visitor including visitor-provided preference data and/or passively-collected visitor interaction data, and applying a machine learning algorithm to analyze the metadata and the personalized interest data for a plurality of visitors to provide a sequence and/or selection of multimedia assets for consumption by a museum visitor. In embodiments, an interactive multimedia asset is assigned to use an audio, visual, tactile, or movement capture device in communication with the mobile computing device.

An aspect provided herein includes a method for developing content for personalized non-profit venue experiences using a mobile device, comprising: providing a management interface for management of a set of multimedia assets; receiving a mapping of multimedia assets to a set of locations on a set of site plans for the venue; receiving topical metadata for the set of multimedia assets; providing an interface for receiving data indicating personal philanthropic interests of a visitor to the venue, wherein the data indicating personal philanthropic interests of the visitor to the venue includes visitor-provided preference data and passively-collected visitor interaction data; and applying a machine learning system to analyze the metadata and the data indicating personal philanthropic interest of the visitor to provide a sequence or a selection of multimedia assets for consumption by the visitor. In embodiments, the machine learning system assembles a sequence or selection based at least in part on a personal route taken by the visitor through at least one of the site plans in the set of site plans. In embodiments, the machine learning system generates a memory book for the visitor subsequent to a visit to the venue, wherein the memory book is based in part on a personal route taken by the visitor through at least one of the site plans in the set of site plans. In embodiments, a web interface is to give the visitor access to the memory book. In embodiments, a mobile app is to give the visitor access to the memory book. In embodiments, the machine learning system assembles a sequence or selection based at least in part on visitor selections made at the venue. In embodiments, at least one of the multimedia assets is an interactive multimedia asset. In embodiments, the interactive multimedia asset is assigned to use an audio, visual, tactile, or movement capture device associated with a location in the venue. In embodiments, the management interface further provides an interface for creating an interactive campaign, wherein information about the interactive campaign is displayed at a plurality of locations or sites, wherein the information about the interactive campaign is displayed simultaneously at the plurality of locations or sites, and wherein visitors at the plurality of locations or sites have access to real-time interaction or real-time communication with each other. In embodiments, a mode of the real-time communication is selected from the group consisting of audio conferencing, video conferencing, virtual reality conferencing, collaborative text chat, holographic conferencing, and combinations thereof. In embodiments, at least one location in the set of locations on the set of site plans is associated with a wireless beacon. In embodiments, the management interface further provides a heat map showing paths of visitors through the venue. In embodiments, the management interface further provides an interface for creating a plurality of templates for multimedia asset selections or sequences. In embodiments, the management interface further provides an interface for creating an interactive campaign related to at least one location in the set of locations on the set of site plans for the venue.

In embodiments, the management interface further provides an interface for associating a live feed of multimedia to a site plan. In embodiments, the management interface further provides an interface for creating an interactive campaign and displaying multimedia to convey a degree of progress towards a goal in the interactive campaign. In embodiments, the management interface further provides an interface for designing interactive content. In embodiments, the management interface further provides for the development of different assets for location-based kiosks and mobile applications. In embodiments, the management interface further provides for a simultaneous development of content for a plurality of venues. In embodiments, the machine learning system generates a memory book for the visitor subsequent to a visit to the venue, wherein the memory book has digital assets coordinated in part based on a personal route taken by the visitor through at least one of the site plans in the set of site plans, or wherein the memory book has digital assets coordinated in part based on visitor input.

An aspect provided herein includes a method for providing personalized venue visit recommendations to a visitor at a non-profit venue, comprising: providing a management interface for management of a set of multimedia assets; receiving a mapping of multimedia assets to specific physical or virtual displays in at least one site plan; receiving topical metadata for the set of multimedia assets; providing an interface for receiving data indicating personal interests of a visitor to the venue, wherein the data indicating personal interests of the visitor to the venue includes visitor-provided preference data and passively-collected visitor interaction data; receiving personal interest data for a plurality of venue visitors; receiving preference data relating to a prospective visitor; applying a machine learning system to analyze the metadata, the data indicating personal interests of the visitor, the personal interest data for the plurality of venue visitors, and the preference data relating to the prospective visitor; and generating a selection or sequence of venue location recommendations for the prospective visitor. In embodiments, the machine learning system assembles a sequence or selection based at least in part on visitor selections made at the venue. In embodiments, the machine learning system generates recommendations based at least in part on a donation history of the prospective visitor. In embodiments, the machine learning system generates recommendations based at least in part on a donation history of visitors with similar interests to the prospective visitor. In embodiments, the management interface further provides an interface for creating an interactive campaign, wherein information about the interactive campaign is displayed at multiple locations or sites, wherein the information about the interactive campaign is displayed simultaneously at the multiple locations or sites, and wherein a visitor at one of the multiple locations or sites can interact or communicate with at least one other visitor at at least one other location or site in real time. In embodiments, the real-time communication is selected from the group consisting of audio conferencing, video conferencing, virtual reality conferencing, collaborative text chat, holographic conferencing, and combinations thereof. In embodiments, the venue locations are associated with corresponding wireless beacons.

An aspect provided herein includes a method for developing recommendations for a personalized venue visit at a non-profit venue, comprising: providing a management interface for management of a set of multimedia assets; receiving a mapping of multimedia assets to specific physical or virtual displays in at least one site plan; receiving topical metadata for the set of multimedia assets; providing an interface for receiving data indicating personal interests of a visitor to the venue, wherein the data indicating personal interests of the visitor to the venue includes a set of data selected from among visitor-provided preference data, passively-collected visitor interaction data, and visitor route data; receiving personal interest data for a plurality of venue visitors; receiving preference data relating to a prospective visitor; applying a machine learning system to analyze the metadata, the data indicating personal interests of the visitor, the personal interest data for the plurality of venue visitors, and the preference data relating to the prospective visitor; and generating a selection or sequence of venue location recommendations for the prospective visitor. In embodiments, the personal interest data is collected from visitor visits across a plurality of non-profit venues. In embodiments, the preference data relating to the prospective visitor is collected for multiple venues. In embodiments, the preference data relating to the prospective visitor is collected at a non-profit venue. In embodiments, the preference data relating to the prospective visitor is derived from information collected on the prospective visitor based on a prior visit by the prospective visitor to a non-profit venue. In embodiments, the preference data relating to the prospective visitor is derived from information collected on the prospective visitor based on the route data of the prospective visitor through a non-profit venue during a previous visit to the non-profit venue. In embodiments, the preference data for the prospective visitor is collected using a mobile application. In embodiments, the preference data for the prospective visitor is collected based on indications of interest. In embodiments, the indications of interest are collected through gaze analysis. In embodiments, the indications of interest are collected through visual analysis via a plurality of cameras. In embodiments, the indications of interest are provided by the prospective visitor. In embodiments, the preference data for the prospective visitor is generated from visitor information collected from a visitor unrelated to the non-profit venue. In embodiments, the visitor route data is collected using a mobile application. In embodiments, the visitor route data is collected using wireless beacons. In embodiments, the visitor route data is collected using cameras. In embodiments, the visitor route data is collected using biometric sensors. In embodiments, the visitor route data is collected using a sensor network. In embodiments, the visitor route data is collected by tracking visitor interaction with venue displays. In embodiments, the visitor route data is collected by tracking visitor use of a venue guide device.

Provided herein are methods and systems for coordinating personalized experiences between cooperating non-profit venues, comprising: identifying a visitor to a current venue using an authentication system in a mobile application; displaying an interface of multimedia available in specific physical or virtual displays in site plans from a plurality of non-profit venues; accessing multimedia assets relating to specific physical or virtual displays in one or more site plans; accessing categorical or topical metadata to associate with the multimedia assets; collecting personalized interest data relating to the visitor to at least one of the non-profit venues, the personalized interest data including visitor-provided preference data, passively-collected visitor interaction data, and visitor route data; and providing a selection or sequence of venue location recommendations for the visitor that include recommendations and multimedia relating to an other venue different from the current venue. In embodiments, personalized interest data is collected from visits by the visitor to multiple non-profit venues using a plurality of capture devices. In embodiments, the personalized interest data is collected using a mobile application. In embodiments, the personalized interest data is collected using wireless beacons. In embodiments, the personalized interest data is collected using cameras. In embodiments, the personalized interest data is collected using biometric sensors. In embodiments, the personalized interest data is collected using a sensor network. In embodiments, the personalized interest data is collected by tracking visitor interaction with venue displays. In embodiments, the personalized interest data is collected by tracking visitor use of a venue guide device. In embodiments, the preference data for the prospective visitor is generated from visitor information collected from the visitor unrelated to the cooperating non-profit venues.

Provided herein are methods and systems for creating content-oriented personalized multi-venue non-profit venue experiences, comprising: accessing a list of multimedia assets relating to specific physical or virtual exhibits from a plurality of non-profit venues; receiving categorical or topical metadata to associate with the multimedia assets; receiving personalized interest data for a visitor to at least one of the non-profit venues, the personalized interest data including visitor-provided preference data, passively-collected visitor interaction data, and visitor route data; receiving personalized interest data for a plurality of non-profit venue visitors relating to multiple non-profit venues for each visitor; receiving preference data relating to a category of non-profit venue visitor; applying a machine learning algorithm to analyze the metadata, the personalized interest data, and the preference data relating to the category of non-profit venue visitor; and generating a recommendation of a sequence of multimedia exhibits, wherein a first portion of the sequence relates to a first non-profit venue, and a second portion of the sequence relates to a second non-profit venue. In embodiments, the personalized interest data is collected from visits by visitors across multiple venues using a plurality of capture devices. In embodiments, the personalized interest data is collected using a mobile application. In embodiments, the personalized interest data is collected using a wireless beacon. In embodiments, the personalized interest data is collected using a camera. In embodiments, the personalized interest data is collected using a biometric sensor. In embodiments, the personalized interest data is collected using a sensor network. In embodiments, the personalized interest data is collected by tracking a visitor interaction with a venue display. In embodiments, the personalized interest data is collected by tracking a use by a visitor of a venue guide device. In embodiments, the machine learning system assembles a sequence or selection based at least in part on a personal route taken by the visitor through one or more site plans. In embodiments, the machine learning system assembles a sequence or selection based in part on a selection made by the visitor at a venue location.

Provided herein are methods and systems for cross-venue referral for a visitor to a non-profit venue in a group of cooperating non-profit venues, comprising: receiving personalized interest data from among a set of visitor-provided preference data, passively-collected visitor interaction data, and visitor route data for a plurality of visitors to non-profit venues across a plurality of non-profit venues; receiving preference data relating to a specific set of visitors; applying a machine learning algorithm to analyze the personalized interest data and the preference data relating to the specific set of visitors; and generating a recommendation of a selection or sequence of non-profit venue location recommendations for the specific set of visitors relating to at least a portion of the plurality of the non-profit venues. In embodiments, the recommendation includes a promotion or discount to attend an other non-profit venue. In embodiments, the recommendation is provided to the specific set of visitors via a medium selected from the group consisting of email, push messaging, virtual reality, mobile applications, augmented reality, a museum kiosk, an audio interface, and combinations thereof. In embodiments, the recommendation is based in part on the contribution history of the specific set of visitors. In embodiments, the venues in the group of cooperating non-profit venues are classified into categories, and wherein preference data for a prospective set of visitors to a venue in a first category is collected from a set of visitors to an other venue in an other category of venues.

Provided herein are methods and systems for automating content selection for a personalized non-profit venue experience, comprising: accessing a list of multimedia assets relating to specific physical or virtual displays in at least one site plan; receiving categorical or topical metadata to associate with the multimedia assets; receiving personalized interest data for a venue visitor selected from among visitor-provided preference data, passively-collected visitor interaction data, and visitor route data; receiving personalized interest data for a plurality of venue visitors relating to multiple non-profit venues for each visitor; receiving preference data relating to a prospective venue visitor; applying a machine learning algorithm to analyze the metadata, the venue visitor data and the prospective visitor data, and generating a selection or sequence of venue location recommendations for the prospective visitor. In embodiments, the personalized interest data is collected from visits by the visitor to multiple non-profit venues using a plurality of capture devices. In embodiments, the personalized interest data is collected using a mobile application. In embodiments, the personalized interest data is collected using a wireless beacon. In embodiments, the personalized interest data is collected using a camera. In embodiments, the personalized interest data is collected using a biometric sensor. In embodiments, the personalized interest data is collected using a sensor network. In embodiments, the personalized interest data is collected by tracking a visitor interaction with a venue display. In embodiments, the personalized interest data is collected by tracking a use by a visitor of a venue guide device. In embodiments, the multiple non-profit venues are classified into categories, and preference data for a prospective visitor to a venue in a first category is collected from a visitor to an other venue in an other category of venues disrelated from the first category.

Provided herein are methods and systems for providing a coordinated experience for a visitor to a non-profit venue in a group of cooperating non-profit venues, comprising: providing an interface for management of multimedia assets; receiving an assignment of multimedia assets relating to specific physical or virtual displays in one or more site plans; receiving categorical or topical metadata to associate with multimedia assets; providing an interface for receipt of personalized interest data for a visitor to a venue, including data selected from among visitor-provided preference data, passively-collected visitor interaction data, and visitor route data; receiving personalized interest data for a plurality of visitors to non-profit venues relating to multiple non-profit venues for each visitor; applying a machine learning algorithm to analyze the multimedia and the personalized interest data for the plurality of visitors; and generating a plurality of generic visitor profiles and a corresponding plurality of selection or sequence of venue location recommendations. In embodiments, the management interface further provides a heat map showing paths of visitor through the non-profit venue. In embodiments, the heat map is further segmented according to the generic visitor profiles. In embodiments, the personalized interest data is collected from visits by visitors across multiple venues using a plurality of capture devices. In embodiments, the personalized interest data is collected using a mobile application. In embodiments, the personalized interest data is collected using a wireless beacon. In embodiments, the personalized interest data is collected using a camera. In embodiments, the personalized interest data is collected using a biometric sensor. In embodiments, the personalized interest data is collected using a sensor network. In embodiments, the personalized interest data is collected by tracking a visitor interaction with a venue display. In embodiments, the personalized interest data is collected by tracking a use by a visitor of a venue guide device. In embodiments, the machine learning system assembles a sequence or selection based at least in part on a personal route taken by the visitor through one or more site plans. In embodiments, the machine learning system assembles a sequence or selection based in part on a selection made by the visitor at a venue location. In embodiments, the multimedia assets are interactive. In embodiments, an interactive multimedia asset is assigned to use an audio, visual, tactile, or movement capture device associated with a location in the venue. In embodiments, the management interface further provides an interface for creating an interactive campaign, information about the interactive campaign is displayed at a plurality of locations or sites, the information about the interactive campaign is displayed simultaneously at the plurality of locations or sites, and visitors at the plurality of locations or sites have access to real-time interaction or real-time communication with each other. In embodiments, a mode of the real-time communication is selected from the group consisting of audio conferencing, video conferencing, virtual reality conferencing, collaborative text chat, holographic conferencing, and combinations thereof. In embodiments, the venue locations in the site plans are associated with a wireless beacon.

An aspect provided herein includes a method for providing a visitor to a non-profit venue a campaign participation opportunity based on an interaction of the visitor, comprising: executing a program on a mobile computing device carried by the visitor, which, when executed performs the steps of: analyzing a path of the visitor taken through the non-profit venue using a set of tracking systems; in response to detecting that the visitor interaction with the specific venue exhibit exceeds a threshold, providing a visitor vector to a recommendation engine, wherein the visitor vector includes data indicating that the visitor has shown interest in the campaign; using results output by the recommendation engine, matching the visitor to an other visitor interested in participating in a similar campaign; and presenting a relevant call-to-action to the visitor to communicate with the other visitor via the program. In embodiments, communication between the visitor and the other visitor facilitates a sponsorship relationship between the visitor and the other visitors. In embodiments, the visitor is presented with a list of potential other visitors along with additional information about the other visitors and goals for the other visitors for the campaign. In embodiments, the other visitor is selected by the visitor from a list of potential campaign participants. In embodiments, the other visitor is selected by the program from a list of potential campaign participants. In embodiments, the campaign is selected from the group consisting of a translation project, a clean water project, an education project, a building project, a missionary project, a disaster relief project, a restoration project, an acquisition project and combinations thereof. In embodiments, the recorded interaction of the visitor with the specific venue exhibit associated with the ongoing campaign is analyzed based on video taken of a face of the visitor. In embodiments, the recorded interaction of the visitor with the specific venue exhibit is analyzed using visual affect detection. In embodiments, the call-to-action is selected from a group consisting of a request for a donation, a request for subscription, a request to share on social media, a request to provide metadata about the visitor for display on an endorsement, a request to share the campaign with others, a request to be contacted further, a request to donate on behalf of another, a request to sponsor an other campaign participant, a request for sponsorship by an other visitor to participate in a campaign. In embodiments, the program automatically queries a sponsored visitor to request an update on participation by the sponsored visitor in the campaign. In embodiments, the campaign has specific actions and the program queries a sponsored visitor whether the sponsored visitor has completed the specific actions. In embodiments, the steps further include the step of automatically subscribing the visitor to an ongoing email or push-messaging update about a status of the campaign. In embodiments, the ongoing email or push-messaging update provides a specific update on a sponsored visitor, wherein the visitor subscribed to the update is a sponsor of the sponsored visitor, and wherein the update includes a status of completion of specific actions by the sponsored visitor.

An aspect provided herein includes a method for providing a visitor to a non-profit venue a campaign participation opportunity based on an interaction of the visitor, comprising: executing a program on a mobile computing device carried by the visitor, which, when executed, performs the steps of: analyzing a path of the visitor taken through the non-profit venue using a set of tracking systems; recording the interaction of the visitor with a specific venue exhibit associated with an ongoing campaign; in response to detecting that the visitor interaction with the specific venue exhibit exceeds a threshold, providing a visitor vector to a recommendation engine, wherein the visitor vector includes data indicating that the visitor has shown interest in the specific venue exhibit associated with the campaign; and using results output by the recommendation engine, presenting a relevant call-to-action to the visitor to direct a portion of funds contributed by the visitor to the campaign in which the visitor has shown interest. In embodiments, the funds contributed by the visitor include a contribution in exchange for admission to the venue, and, in response to the contribution in exchange for admission, the visitor is given authority to direct a virtual credit to the campaign in further response to the relevant call-to-action. In embodiments, the steps further include communicating with a retail point-of-sale system, wherein the retail point-of-sale system presents the relevant call-to-action to the visitor, wherein the point-of-sale system allocates a portion of funds received from the visitor by the point-of-sale system to the campaign in response to instructions from the visitor. In embodiments, the instructions include communicating a selection via the point-of-sale system. In embodiments, the instructions include communicating a selection via the mobile computing device. In embodiments, the mobile computing device includes a digital guide. In embodiments, the steps further include communicating with the visitor via a website or mobile app, wherein the visitor is outside of the venue after the visitor has exited the venue after the visitor has visited the venue; and the website or mobile app presents the relevant call-to-action to the visitor, wherein the website or mobile app allocates a portion of the funds contributed by the visitor to the campaign in response to instructions from the visitor entered via the website or mobile app. In embodiments, the steps further include communicating with the visitor via a website or mobile app, wherein the visitor is outside of the venue before the visitor has entered the venue before the visitor has visited the venue; and the website or mobile app presents the relevant call-to-action to the visitor, wherein the web site or mobile app allocates a portion of the funds contributed by the visitor to the campaign in response to instructions from the visitor entered via the website or mobile app. In embodiments, the campaign is selected from the group consisting of a translation project, a clean water project, an education project, a building project, a missionary project, a disaster relief project, a restoration project, an acquisition project and combinations thereof. In embodiments, the recorded interaction of the visitor with the specific venue exhibit associated with the ongoing campaign is analyzed based on video taken of a face of the visitor. In embodiments, the recorded interaction of the visitor with the specific venue exhibit is analyzed using visual affect detection. In embodiments, the call-to-action is selected from the group consisting of a request for a donation, a request for subscription, a request to share on social media, a request to provide metadata about the visitor for display on an endorsement, a request to share the campaign with others, a request to be contacted further, a request to donate on behalf of another, a request to sponsor an other campaign participant, a request for sponsorship by an other visitor to participate in a campaign.

An aspect provided herein includes a method for providing supplemental media to a visitor at a non-profit venue, comprising: executing an application on a mobile computing device carried by the visitor, which, when executed, performs the steps of: tracking a specific path of the visitor through the venue using wireless beacons; tracking locations where the visitor stopped and waited; storing the specific path of the visitor on a remote server; providing a digital map to the visitor on the mobile computing device carried by the visitor; determining, from the specific path of the visitor stored on the remote server, whether or not the visitor had come into proximity of certain exhibits or objects depicted on the digital map; and automatically assembling a multimedia presentation summarizing specific portions of the venue that the visitor visited and presenting the multimedia presentation to the visitor. In embodiments, the multimedia presentation is presented in an application running on the mobile computing device carried by the user. In embodiments, the multimedia presentation is emailed to the visitor. In embodiments, the multimedia presentation is in the form of an audio summary provided via a voice agent system. In embodiments, the multimedia presentation is delivered on a kiosk in the venue. In embodiments, the multimedia includes additional information about the exhibits the user has visited that was not presented at those exhibits. In embodiments, the specific portions of the venue where the visitor stopped and waited are added to a bookmark list. In embodiments, the multimedia presentation includes additional multimedia for the portions of the venue that the visitor visited. In embodiments, the steps further include the step of automatically subscribing the visitor to an ongoing email or push-messaging update about a status of the specific portions of the venue on the bookmark list. In embodiments, the update includes information about additions, changes, an annotation by an other visitor, an observation by the other visitor, or an event regarding the specific portions of the venue on the bookmark list.

In embodiments, methods and systems for personalizing visitor experience at a museum, zoo or other non-profit venue include providing opportunities to the visitors to solicit engagement of other visitors of similar interests based on their interaction. The opportunities are provided by a software product running a program on the mobile computing device carried by the visitor, which when executed performs the methods of: analyzing the path of the visitor taken through the venue, such as using RF beacons or other tracking systems, recording the interactions of the visitor with specific exhibits that are associated with an ongoing campaign, upon receiving input by a visitor to create a campaign related to an exhibit, providing the visitor with an interface to create a new campaign and provide information about the campaign, uploading the campaign to a server, displaying information about the campaign on a display device in proximity to the exhibit, providing the information as an input to a recommendation engine, using the results of the recommendation engine, and presenting a relevant call-to-action to a second visitor to participate in the campaign.

Methods and systems are provided herein for personalizing an experience of a visitor at a venue that displays results of a plurality of projects supported by philanthropy. Such methods and systems include determining personalized information of the visitor; providing the personalized information as a visitor profile to a recommendation engine; and using the recommendation engine, suggesting personalized experiences for the visitor, wherein suggesting personalized experiences for the visitor includes providing a recommendation to direct the visitor to a physical location where the visitor is to be presented with a donation opportunity for a project that is determined by the recommendation engine to be of interest to the visitor based on the visitor profile. In embodiments, the venue is at least one of a museum and a zoo. In embodiments, the personalized information includes location information of the visitor in the venue. In embodiments, the location information includes a dwell time by the visitor at a set of locations at the venue. The methods and systems may further comprise using the location information for a plurality of locations physically visited by the visitor in the venue, automatically assembling a multimedia presentation containing content relating to the specific portions of the venue that were visited by the visitor. As used herein, a "physically visited" means that the visitor was bodily present at the geographical location of the venue. Physical visitation is distinguished from virtual visitation. In virtual visitation, a web site may be viewed, or a virtual reality experience may be used to simulate a physical visitation. In embodiments, the profile of the visitor is derived at least in part by analyzing the contents of photographs taken by the visitor within the venue. In embodiments identifying personalized information of the visitor includes capturing visitor data using a plurality of capture devices selected from the group consisting of smartphones, cameras, biometric sensors, wireless beacons and sensor networks and combinations thereof.

Methods and systems provided herein include a system for providing, to a visitor of a venue a campaign participation opportunity based on interactions within the venue, including a path tracking system for determining a path of the visitor taken through the venue; an interaction tracking system for determining at least one interaction of the visitor with at least one exhibit that is associated with an ongoing campaign; and a recommendation engine for processing the interaction to provide a recommendation for an action related to the campaign. In embodiments, upon detecting that an interaction by the visitor with a specific exhibit exceeds a threshold level of interaction, the interaction information is provided to the recommendation engine. "A recommendation for an action" may also be referred to herein as a "call-to-action." In embodiments, the recommendation engine provides a relevant call-to-action to the visitor to participate in a campaign that is related to the specific exhibit for which the interaction was tracked. In embodiments, the venue is a museum. In embodiments, the venue is a zoo. In embodiments, tracking interactions of the visitor with an exhibit include recording video of the face of the visitor and using a machine learning system to analyze interactions based on the video of the visitor's face to determine a sentiment of the visitor with respect to the exhibit. In embodiments, the campaign is selected from charitable projects in the group consisting of a translation project, a clean water project, an education project, a building project, a missionary project, a disaster relief project, a restoration project, an acquisition project, and combinations thereof. In embodiments, the call-to-action presented to the visitor is selected from a group consisting of a request for donation, a request for subscription, a request to share on social media, a request to provide metadata about the visitor for display on an endorsement, a request to share the campaign with others, a request to provide permission to be contacted further, a request to donate on behalf of another, a request to sponsor another campaign participant, a request for sponsorship by another to participate in the campaign, and combinations thereof.

An aspect provided herein includes an information technology platform for personalizing an experience of a visitor at a non-profit venue, the platform comprising: a network; a server in communication with the network; a mobile device to be carried by the visitor, the mobile device in communication with the server via the network, wherein the platform determines personalized information about the visitor; a recommendation engine included in the server, wherein the recommendation engine is to receive the personalized information about the visitor and to output a suggestion for a personalized experience for the visitor, wherein the platform conveys the suggestion for the personalized experience to the visitor, wherein the personalized experience is to encourage philanthropic activity; and a machine learning system for learning on a training set of photographic data or video data, the learning to train the machine learning system to predict a sentiment of the visitor based, at least in part, on photographic images or video images that are taken by the visitor, that are shared to the visitor, that are shared by the visitor or that include the visitor as a subject. In embodiments, the machine learning system analyzes facial expressions and body language cues to predict the sentiment of the visitor. In embodiments, the information technology platform further comprises: a camera in selectable communication with the server via the network, the camera to capture video or still images of the visitor. In embodiments, the camera is located in the mobile device. In embodiments, the camera is affixed to a location to capture the video or still images of the visitor when the visitor is at a predetermined location within the non-profit venue.

An aspect provided herein includes an information technology platform for personalizing an experience of a visitor at a non-profit venue, the platform comprising: a network; a server in communication with the network; a mobile device to be carried by the visitor, the mobile device in communication with the server via the network, wherein the platform determines personalized information about the visitor; a recommendation engine included in the server, wherein the recommendation engine is to receive the personalized information about the visitor and to output a suggestion for a personalized experience for the visitor, wherein the platform conveys the suggestion for the personalized experience to the visitor, wherein the personalized experience is to encourage philanthropic activity; and a machine learning system for learning on a training set of data, the learning to train the machine learning system to predict a personal philanthropic interest of the visitor based on the personalized information about the visitor. In embodiments, the information technology platform further includes an interface on the mobile device to receive personalized philanthropic interest data regarding the visitor, wherein the mobile device communicates the personalized philanthropic interest data to the machine learning system as at least part of the personalized information about the visitor. In embodiments, the personalized information about the visitor is determined at least in part by tracking an interaction of the visitor with an exhibit in the venue. In embodiments, tracking the interaction includes tracking a dwell time of the visitor at a location within the non-profit venue. In embodiments, the personalized information about the visitor is determined at least in part by processing social media information of the visitor based on an identity of the visitor.

An aspect provided herein includes an information technology platform for personalizing an experience of a visitor at a non-profit venue, the platform comprising: a network; a server in communication with the network; a mobile device to be carried by the visitor, the mobile device in communication with the server via the network, wherein the platform determines personalized information about the visitor; a recommendation engine included in the server, wherein the recommendation engine is to receive the personalized information about the visitor and to output a suggestion for a personalized experience for the visitor, wherein the platform conveys the suggestion for the personalized experience to the visitor, wherein the personalized experience is to encourage philanthropic activity; and a machine learning system for learning on a training set of data, the learning to train the machine learning system to predict a donation classification of the visitor based on the personalized information about the visitor, wherein the donation classification of the visitor is based, at least in part, on a capacity of the visitor to donate or a propensity for the visitor to donate. In embodiments, the information technology platform further includes an interface on the mobile device to receive personalized philanthropic interest data regarding the visitor, wherein the mobile device communicates the personalized philanthropic interest data to the machine learning system as at least part of the personalized information about the visitor. In embodiments, the personalized information about the visitor is determined at least in part by tracking an interaction of the visitor with an exhibit in the venue. In embodiments, tracking the interaction includes tracking a dwell time of the visitor at a location within the non-profit venue. In embodiments, the personalized information about the visitor is determined at least in part by processing social media information of the visitor based on an identity of the visitor.

An aspect provided herein includes an information technology platform for personalizing an experience of a visitor at a non-profit venue, the platform comprising: a network; a server in communication with the network; a mobile device to be carried by the visitor, the mobile device in communication with the server via the network, wherein the platform determines personalized information about the visitor; a recommendation engine included in the server, wherein the recommendation engine is to receive the personalized information about the visitor and to output a suggestion for a personalized experience for the visitor, wherein the platform conveys the suggestion for the personalized experience to the visitor, wherein the personalized experience is to encourage philanthropic activity; and a machine learning system for learning on a training set of data, the learning to train the machine learning system to predict a recommended donation amount for the visitor based on the personalized information about the visitor. In embodiments, the information technology platform further includes an interface on the mobile device to receive personalized philanthropic interest data regarding the visitor, wherein the mobile device communicates the personalized philanthropic interest data to the machine learning system as at least part of the personalized information about the visitor. In embodiments, the personalized information about the visitor is determined at least in part by tracking an interaction of the visitor with an exhibit in the venue. In embodiments, tracking the interaction includes tracking a dwell time of the visitor at a location within the non-profit venue. In embodiments, the personalized information about the visitor is determined at least in part by processing social media information of the visitor based on an identity of the visitor.

An aspect provided herein includes an information technology platform for personalizing an experience of a visitor at a non-profit venue, the platform comprising: a network; a server in communication with the network; a mobile device to be carried by the visitor, the mobile device in communication with the server via the network, wherein the platform determines personalized information about the visitor; a recommendation engine included in the server, wherein the recommendation engine is to receive the personalized information about the visitor and to output a suggestion for a personalized experience for the visitor, wherein the platform conveys the suggestion for the personalized experience to the visitor, wherein the personalized experience is to encourage philanthropic activity; and an analytics system to predict a personalized philanthropic potential for the visitor based on the personalized information about the visitor. In embodiments, the information technology platform further includes an interface on the mobile device to receive personalized philanthropic interest data regarding the visitor, wherein the mobile device communicates the personalized philanthropic interest data to the analytics system as at least part of the personalized information about the visitor. In embodiments, the personalized information about the visitor is determined at least in part by tracking an interaction of the visitor with an exhibit in the venue. In embodiments, tracking the interaction includes tracking a dwell time of the visitor at a location within the non-profit venue. In embodiments, the personalized information about the visitor is determined at least in part by processing social media information of the visitor based on an identity of the visitor.

Methods and systems provided herein include methods and systems for developing content for personalized non-profit venue experiences using a mobile device, including providing an interface for management of a set of multimedia assets; receiving a mapping of multimedia assets to a set of locations on a site plan for the venue; receiving topical metadata for the set of multimedia assets; receiving personalized interest data indicating personal philanthropic interests of a visitor to the venue; and applying a machine learning algorithm to analyze the metadata and the personalized interest data to provide a selection of multimedia assets from the set of multimedia assets for consumption by the visitor. In embodiments, the venue is at least one of a museum and a zoo. In embodiments, the selection of multimedia assets is provided as a sequence of locations as a route based on the locations of the multimedia assets on the site plan. In embodiments, the personal philanthropic interests of the visitor are determined at least in part by providing an interface on the mobile device for receipt of personalized philanthropic interest data for the visitor to the venue when the visitor uses the mobile device. In embodiments, the personal philanthropic interests of the visitor are determined at least in part by tracking an interaction of the visitor with an exhibit in the venue. In embodiments, tracking the interactions include tracking a dwell time of the visitor at a location on the site plan. In embodiments, the personal philanthropic interests of the visitor are determined at least in part by processing social media information of the visitor based on an identity of the visitor. In embodiments, the machine learning algorithm assembles a sequence of multimedia assets based at least in part on the personal route taken by the visitor through the site plan for the venue. In embodiments, the machine learning algorithm assembles a sequence based at least in part on selections made by the visitor on a mobile computing device. In embodiments, at least one of the set of multimedia assets is interactive.

In embodiments, at least one of the interactive multimedia assets is configured to initiate tracking of at least one of an audio, visual, tactile, and movement action of the visitor by the mobile computing device when the visitor comes within a defined proximity to the multimedia asset. In embodiments, the interface for management further provides an interface for creating a campaign wherein information about a campaign is displayed at a location of a multimedia asset, wherein the multimedia asset is related to the campaign. In embodiments, the information about the campaign is to enable a multimedia interaction to promote the campaign in response to the mobile device being detected in proximity to the multimedia asset, and wherein the visitor uses mobile device. In embodiments, the multimedia interaction is selected from the group consisting of audio conferencing, video conferencing, virtual reality conferencing, collaborative text chat, holographic conferencing, and combinations thereof. In embodiments, the interface for management further provides a heat map showing paths of a plurality of visitors through the venue. In embodiments, the interface for management further provides an interface for creating an interactive campaign related to a location on the site plan.

An aspect provided herein includes an information technology platform for personalizing an experience of a visitor at a non-profit venue, the platform comprising: a network; a server in communication with the network; a mobile device to be carried by the visitor, the mobile device in communication with the server via the network, wherein the platform determines personalized information about the visitor; and a recommendation engine included in the server, wherein the recommendation engine is to receive the personalized information about the visitor and to output a suggestion for a personalized experience for the visitor, wherein the platform conveys the suggestion for the personalized experience to the visitor, wherein the personalized experience is to encourage philanthropic activity. In embodiments, the platform further comprises: a ticketing system to generate credentials for authorizing entry of the visitor into the venue. In embodiments, the credentials are selected from the group consisting of passcodes, tangible media tokens, E-tickets, mobile tickets, biometric data, behavioral data and combinations thereof. In embodiments, the mobile tickets are selected from the group consisting of a mobile barcode, a QR code, an Aztec barcode, Near Field Communication (NFC), Bluetooth low energy and combinations thereof. In embodiments, the credentials are delivered to the visitor via mail, e-mail, text message, or a mobile application. In embodiments, the credentials are presented to the platform by transferring the tangible media token, electronic communication, display, biological presence or behavioral manifestation of the visitor. In embodiments, the biometric data is selected from the group consisting of a biological image; a fingerprint; genetic data; a palm print; palm veins; an iris image; a retina image; a scent; heart rhythm; and voice data. In embodiments, the behavioral data is selected from the group consisting of a gesture, typing rhythm, gait and combinations thereof.

In embodiments, the information technology platform further comprises: a mobile application for accessing the platform by the visitor or by a prospective visitor. In embodiments, the information technology platform further comprises: a web client for accessing the platform by the visitor or by a prospective visitor. In embodiments, the information technology platform further comprises: an application programming interface. In embodiments, the information technology platform further comprises: a software development kit for creating applications for the platform.

In embodiments, the information technology platform further comprises: a management system for managing the platform. In embodiments, the information technology platform further comprises: a management interface for accessing the management system. In embodiments, the management interface is for creating an interactive campaign; information about the campaign is displayed at multiple locations or sites via the management interface; the information about the campaign is displayed simultaneously at the multiple locations or sites; and participants at the multiple locations interact or participate in real-time communication via the management interface. In embodiments, a form of the real-time communication is selected from the group consisting of audio conferencing, video conferencing, virtual reality conferencing, augmented reality conferencing, collaborative text chat, collaborative editing and holographic conferencing. In embodiments, the management interface provides a heat map showing paths of a plurality of visitors through the venue. In embodiments, the management interface is for creating multiple templates of multimedia asset selections or sequences. In embodiments, the management interface is for creating interactive campaigns related to locations in a site plan. In embodiments, the management interface is for associating a live feed of multimedia to a site plan. In embodiments, the management interface is for creating interactive campaigns and displaying multimedia relating to the degree of progress towards a goal in the interactive campaign. In embodiments, the management interface is for designing interactive content. In embodiments, a development of different assets for location-based kiosks and mobile applications is performed via the management interface. In embodiments, content for different museum locations is developed simultaneously via the management interface.

In embodiments, the information technology platform further comprises a monitoring system. In embodiments, the information technology platform further comprises a reporting system. In embodiments, the visitor has a sponsor; and the reporting system automatically queries the visitor and requests an update on participation in a campaign. In embodiments, the campaign has specific actions; and the reporting system queries the visitor whether the visitor has completed the specific actions. In embodiments, the visitor is automatically subscribed to an ongoing email or push-messaging update about a status of the campaign. In embodiments, the ongoing email or push-messaging update is delivered to the sponsor and the ongoing email or push-messaging update includes a specific update regarding the visitor, including a status of completion of the specific actions.

In embodiments, the information technology platform further comprises a communication system for electronic communication among the visitor, other visitors, venue employees, and campaign representatives.

In embodiments, the information technology platform further comprises a social networking system for digital communication between the visitor and other visitors, and for sharing information or media related to the venue or to a campaign. In embodiments, the social networking system includes a search engine for the visitor to search for information related to the venue or to the campaign. In embodiments, the visitor is a potential donor to a philanthropic cause; and the social networking system is further for connecting the visitor to the philanthropic cause; and the social networking system includes a search engine to search for a philanthropic cause or a donor.

In embodiments, the information technology platform further comprises a rating and review system for visitors to assign a rating value or to enter a review including a text or media for the venue, an exhibit or point of interest. In embodiments, the information technology platform further comprises a collaborative filtering system. In embodiments, the collaborative filtering system is to find campaigns, exhibits, projects, or other items that are of interest to the visitor or of shared interest to a plurality of visitors. In embodiments, the collaborative filtering system solicits input from the visitor about a level of interest held by the visitor over a particular topic to determine likely interest in an other topic, wherein the other topic includes a particular exhibit or campaign to be presented to the visitor or the other visitors as a visiting opportunity or as an opportunity for donation or other philanthropic activity.

In embodiments, the information technology platform further comprises a rewards system for rewarding a rewardable behavior of the visitor with a reward. In embodiments, the rewardable behavior is selected from the group consisting of: viewing an exhibit, object, location, or attraction; viewing multimedia; capturing a photo; augmenting a photo; capturing a video; augmenting a video; games activity; referral activity; visiting the venue; sharing to social media; participating in endorsement; rating or reviewing the exhibit, object, location, or attraction; social network check-in; providing user data including demographic data, interest data, philanthropic history data or contact data; answering questions related to an exhibit or object; retail purchases; refreshment purchases; ticket purchases; donations; viewing campaign information; campaign-related activity; using venue-provided devices including wearables and sensors; and combinations thereof.

In embodiments, the reward is selected from the group consisting of: authorization to skip a queue; a discount or a free pass to the venue or an other venue; access to exclusive information or multimedia; access to exclusive exhibits or objects; free or discounted augmented photographs or videos; free or discounted retail items; free or discounted refreshment items; free or discounted parking; game points or game-related rewards; and combinations thereof. In embodiments, the rewards system includes a software product for executing a program on the mobile device which when executed performs the methods of: analyzing a path of the visitor taken through the venue based on data from a set of tracking systems; recording interactions of the visitor with specific exhibits that are associated with an ongoing campaign; retrieving target locations and multimedia hints from the platform; displaying the hints on the mobile device; confirming that the visitor has arrived at a target location; and providing a reward notification to the visitor in response to the confirming that the visitor has arrived at the target location.

In embodiments, the information technology platform further comprises an augmented reality system for superimposing a computer-generated image on a visitor's view of a location, thereby causing the visitor to perceive a composite view including information related to the location. In embodiments, the information technology platform further comprises a virtual reality system.

BRIEF DESCRIPTION OF THE FIGURES

In the accompanying figures, like reference numerals refer to identical or functionally similar elements throughout the separate views and together with the detailed description below are incorporated in and form part of the specification, serve to further illustrate various embodiments and to explain various principles and advantages all in accordance with the systems and methods disclosed herein.

Figure 1A:
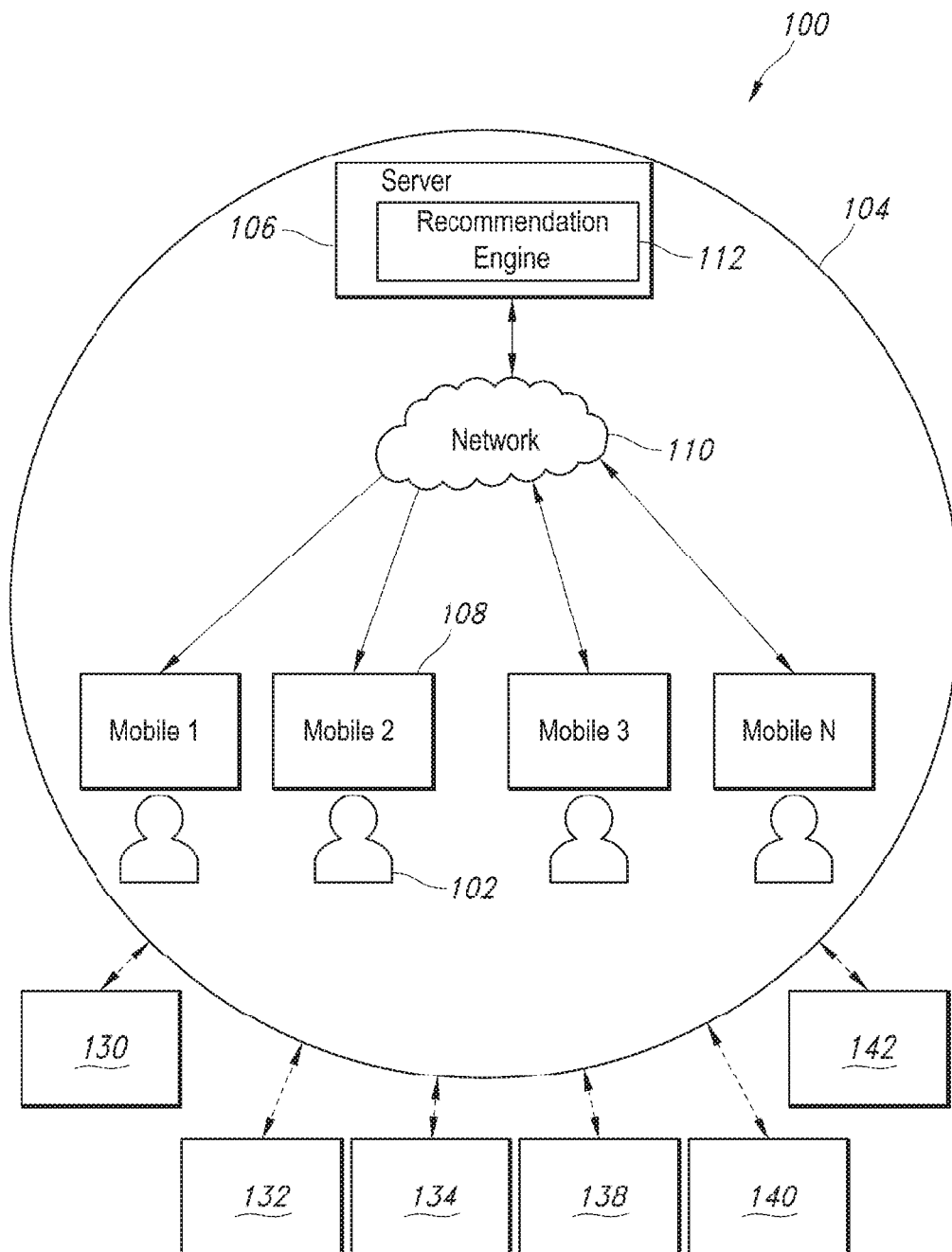
FIG. 1A is a diagrammatic view that depicts a network computing environment exemplary system architecture for personalizing experiences of visitors at a venue including museum, zoo or other non-profit venues in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the many embodiments of the systems and methods disclosed herein.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein.

Rather, the embodiments are provided so that this disclosure will be thorough and will fully convey the concept of the disclosure to those skilled in the art. The claims should be consulted to ascertain the true scope of the disclosure.

Before describing in detail embodiments that are in accordance with the systems and methods disclosed herein, it should be observed that the embodiments reside primarily in combinations of method and/or system components. Accordingly, the system components and methods have been represented where appropriate by conventional symbols in the drawings, showing only those specific details that are pertinent to understanding the embodiments of the systems and methods disclosed herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth, except where the context clearly indicates otherwise.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one skilled in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly stated otherwise. The term "set" should be understood to encompass a set with a single member or a plurality of members.

FIG. 1A provides a schematic diagram outlining the network computing environment with various information technology components, sub-components, circuits, modules, blocks, systems, sub-systems, software, methods, services, processes, and other elements for implementing one or more exemplary embodiments of the methods and systems of the current disclosure, collectively referred to in some cases herein as the "information technology platform 100," the "platform" or the system. The information technology platform 100 enables experiences of visitors 102 (referred to in the alternative herein as guests, customers, users, or the like) at venues 104, such as non-profit venues 104, including museums, zoos, exhibitions, parks and the like. The information technology platform 100 may have functions that include creating and presenting personalized experiences for visitors 102, such as based on personalized information of the visitors 102, interests or other aspects of an individual profile for a visitor 102, including philanthropic interests that may relate to the venue or to one or more exhibits, projects, or other activities of the venue 104. The information technology platform 100 may, in particular, facilitate interactions of visitors 102 to a non-profit venue 104 that encourage philanthropic activity, such as donations to support particular activities, projects, items, exhibitions, or the like of the non-profit venue.

In embodiments, the information technology platform 100 may include a server 106 in communication with a network 110. The server 106 is in communication with a mobile device 108 via the network 110. The mobile device 108 is to be carried by the visitor 102, and communicate with the network 110, for example, to determine a context, location and other personalized information about the visitor 102. The personalized information about the visitor 102 may then be provided as an input, such as in the form of a visitor vector, a visitor profile, a set of visitor attributes, a visitor object, or the like, to a recommendation engine 112 in server 106. An output of the recommendation engine 112 may be for example, a suggestion for a personalized experience for the visitor 102. Examples of the venue 104 include a museum 130, a zoo 132, an exhibition 134, a park 138, a temporary venue 140, a retrofit installation 142, and the like.

FIG. 1A depicts a plurality of mobile devices 108, and a plurality of visitors 102, and a single server 106. It is to be understood that the information technology platform 100 disclosed herein may include a single server 106, or a plurality of servers 106; a single mobile device 108, or a plurality of mobile devices 108; and a single visitor 102, or a plurality of visitors 102.

The information technology platform 100 may for example be to recommend, to a visitor 102, various exhibits in a venue 104 based on one or more measures related to the locations visited by the visitor 102 within the venue 104, such as an amount of time the visitor 102 has spent within specific sections of the venue. An amount of time spent in proximity to a particular exhibit, interactions of a visitor 102 with one or more features of an exhibit, interactions of one or more visitors 102 with a mobile application or mobile device that has content related to the venue or an exhibit, one or more affirmative indications of interest (such as a survey of the visitor 102) or other measure that may indicate interest in a particular topic, exhibit, project, or activity. A more extensive interaction may be detected when the visitor spends the most time in proximity to an exhibit, spends relatively more time obtaining additional information, indicates a most favorable response to a survey question, or a combination of the above. References to interactions, and to threshold levels of interactions, should be understood to encompass these and other measures of interactions or interest of a visitor 102 with a venue 104, with particular items within a venue 104, within locations of a venue 104, with content related to a venue (or items in it), with a project, with a topic, or the like. In at least one example, if a visitor 102 is interested in impressionist art, as evidenced by spending time looking at impressionist paintings in a museum, the information technology platform 100 may recommend different sections within the venue or another venue that contains paintings by various impressionist artists. In embodiments, information technology platform 100 may automatically identify and recommend donation or gifting opportunities based on the personalized interests of visitor 102, such as by presenting the opportunity to donate to an art restoration project for an item of impressionist art that needs restoration. It will be apparent that a wide range of personalized experiences could be provided to visitors 102 including but not limited to personalized recommendations, campaign participation opportunities, improved photography or videography services, personalized multimedia content, campaign sharing or creation opportunities, multi-venue coordination and so on.

In embodiments, a mobile device 108 can include a mobile computing device 108. The mobile computing device 108 can include a smartphone, a tablet computer, a notebook computer, a personal digital assistant (PDA), or another type of computation or communication device that can be carried or worn by a visitor 102. The server 106 may include a file server, domain server, internet server, intranet server, cloud server, print server and other variants such as secondary server, host server, distributed server and the like. The server may provide an interface to other devices including, without limitation, clients, other servers, printers, database servers, print servers, file servers, communication servers, distributed servers, social networks, and the like. The network 110 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks, and Worldwide Interoperability for Microwave Access (WiMAX) networks.

As disclosed herein, the information technology platform 100 may further include a ticketing system 111 to generate credentials for authorizing entry of the visitor 102 into the venue 104. In embodiments, the credentials are selected from the group consisting of passcodes, tangible media tokens, E-tickets, mobile tickets, biometric data, behavioral data and combinations thereof. In embodiments, the mobile tickets are selected from the group consisting of a mobile barcode, a QR code, an Aztec barcode, Near Field Communication (NFC), Bluetooth low energy and combinations thereof. In embodiments, the credentials are delivered to the visitor 102 via mail, e-mail, text message, or a mobile application. In embodiments, the credentials are presented to the platform by transferring the tangible media token, electronic communication, display, biological presence or behavioral manifestation of the visitor. In embodiments, the biometric data is selected from the group consisting of a biological image; a fingerprint; genetic data; a palm print; palm veins; an iris image; a retina image; a scent; heart rhythm; and voice data. In embodiments, the behavioral data is selected from the group consisting of a gesture, typing rhythm, gait and combinations thereof.

Figure 1B:
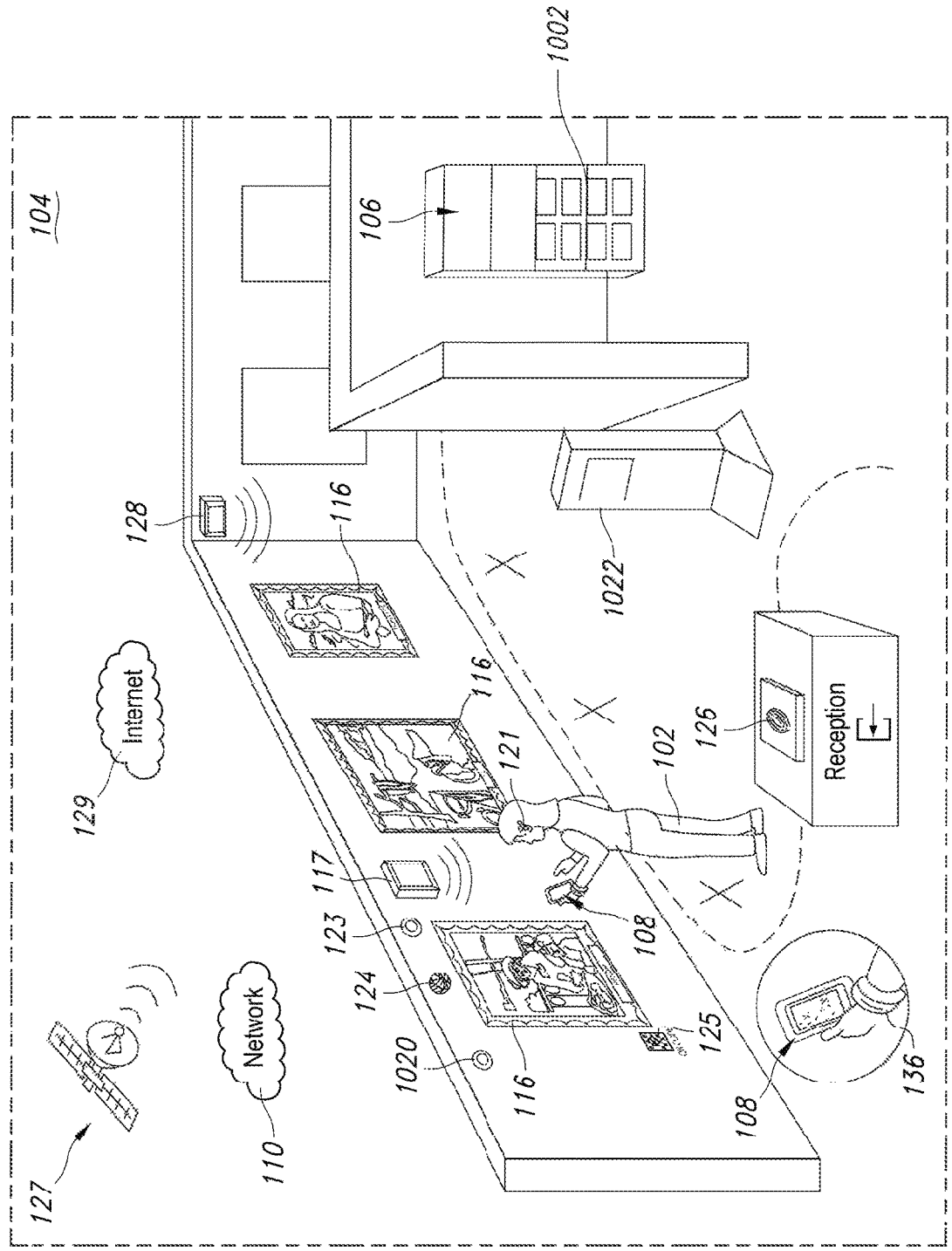
FIG. 1B is a perspective view that depicts examples of a visitor showing interest in a particular exhibit at a venue while an interaction of the visitor with the exhibit is monitored in accordance with the present disclosure.

FIG. 1B is a perspective view that depicts an example of a visitor 102 showing interest in a particular exhibit 116 at a venue 104 while an interaction of the visitor 102 with the exhibit 116 is monitored. In the example depicted in FIG. 1B, the venue 104 is an art museum. An RF beacon 117 and the mobile computing device 108 carried by the visitor 102 work together as part of a path tracking system 114 (see FIG. 10). The path tracking system may also include a global positioning system (GPS) 127 or an indoor positioning system (IPS) 128. The path tracking system 114 reports through the network 110 that the visitor 102 has stopped and waited in front of the exhibit 116 shown in FIG. 1B. In the example depicted in FIG. 1B, the visitor 102 is stopping and waiting in front of, for example, a painting titled "Two Sisters (On the Terrace)" by Pierre-Auguste Renoir, an example of impressionism from about the year 1881. The interaction tracking system 115 receives the report from the path tracking system 114 via the network 110 that the visitor 102 has stopped and waited. The interaction tracking system 115 determines that visitor 102 has shown an interest in the exhibit 116, for example, by determining that the dwell time exceeds a threshold. The server 106 combines the information from the interaction tracking system 115 with venue data 1008 (see FIG. 10) stored on the database 202 to generate personalized information relating to the visitor 102. In an example, the venue data 1008 may include that the exhibit "Two Sisters (On the Terrace)" is an example of impressionism. An example of the personalized information may be that the visitor 102 shows an interest in impressionism. Personalized information can be gathered from the camera 1020, an IR camera 123, a microphone 124, a fingerprint scanner 126, and/or wearable devices including a Bluetooth earpiece 121 and a smart watch or fitness wearable 136. A fitness wearable 136 may be a wrist band, chest strap, arm band, head band, helmet, eyeglass frame, finger ring, glove, pulse oximeter, or any other device that can be temporarily or permanently connected to the visitor for monitoring a biological signal or location of the visitor 102. Examples of biological signals may be from physiological activity including muscular contraction (such as heart beat or respiration). Fitness wearables 136 can monitor temperature, pulse, blood pressure, electrical resistance of the skin surface (potentially related to perspiration), and the like. It is to be understood that the depictions in FIG. 1B of examples of the various electronic devices such as the camera 1020, IR camera 123, microphone 124, and various wearable devices are not limitative in quantity, location, or configuration. For example, cameras, microphones, and sensors can be located at each exhibit throughout the venue 104. In examples, the cameras, microphones, and other sensors may be configured to be smaller than shown. Some CCD cameras and miniature microphones may be nearly visually undetectable to the casual observer. The RF beacon and other transmitters or receivers may share functionality with other items such as smoke detectors, emergency lights, wall plates, directional signage, or informational placards. Such electronic devices may be hidden behind fasciae, 2-way mirrors, or other devices for concealing the electronic devices. After the visitor 102 has been identified, any personal information accessible on the internet 129 may be collected and used by the platform. The personalized information is reported to a recommendation engine 1030 (FIG. 10) or 112 (FIG. 1A). The recommendation engine 112 may be in the server 106. Using results of the recommendation engine, a personalized recommendation may be made via the mobile computing device 108 carried by the visitor 102. For example, the mobile computing device 108 may present a map to certain other exhibits 116 that are examples of impressionism. FIG. 1B includes an inset view showing the mobile computing device 108 in the left hand of the visitor 102. The inset view is enlarged to show that a map is displayed on the display screen of the mobile computing device 108. The inset view also shows that the visitor 102 is wearing a fitness wearable 136; in FIG. 1B, the fitness wearable 136 is a fitness wrist band. A call-to-action to visitor 102 to donate to restoration of the frame for a painting by impressionist Claude Monet may be communicated to the visitor 102. Thus examples of the information technology platform 100 disclosed herein may enhance an experience of the visitor 102 by directing the visitor 102 to exhibits similar to an exhibit which the visitor 102 has shown an interest. Further, examples of the information technology platform 100 do not waste resources or visitor time and good will by presenting a campaign in which the visitor has a lower relative interest.

In embodiments, the mobile computing device 108 carried by the visitor 102 can communicate with one or more wireless beacons or tracking systems proximate to the venue 104 while the visitor 102 is queueing to enter the venue 104. In other words, communication between the mobile computing device 108 and the system 100 can begin before the visitor 102 enters the venue 104. For example, when the visitor 102 is in a vehicle (not shown), the mobile computing device 108 may communicate the location and speed of the visitor 104. Such information may be used by the system to facilitate a quick and easy entry into the venue 104. The visitor 102 may be more philanthropically inclined after having been welcomed by name without having to wait in a queue. It is also possible for the system 100 to use a camera at the parking lot to recognize the visitor's vehicle based on a license plate and data from a previous visit. The system 100 may use a face recognition module 1040 (see FIG. 10) to identify the visitor 102 as the visitor 102 approaches the venue 104. The system 100 may include a provisioning module 1050 (see FIG. 10) for activating a portable digital guide. Thus, the venue 104 can supply the portable digital guide pre-loaded with capabilities that may not be available on the mobile phone carried by the visitor 102. The system 100 may include an entry module running on a portable device for identifying and checking in visitors. The system 100 can further include a notification module 1048 for notifying venue workers about the expected arrival of the visitor 102. The notification module 1048 is to automatically notify the provisioning module 1050 to provision an available digital guide by pre-filling the available digital guide with personalized visitor information, and to notify at least one of the venue workers to retrieve the digital guide and to meet the visitor 102 at an entry location where the visitor 102 is expected to enter the venue 104.

Figure 2:
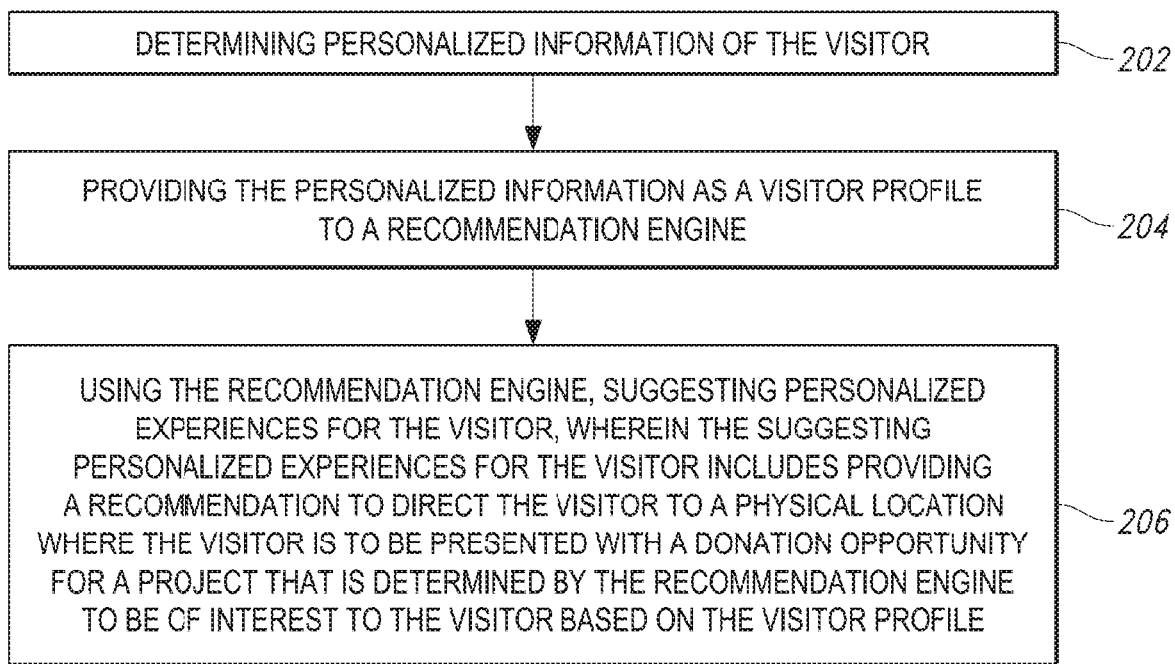
FIG. 2 is a diagrammatic view that depicts methods for personalizing the experience of a visitor at a venue such as a museum, zoo or other non-profit venues in accordance with the present disclosure.

FIG. 2 illustrates methods and systems for personalizing the experience of a visitor at a venue 104 such as a museum, zoo or other non-profit venue that displays results of a plurality of projects supported by philanthropy in accordance with embodiments of the systems and methods disclosed herein. At 202, personalized information of a visitor 102 is determined including context, location and other such personalized information. At 204, such personalized information is provided as a visitor profile to a recommendation engine 112, such as a recommendation engine 112 enabled on the server 106. At 206, an output of the recommendation engine is used to suggest personalized experiences to the visitor 102 wherein the suggesting personalized experiences for the visitor 102 includes providing a recommendation to direct the visitor 102 to a physical location where the visitor 102 is to be presented with a donation opportunity for a project that is determined by the recommendation engine to be of interest to the visitor 102 based on the visitor profile.

Figure 3:
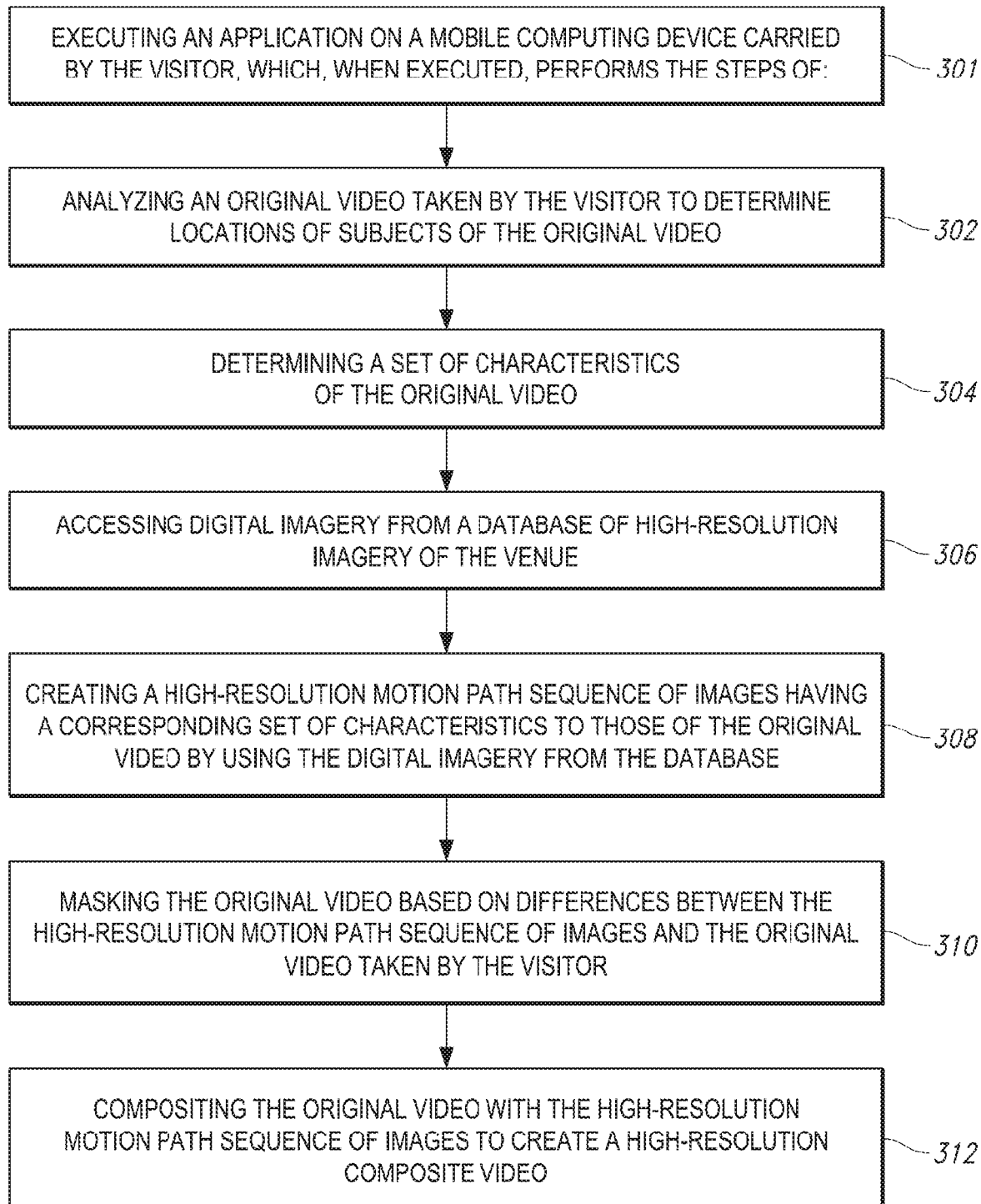
FIG. 3 is a diagrammatic view that depicts methods for augmenting a video taken by a visitor at a museum, zoo or other non-profit venue in accordance with the present disclosure.

FIG. 3 illustrates methods and systems for augmenting a video taken by a visitor at a museum, a zoo or other non-profit venue in accordance with embodiments of the systems and methods disclosed herein. At 301, the method includes "executing an application on a mobile computing device carried by the visitor, which, when executed, performs the steps of:" At 302, the method includes analyzing an original video taken by the visitor to determine locations of subjects of the original video. At 304, the method includes determining a set of characteristics of the original video. At 306, the method includes accessing digital imagery from a database of high-resolution imagery of the venue. At 308, the method includes creating a high-resolution motion path sequence of images having a corresponding set of characteristics to those of the original video by using the digital imagery from the database. At 310, the method includes masking the original video based on differences between the high-resolution motion path sequence of images and the original video taken by the visitor. At 312, the method includes compositing the original video with the high-resolution motion path sequence of images to create a high-resolution composite video. In embodiments, the high-resolution imagery includes a 3D model of the locations of the subjects. In embodiments, the high-resolution imagery contains 3-dimensional metadata. In embodiments, the high-resolution imagery includes video. In embodiments, the high-resolution imagery includes a light-field photographic image. In embodiments, the method further includes re-shading images of human subjects captured in the original video to blend with the high-resolution imagery from the database. In embodiments, the method further includes providing the high-resolution composite video to the visitor 102 on a website or within the application on the mobile computing device 108 carried by the visitor 102. In embodiments, the set of characteristics includes at least one of location, orientation, lighting, and motion path characteristics.

Figure 4:
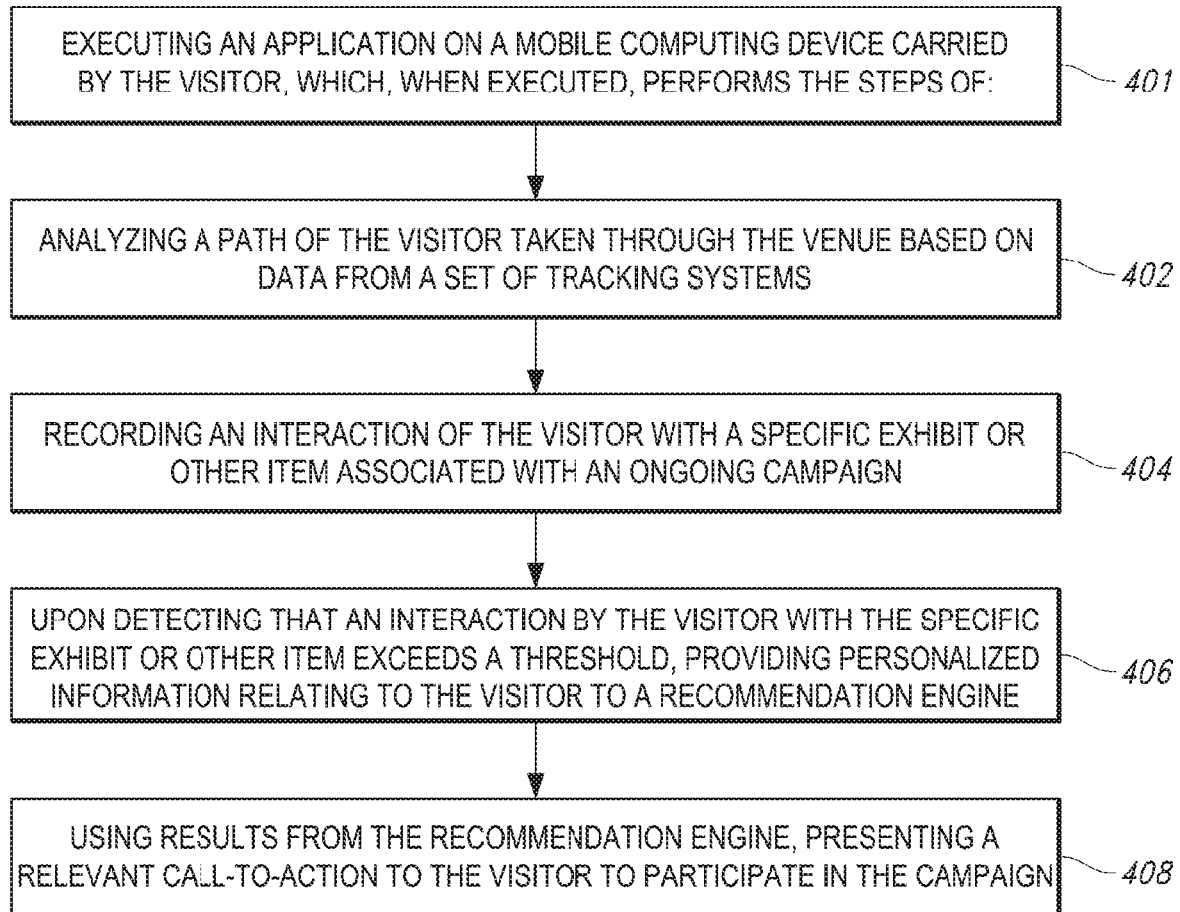
FIG. 4 is a diagrammatic view that depicts methods for personalizing an experience of a visitor at a venue, including presenting a campaign participation opportunity based on an interaction of the visitor with a specific exhibit in accordance with the present disclosure.

FIG. 4 illustrates methods and systems for personalizing an experience of a visitor at a venue. At 401, the method includes "executing an application on a mobile computing device carried by the visitor, which, when executed, performs the steps of:" At 402, the method includes analyzing a path of the visitor 102 taken through venue 104 based on data from a set of tracking systems. At 404, the method includes recording an interaction of the visitor 102 with a specific exhibit or other item associated with an ongoing campaign. Then, at 406, the method includes, upon detecting that an interaction by the visitor with the specific exhibit or other item exceeds a threshold, providing personalized information relating to the visitor to a recommendation engine. At 408, using results of the recommendation engine, presenting a relevant call-to-action to the visitor 102 to participate in the campaign. In embodiments, a software product running a program on the mobile computing device carried by visitor, when executed performs some or all of the methods disclosed. In embodiments, the personalized information includes a feature vector or visitor profile. In embodiments, the campaign is a charitable project selected from the group consisting of a translation project, a clean water project, an education project, a building project, a missionary project, a disaster relief project, a restoration project, an acquisition project, and combinations thereof. In embodiments, the call-to-action presented to the visitor is selected from the group consisting of a request for a donation, a request for a subscription, a request to share on social media, a request to provide metadata about the visitor 102 for display on an endorsement, a request to share the campaign with others, a request to be contacted further, a request to donate on behalf of another, a request to sponsor another campaign participant, and a request for sponsorship by another to participate in the campaign, and combinations thereof.

In embodiments, the recorded interaction of the visitor 102 with the specific exhibit or other item is analyzed based on a video taken of a face of the visitor 102. In embodiments, the interaction of the visitor 102 with the specific exhibit or other item is analyzed based on visual affect detection. As used herein, visual affect detection means detection of emotion or sentiment of a visitor 102 through analyzing facial expressions and/or body language. In embodiments, the call-to-action is presented in response to the visitor 102 requesting additional information about a campaign. In embodiments, the campaign has a set of goals, and the application shows a degree of achievement of the set of goals in a graphical form. In embodiments, the method further includes automatically subscribing the visitor 102 to an ongoing email or push-messaging update about a status of the campaign.

Figure 5:
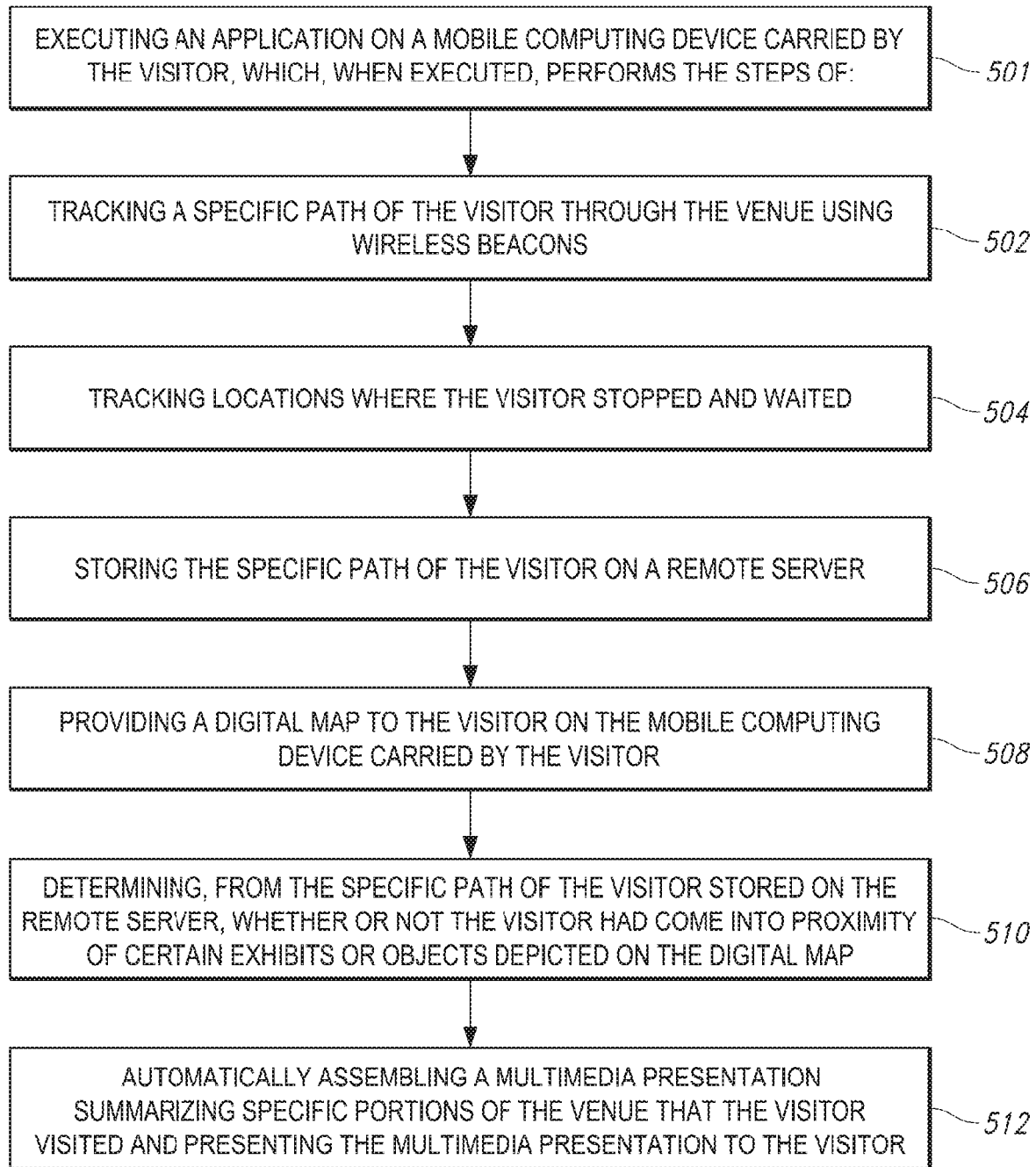
FIG. 5 is a diagrammatic view that depicts methods for providing supplemental media to the visitors of a museum, zoo or other non-profit venue based on their interaction in accordance with the present disclosure.

FIG. 5 illustrates methods and systems for providing supplemental media to a visitor at a non-profit venue. At 501, the method includes "executing an application on a mobile computing device carried by the visitor, which, when executed, performs the steps of:" At 502, the method includes tracking a specific path of the visitor 102 through the venue 104 wireless beacons. At 504, the method includes tracking locations where the visitor 102 stopped and waited. At 506, the method includes storing the specific path of the visitor 102 on a remote server 108. At 508, the method includes providing a digital map to the visitor on the mobile computing device 106 carried by the visitor 102. At 510, the method includes determining, from the specific path of the visitor stored on the remote server, whether or not the visitor had come into proximity of certain exhibits or objects depicted on the digital map. At 512, the method includes automatically assembling a multimedia presentation summarizing specific portions of the venue that the visitor 102 visited and presenting the multimedia presentation to the visitor. In embodiments, the supplemental media is provided by a software product running a program on the mobile device 108 carried by the visitor 102, which when executed performs of the method.

In some examples, the amount and type of information collected and presented in the multimedia presentation on particular topics may be aligned with the amount of time or the extent of interaction with items, such as exhibits, that correspond to those topics. For example, if a visitor 102 has spent less than a minute in front of most exhibits in a museum, but then spends ten minutes viewing a particular archeological artifact, then the multimedia presentation may be configured to provide media content related to the artifact, to the location where the artifact was discovered, to the culture represented by the artifact, to the era of the artifact, to the type of the artifact, or other sets of attributes of the artifact. Such information may be retrieved from a curated library of information for the items in a venue, as well as from external information sources, such as by configuring searches of public databases and data sources (including the internet) to retrieve additional information based on the attributes of the item of interest. In embodiments, the multimedia presentation may present information about a campaign, project or activity related to the item that is of interest, such as, in the examples of artifacts, information about an archeological dig that may benefit from philanthropic support by the visitor 102 or by a person known to the visitor 102. In embodiments, the multimedia presentation is presented in an application running on the mobile computing device 108 carried by visitor 102. In embodiments, the multimedia presentation is emailed to the visitor 102. In embodiments, the multimedia presentation is delivered on a kiosk in the venue. In embodiments, the multimedia presentation is in the form of an audio summary provided via a voice agent system. In embodiments, the multimedia includes additional information about the exhibits the visitor 102 visited that was not presented at those exhibits. Such information may include, for example, high-resolution imagery, video, captioning, textual data, live video feed, or donation information. In embodiments, the specific portions of the venue where the visitor 102 stopped and waited are added to a bookmark list. In embodiments, the multimedia presentation includes additional multimedia for the portions of the venue that the visitor visited. In embodiments, the method includes the step of automatically subscribing the visitor to an ongoing email or push-messaging update about a status of the specific portions of the venue on the bookmark list. In embodiments, the update includes information about additions, changes, an annotation by an other visitor, an observation by the other visitor, or an event regarding the specific portions of the venue on the bookmark list. In embodiments, a multimedia presentation for a visitor 102 is automatically updated after a visit, such as with additions, changes, updates or other events regarding the items of interest, as well as annotations or observations by other visitors 102 and the like. Updating may occur as a result of pushing information when updates occur to the media sources used to configure a multimedia presentation, or the information technology platform 100 may be configured to periodically pull information based on the content of a multimedia presentation that was configured to relate to the interest of the visitor 102 as reflected by interactions of the types described throughout this disclosure.

Figure 6:
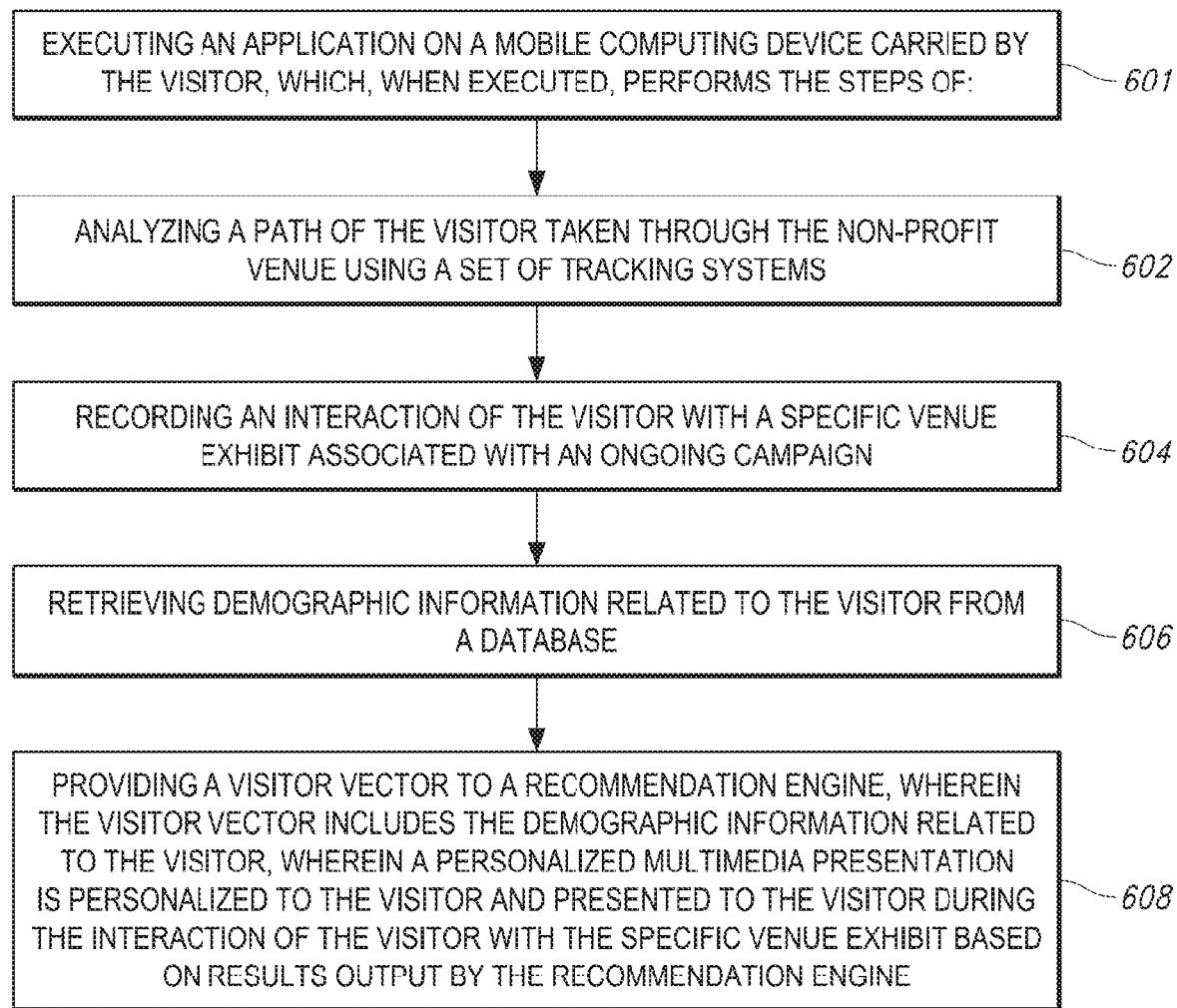
FIG. 6 is a diagrammatic view that depicts methods for providing a customized exhibit to a visitor of a museum, zoo or other non-profit venue based on an interaction of the visitor with a specific venue exhibit in accordance with the present disclosure.

FIG. 6 illustrates methods and systems for personalizing an experience of a visitor at a non-profit venue. As depicted at 601, the method includes "executing an application on a computing device, which, when executed, performs the steps of:" At 602, the method includes analyzing a path of the visitor taken through the non-profit venue using a set of tracking systems. Any suitable location or path tracking system may be used, for example, access points, NFC detectors, an indoor GPS system, or the like. At 604, the method includes recording an interaction of the visitor 102 with a specific venue exhibit associated with an ongoing campaign. At 606, the method includes retrieving demographic information related to the visitor from a database. In embodiments, demographic information may be obtained from other sources, such as social media pages of the visitor 102, as determined by the identity of the visitor 102, such as determined at the point of check-in, ticketing or the like for the visitor 102 for the venue. At 608, the method includes providing a visitor vector to a recommendation engine, wherein the visitor vector includes the demographic information related to the visitor, wherein a personalized multimedia presentation is personalized to the visitor and presented to the visitor during the interaction of the visitor with the specific venue exhibit based on results output by the recommendation engine. In embodiments, the personalized multimedia presentation is presented in an application running on a mobile computing device carried by the visitor 102 separately from the venue exhibit. In such an embodiment, the computing device is the mobile computing device carried by the visitor 102. In embodiments, the specific exhibit includes a kiosk that presents the personalized multimedia presentation. In embodiments, the personalized multimedia presentation displays a name of the visitor 102 or other information related to the visitor 102. In embodiments, the personalized multimedia presentation is personalized based on an education level, income level, language, developmental status, or age of the visitor 102. In embodiments, the developmental status of the visitor 102 indicates that the visitor 102 is a child. In embodiments, the visitor vector includes recorded visitor interaction data; the recorded visitor interaction data includes records of interactions of the visitor with a venue exhibit other than the specific venue exhibit; the recorded visitor interaction data demonstrates a degree of interest of the visitor in categories of information conveyed by the venue exhibit; the personalized multimedia presentation is personalized based on the categories of information in which the visitor has demonstrated a greater interest based on the recorded visitor interaction data from the interactions of the visitor with the venue exhibit other than the specific venue exhibit. In embodiments, the categories of information are selected from the group consisting of history, pictures, people, current activities and combinations thereof. In embodiments, the personalized multimedia presentation includes augmented reality.

Figure 7:
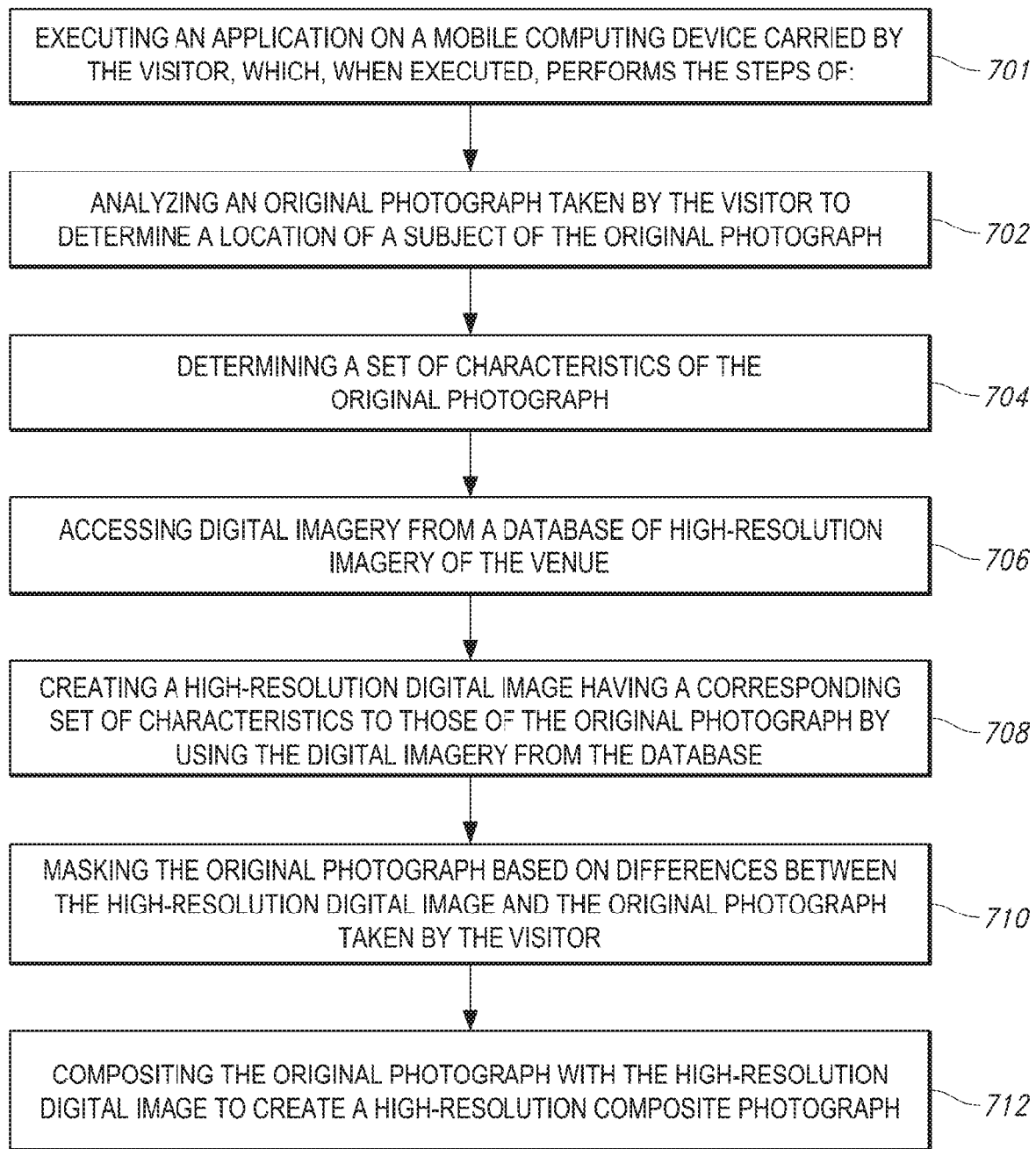
FIG. 7 is a diagrammatic view that depicts methods and systems for augmenting a photograph taken by the visitor at a museum, zoo or other non-profit venues in accordance with the present disclosure.

FIG. 7 illustrates methods and systems for augmenting a photograph taken by a visitor at a museum, zoo or other non-profit venue in accordance with embodiments of the present disclosure. As depicted at 701, the method includes "executing an application on a mobile computing device carried by the visitor, which, when executed, performs the steps of:" At 702, the method includes analyzing an original photograph taken by the visitor to determine a location of a subject of the original photograph. At 704, the method includes determining a set of characteristics of the original photograph. At 706, the method includes accessing digital imagery from a database of high-resolution imagery of the venue. At 708, the method includes creating a high-resolution digital image having a corresponding set of characteristics to those of the original photograph by using the digital imagery from the database. At 710, the method includes masking the original photograph based on differences between the high-resolution digital image and the original photograph taken by the visitor. At 712, the method includes compositing the original photograph with the high-resolution digital image to create a high-resolution composite photograph. In embodiments, the high-resolution imagery includes a 3D model of the location of the subject. In embodiments, the high-resolution imagery contains 3-dimensional metadata. In embodiments, the high-resolution imagery includes video. In embodiments, the high-resolution imagery includes a light-field photographic image. In embodiments, the method further includes reshading images of human subjects captured in the original photograph to blend with the high-resolution imagery from the database. In embodiments, the method further includes providing the high-resolution composite photograph to the visitor on a website or within the application on the mobile computing device carried by the visitor 102. In embodiments, the techniques of the method are utilized for augmenting videos taken by the visitor at a venue with professional videography and for creating synthetic videography.

Figure 8:
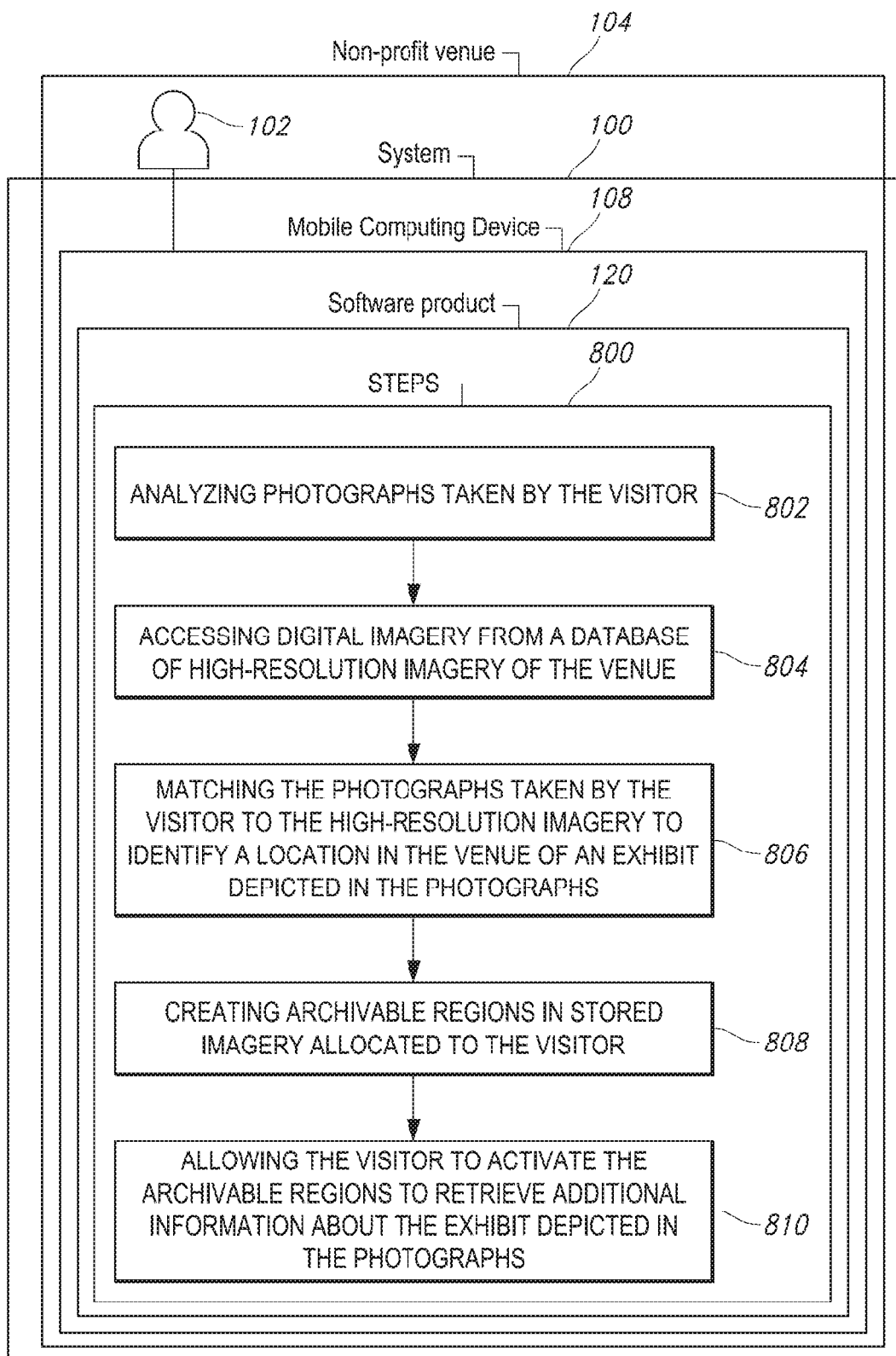
FIG. 8 is a diagrammatic view that depicts systems for providing supplemental media to a visitor at a museum, zoo or other non-profit venue in accordance with the present disclosure.

FIG. 8 illustrates methods and systems 100 for providing supplemental media to a visitor 102 at a non-profit venue 104 in accordance with embodiments of the systems and methods disclosed herein. In embodiments, the supplemental media is provided by a software product 120 running a program on the mobile computing device 108 carried by visitor 102, which when executed performs steps 800 of the method. At 802, the steps include analyzing photographs taken by the visitor 102. At 804, the steps include accessing digital imagery from a database of high-resolution imagery of the venue 104. At 806, the steps include matching the photographs taken by the visitor 102 to the high-resolution imagery to identify a location in the venue 104 of an exhibit depicted in the photographs. At 808, the steps include creating archivable regions in stored imagery allocated to the visitor 102. At 810, the steps include allowing the visitor 102 to activate the archivable regions to retrieve additional information about the exhibit depicted in the photographs. In embodiments, the additional information includes a call-to-action allowing the visitor 102 to participate in a fundraising campaign. In embodiments, the additional information includes a call-to-action allowing the visitor to share a fundraising campaign with an other visitor. In embodiments, the additional information includes a call-to-action allowing the visitor to provide personal information or a photograph to be shared in a virtual wall relating to the set of exhibits. In embodiments, the additional information is selected from the group consisting of high-resolution imagery, video, captioning, textual data, live video feed, donation information, and combinations thereof. In embodiments, the additional information includes suggestions of other exhibits popular with people who took photographs of the exhibit.

Figure 9A:
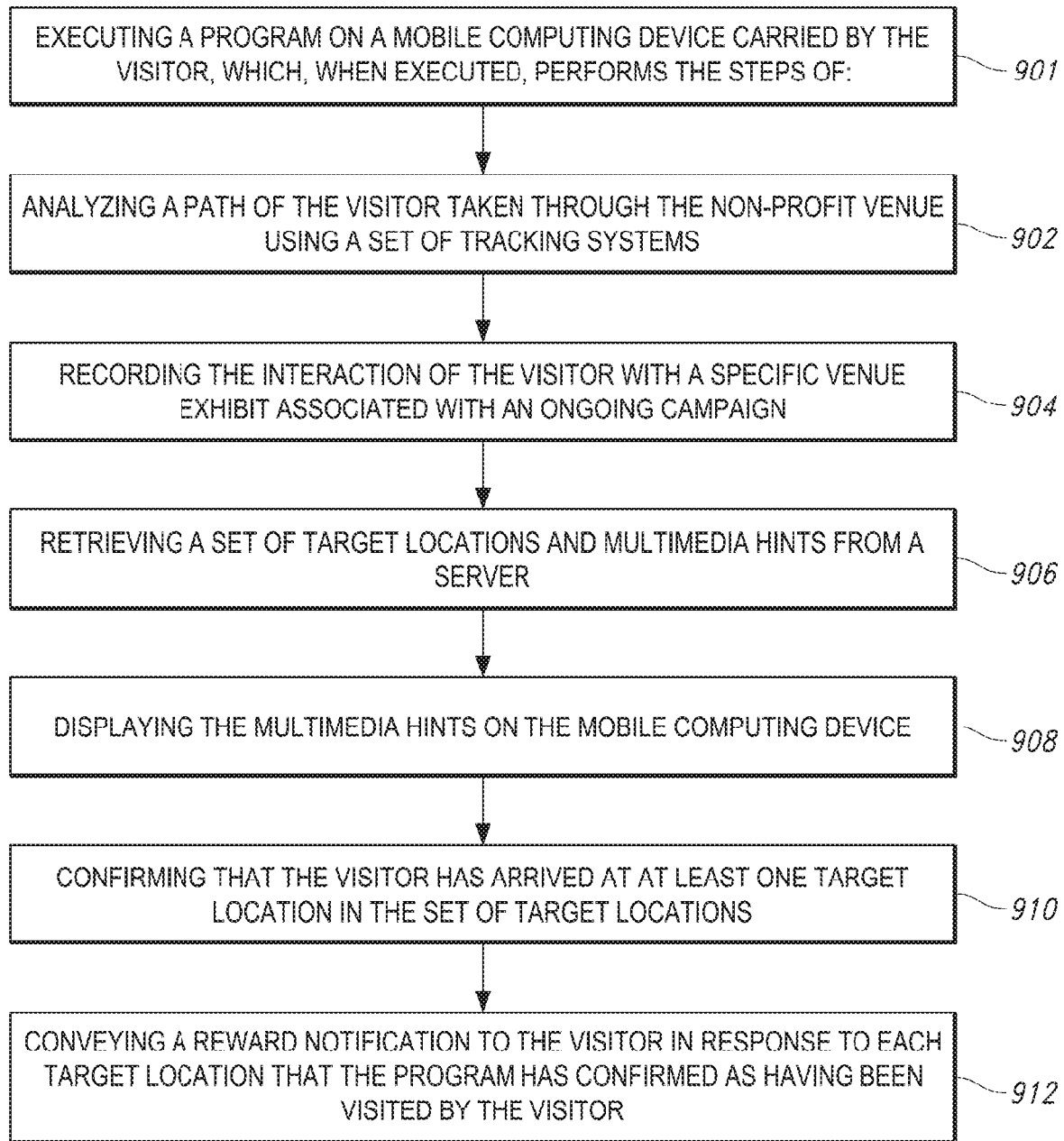
FIG. 9A is a diagrammatic view that depicts examples of a method for introducing a visitor of a museum, zoo or other non-profit venue to a new interactive experience through personalized gamification in accordance with the present disclosure.
Figure 15:
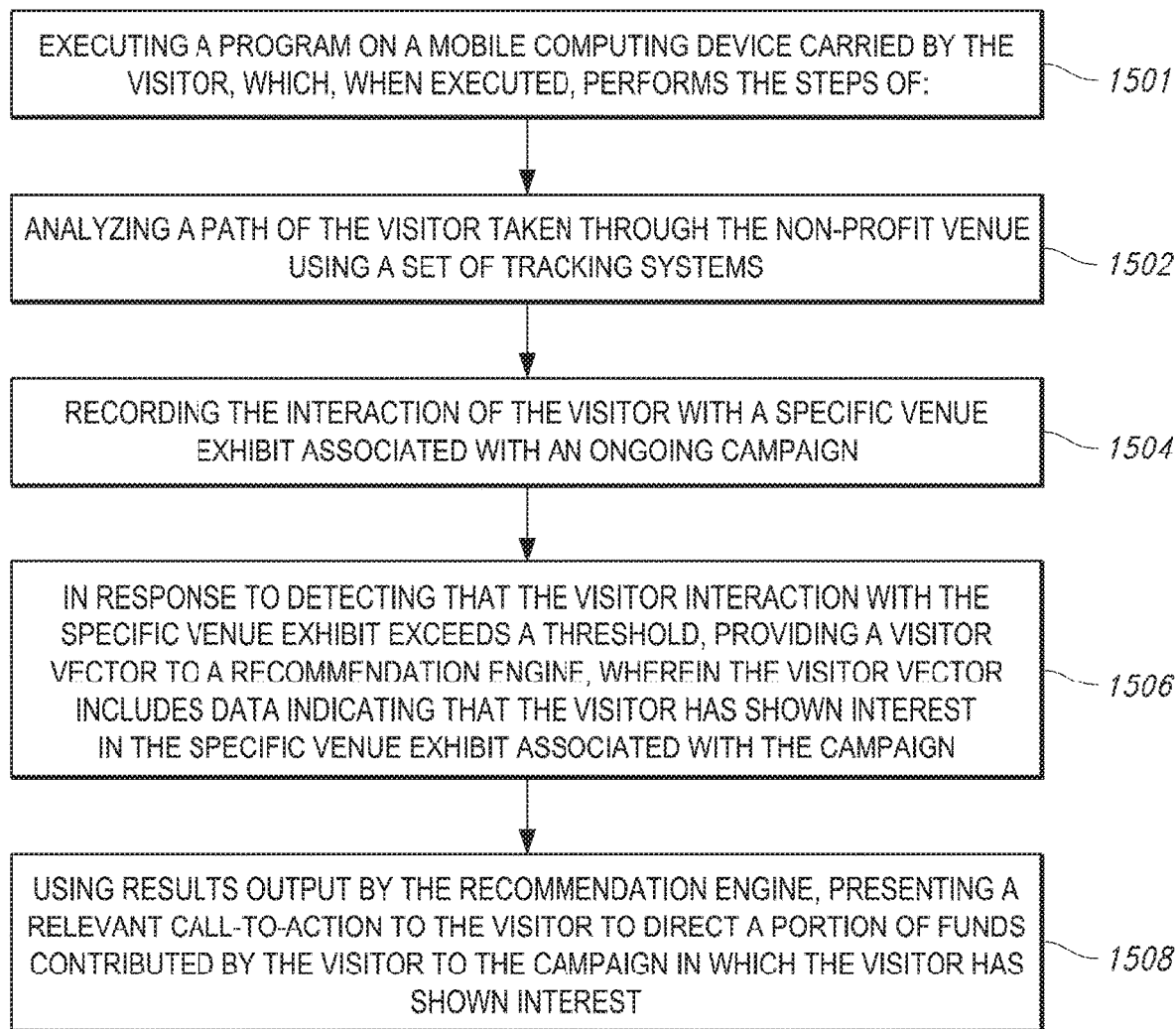
FIG. 15 is a diagrammatic view that depicts methods for providing visitors of a museum, zoo or other non-profit venue a campaign participation opportunity based on an interaction of the visitor with a specific venue exhibit in accordance with the present disclosure.

FIG. 9A illustrates methods and systems for providing a visitor to a non-profit venue a campaign participation opportunity based on an interaction of the visitor in accordance with embodiment of the present disclosure. In embodiments, the method may also be called "gamification". As depicted at 901, the method includes "executing a program on a mobile computing device carried by the visitor, which, when executed, performs the steps of:" At 902, the method includes analyzing a path of the visitor 102 taken through the non-profit venue 104 using a set of tracking systems. At 904, the method includes recording the interaction of the visitor 102 with a specific venue exhibit associated with an ongoing campaign. At 906, the method includes retrieving a set of target locations and multimedia hints from a server 106. At 908, the method includes displaying the multimedia hints on the mobile computing device 108. At 910, the method includes confirming that the visitor has arrived at at least one target location in the set of target locations and, at 912, the method includes conveying a reward notification to the visitor in response to each target location that the program has confirmed as having been visited by the visitor 102. It is to be understood that, although the steps in FIG. 9A are depicted in a sequence, the steps may occur in any possible order, and steps may be repeated. For example, the specific venue exhibit associated with an ongoing campaign (see step 904) may be the same as the at least one target location (see step 910). Thus, the systems and methods disclosed herein may use gamification to encourage the visitor 102 to interact with an exhibit associated with an ongoing campaign. As shown in FIG. 15 at 1506 and 1508, embodiments may include: in response to detecting that the visitor interaction with the specific venue exhibit exceeds a threshold, providing a visitor vector to a recommendation engine, wherein the visitor vector includes data indicating that the visitor has shown interest in the specific venue exhibit associated with the campaign; and, using results output by the recommendation engine, presenting a relevant call-to-action to the visitor 102. In embodiments, the confirming that the visitor has arrived at at least one target location in the set of target locations, further includes: conveying a question to the visitor 102, wherein information for a correct response to the question is located at the at least one target location; receiving an input in response to the question from the visitor 102 via the mobile computing device 108; comparing the input in response to the question from the visitor 102 to a correct answer received from the server 106; and verifying that the input in response to the question from the visitor 102 matches the correct answer received from the server 106. In embodiments, the confirming that the visitor 102 has arrived at at least one target location in the set of target locations further includes scanning a QR code using a camera wherein the camera is located in the mobile computing device 108.

In embodiments, the confirming that the visitor 102 has arrived at at least one target location in the set of target locations, further includes accepting a picture of the at least one target location taken on a camera wherein the camera is located in the mobile computing device; and using image recognition to compare the picture to an image retrieved from a server 106.

Figure 9B:
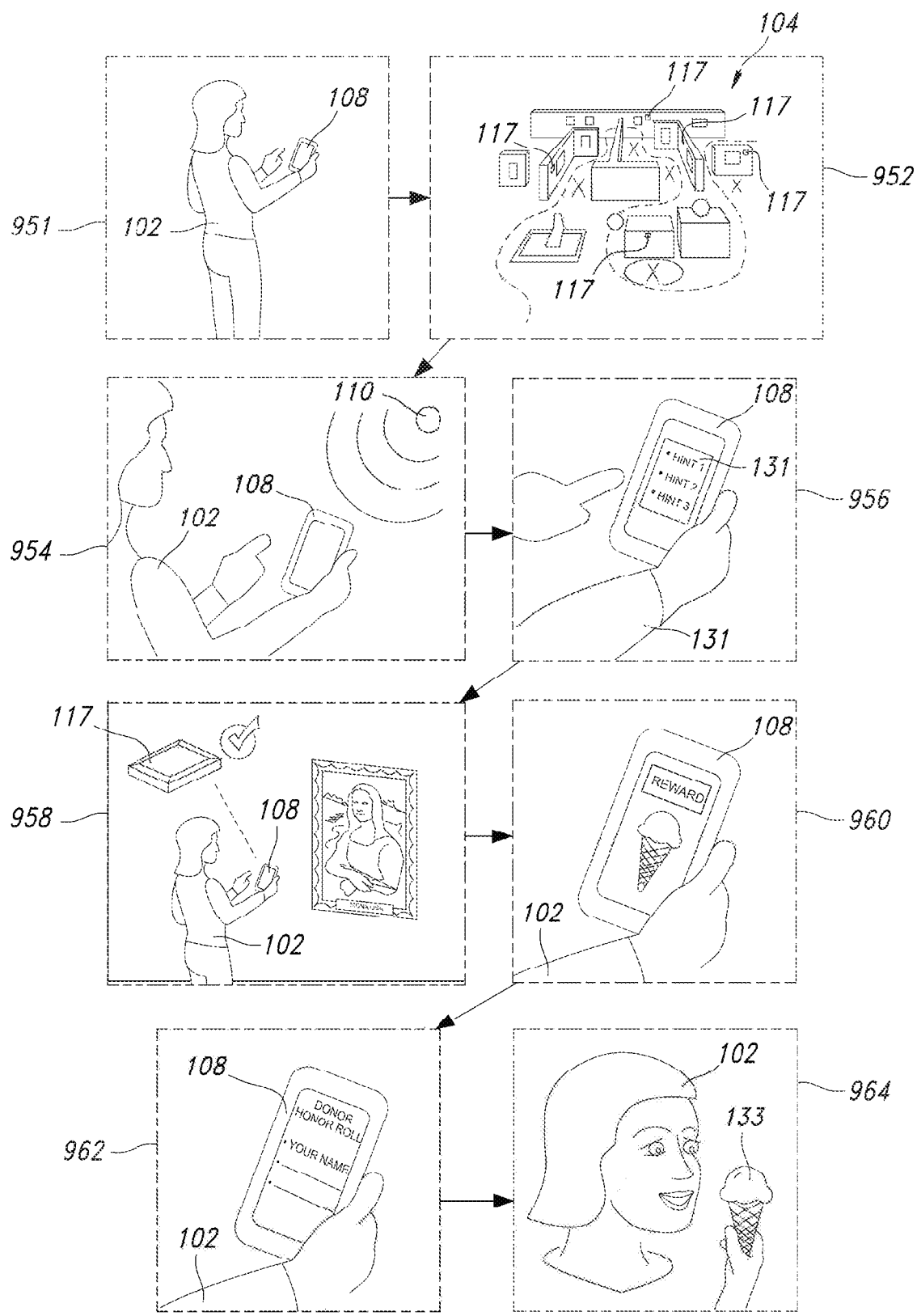
FIG. 9B is diagrammatic view that depicts further examples of a method for introducing a visitor of a museum, zoo, or other non-profit venue to a new interactive experience through personalized gamification in accordance with the present disclosure.

FIG. 9B illustrates methods and systems for providing a visitor to a non-profit venue a campaign participation opportunity based on an interaction of the visitor in accordance with embodiment of the present disclosure. In embodiments, the method may also be called "gamification". As depicted at 951, the method includes executing a program on a mobile computing device 108 carried by the visitor 102. At 952, the method includes analyzing a path of the visitor 102 taken through the non-profit venue 104 using a set of tracking systems. In FIG. 9B, the set of tracking systems is represented by, for example, RF beacons 117. At 954, the method includes retrieving a set of target locations and multimedia hints from a server via a network 110 into the mobile computing device 108. At 956, the method includes displaying the multimedia hints 131 on the mobile computing device 108. At 958, the method includes confirming that the visitor has arrived at at least one target location in the set of target locations. At 958, an RF beacon 117 detects proximity of the mobile computing device 108 to the target location. At 960, the method includes conveying a reward notification to the visitor 102 in response to each target location that the program has confirmed as having been visited by the visitor 102. For example, the reward may be free or discounted ice cream. In embodiments, using results output by the recommendation engine, a relevant call-to-action is presented to the visitor 102 to direct a portion of funds contributed by the visitor 102 to the campaign in which the visitor 102 has shown interest. At 962, the visitor 102 is presented with an update about a status of the campaign, including a donor honor roll that includes the name of the visitor 102. At 964, the visitor 102 is shown enjoying the ice cream cone 133 that the visitor 102 received as a reward.

Figure 10:
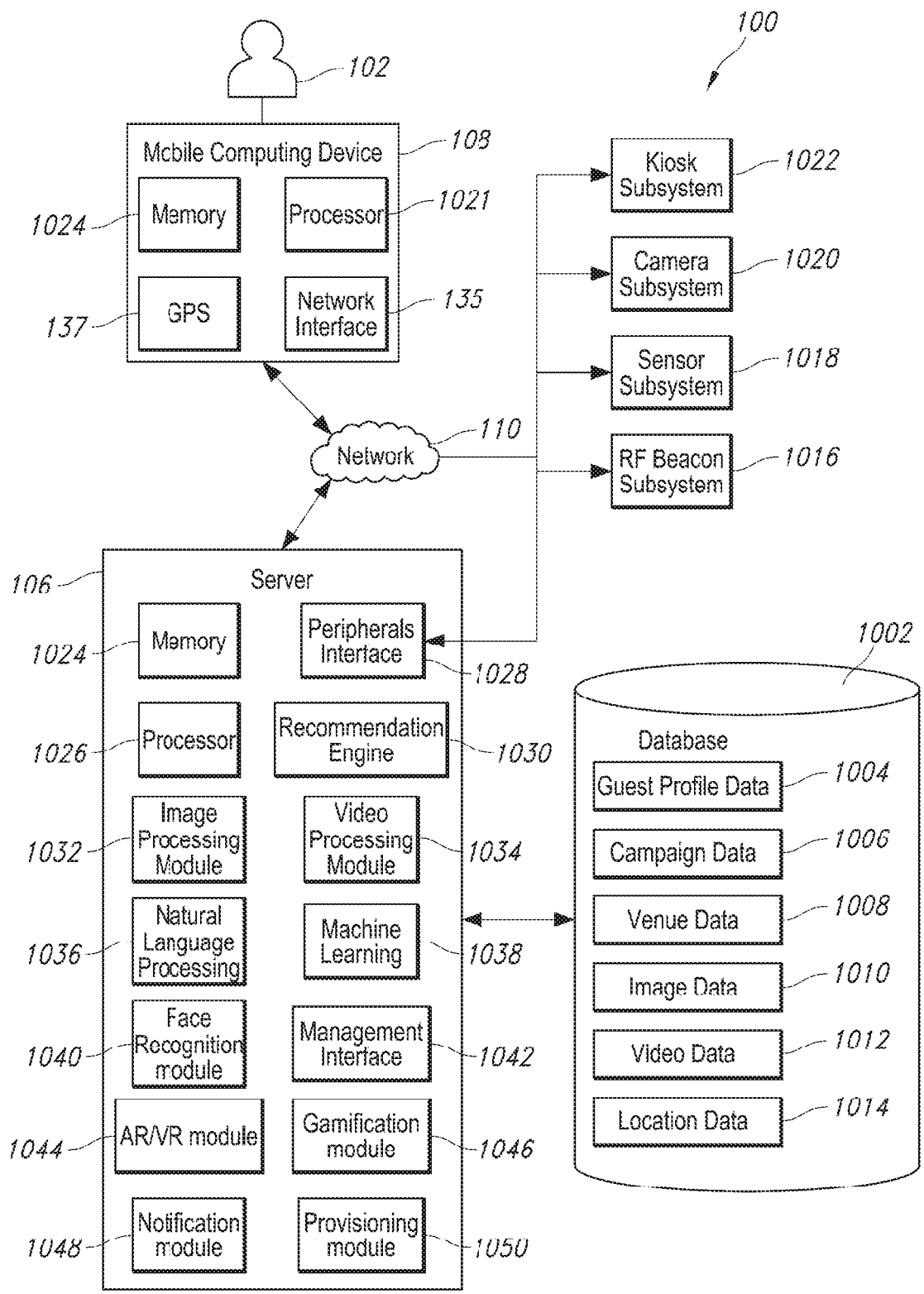
FIG. 10 is a diagrammatic view depicting examples of a system architecture for personalizing an experience of a visitor at a venue including a museum, a zoo or other non-profit venue in accordance with the present disclosure.

FIG. 10 depicts an example of a system architecture for personalizing an experience of a visitor 102 at a venue including a museum, a zoo or other non-profit venue in accordance with embodiments of the systems and methods disclosed herein. The system 100 includes server 106 that interacts with mobile computing devices 108 carried by visitors 102 over a network 110 to suggest personalized experiences to visitors 102 including personalized recommendations, campaign participation opportunities, personalized multimedia content, improved photography or videography services, campaign sharing or creation opportunities, multi-venue coordination and so on. The example of the mobile computing device 108 depicted in FIG. 10 includes a processor 1026, memory 1024, a network interface 135, and a GPS receiver 137 connected to perform the functions of the mobile computing device 108 described herein. The GPS Receiver 137 is to receive information from GPS satellites 127 (see FIG. 1B) and to calculate the geographical position of the GPS Receiver 137 for location, navigation, and tracking. The system 100 also includes a database 1002 for storing a variety of data including visitor profile data 1004, campaign data 1006, venue data 1008, image data 1010, video data 1012 and location data 1014. Further, the system 100 includes multiple subsystems helping capture visitor information, for example, RF beacon subsystem 1016, sensor subsystem 1018, camera subsystem 1020 and kiosk subsystem 1022. Server 106 includes memory 1024, processor 1026, peripherals interface 1028, recommendation engine 1030, image processing module 1032, video processing module 1034, natural language processing module 1036, machine learning system 1038, face recognition module 1040, management interface 1042, Augmented Reality/Virtual Reality (AR/VR) module 1044, gamification module 1046, notification module 1048 and provisioning module 1050. The processor may be any kind of computational or processing device capable of executing program instructions, codes, binary instructions and the like. Memory 1024 may include flash memory, buffer, stack, Random Access Memory (RAM), Read-Only Memory (ROM), dynamic memory, static memory, read/write storage, mutable storage, read only, random access, sequential access, location addressable, file addressable, content addressable, network attached storage, storage area network, bar codes, magnetic ink, and the like. Processor 1026 may include signal processor, digital processor, embedded processor, microprocessor or any variant such as a math co-processor, graphic co-processor, communication co-processor and the like that may directly or indirectly facilitate execution of program code or program instructions stored thereon. Peripherals interface 1028 provide an interface of server 106 with other subsystems including RF beacon subsystem 1016, sensor subsystem 1018, camera subsystem 1020 and kiosk subsystem 1022.

Figure 11A:
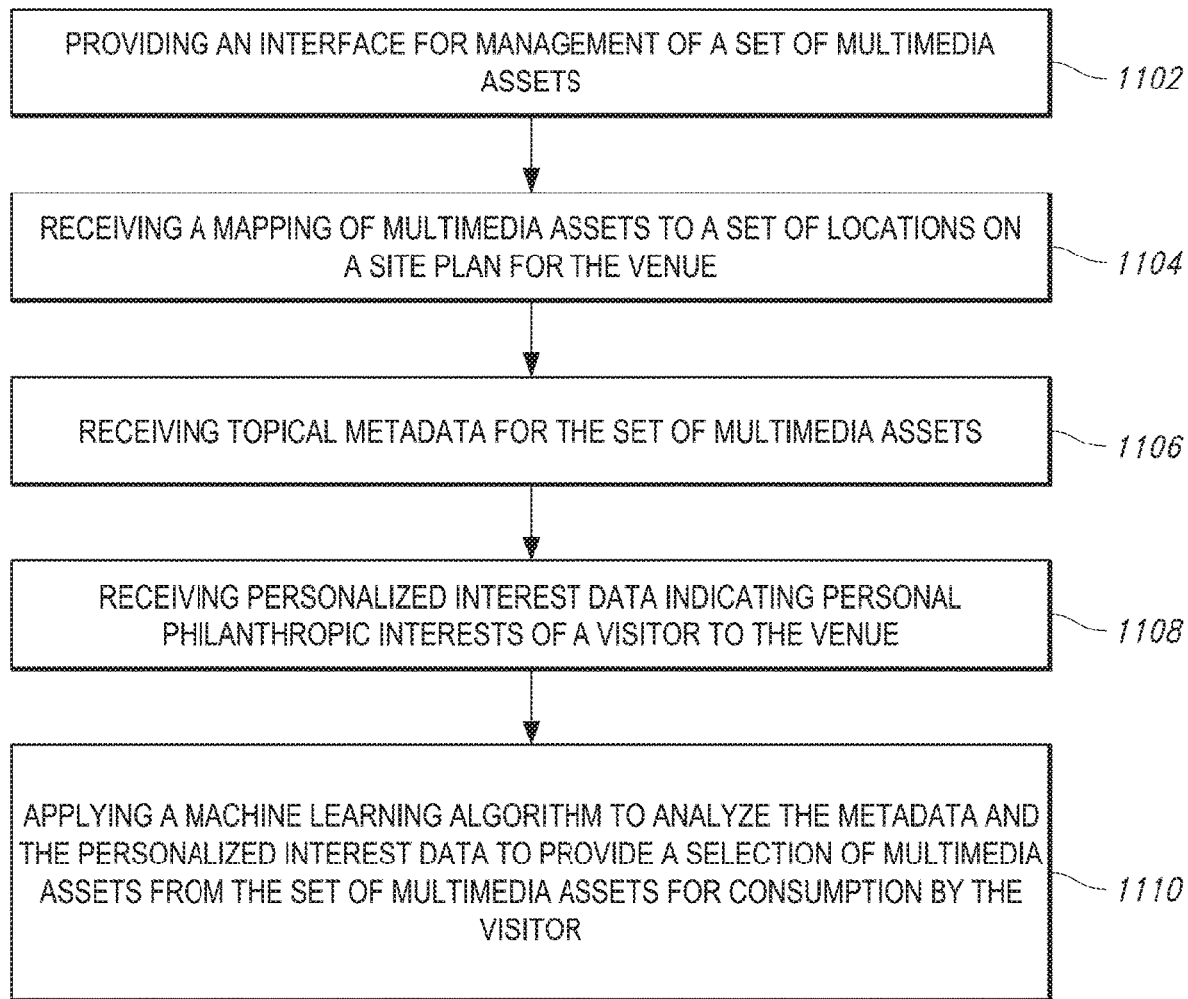
FIG. 11A is a diagrammatic view that depicts methods for developing content for personalized museum, zoo or other non-profit venue experiences for a mobile device in accordance with the present disclosure.

FIG. 11A illustrates methods and systems for developing content for personalized museum, zoo or other non-profit venue experiences using a mobile device in accordance with embodiments of the systems and methods disclosed herein. At 1102, the method includes providing an interface for management of a set of multimedia assets. At 1104, the method includes receiving a mapping of multimedia assets to a set of locations on a site plan for the venue. At 1106, the method includes receiving topical metadata for the set of multimedia assets. At 1108, the method includes receiving personalized interest data indicating personal philanthropic interests of a visitor to the venue. At 1110 the method includes applying a machine learning algorithm to analyze the metadata and the personalized interest data to provide a selection of multimedia assets from the set of multimedia assets for consumption by the visitor. In embodiments, the machine learning system assembles a sequence of multimedia assets based at least in part on a personal route taken by the visitor through the site plan for the venue. In embodiments, the machine learning system assembles a sequence and/or selection based at least in part on selections made by the visitor on a mobile computing device. In embodiments, at least one of the set of multimedia assets is interactive. In embodiments, at least one of the interactive multimedia assets is configured to initiate tracking of at least one of an audio, visual, tactile, and movement action of the visitor by the mobile computing device when the visitor comes within a defined proximity to the multimedia asset. In embodiments, the management interface further provides an interface for creating a campaign wherein information about the campaign is displayed at a location of a multimedia asset, wherein the multimedia asset is related to the campaign. In embodiments, the information about the campaign is to enable a multimedia interaction to promote the campaign in response to the mobile device being detected in proximity to the multimedia asset, and wherein the visitor uses the mobile device. In embodiments, the information about the campaign is displayed simultaneously at different locations and/or sites and where the visitors at the different locations can interact or communicate with each other in real time. In embodiments, the multimedia interaction is selected from the group consisting of audio conferencing, video conferencing, virtual reality conferencing, collaborative text chat, holographic conferencing and combinations thereof. In embodiments, the interface for management further provides a heat map showing paths of a plurality of visitors through the venue. (An example of a heat map is provided in FIG. 11B.) In embodiments, the management interface further provides an interface for creating multiple templates of multimedia asset selections or sequences. In an example, the multimedia asset selections or sequences may include playlists. In embodiments, the interface for management further provides an interface for creating an interactive campaign related to a location on the site plan. In embodiments, the interface for management further provides an interface for associating a live feed of multimedia to a site plan. In embodiments, the interface for management further provides an interface for creating an interactive campaign and displaying multimedia relating to a degree of progress towards a goal in the interactive campaign. In embodiments, the interface for management further provides an interface for designing interactive content. In embodiments, the interface for management allows for the development of different assets for location-based kiosks and mobile applications. In embodiments, the interface for management enables development of content for different venue locations simultaneously. In embodiments, the locations in the site plans are associated with a wireless beacon.

Figure 11B:
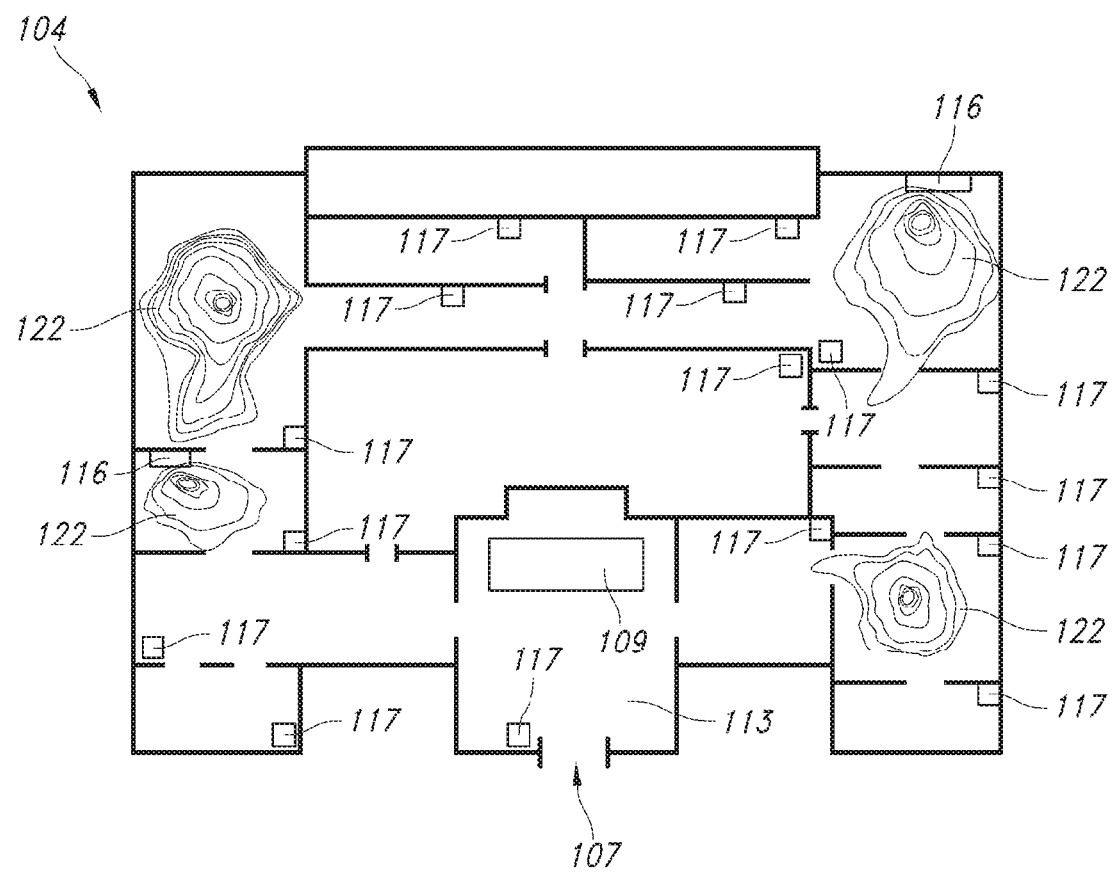
FIG. 11B is a diagrammatic view that depicts examples of a heat map in accordance with the present disclosure.

FIG. 11B is a diagram depicting an example of a heat map in accordance with the present disclosure. FIG. 11B depicts an example of a site plan for a venue 104 with heat map isotherms 122 superimposed thereon. In examples, any number of exhibits 116 may be located in a venue 104; however, two exhibits 116 are shown in FIG. 11B to simplify the diagram. In the example depicted in FIG. 11B, a reception/registration counter 109 is shown opposite an entrance 107 in an entrance hall 113. In the example, RF beacons 117 are depicted throughout the venue 104 as part of a path tracking system 114 (see FIG. 10). It is to be understood that although a heat map may actually convey temperature information, the heat map isotherms 122 may convey any gradient data on the map. The heat map isotherms may depict actual hot zones and cold zones on a site plan (for example, for use in controlling air temperature); however, the heat map may depict areas where there is a greater density of visitor traffic as being "hotter". When color is used, typically hotter areas, or high traffic areas, may be depicted using red or any suitable color. As stated herein above, heat maps may be used to convey any data where there is a gradient on a map. For example, a heat map may be used to depict areas in a venue where visitors show greater interest; areas where visitors spend more time; or areas where visitors are more generous with philanthropy. According to the present disclosure, heat maps may also be used in crowd management. For example, where an area of a venue 104 becomes too congested with visitors, a heat map may help prioritize where additional traffic guides may be allocated; prioritize where additional air-conditioning may be supplied; or help determine that the congested area should be avoided in personalized route recommendations.

Figure 12:
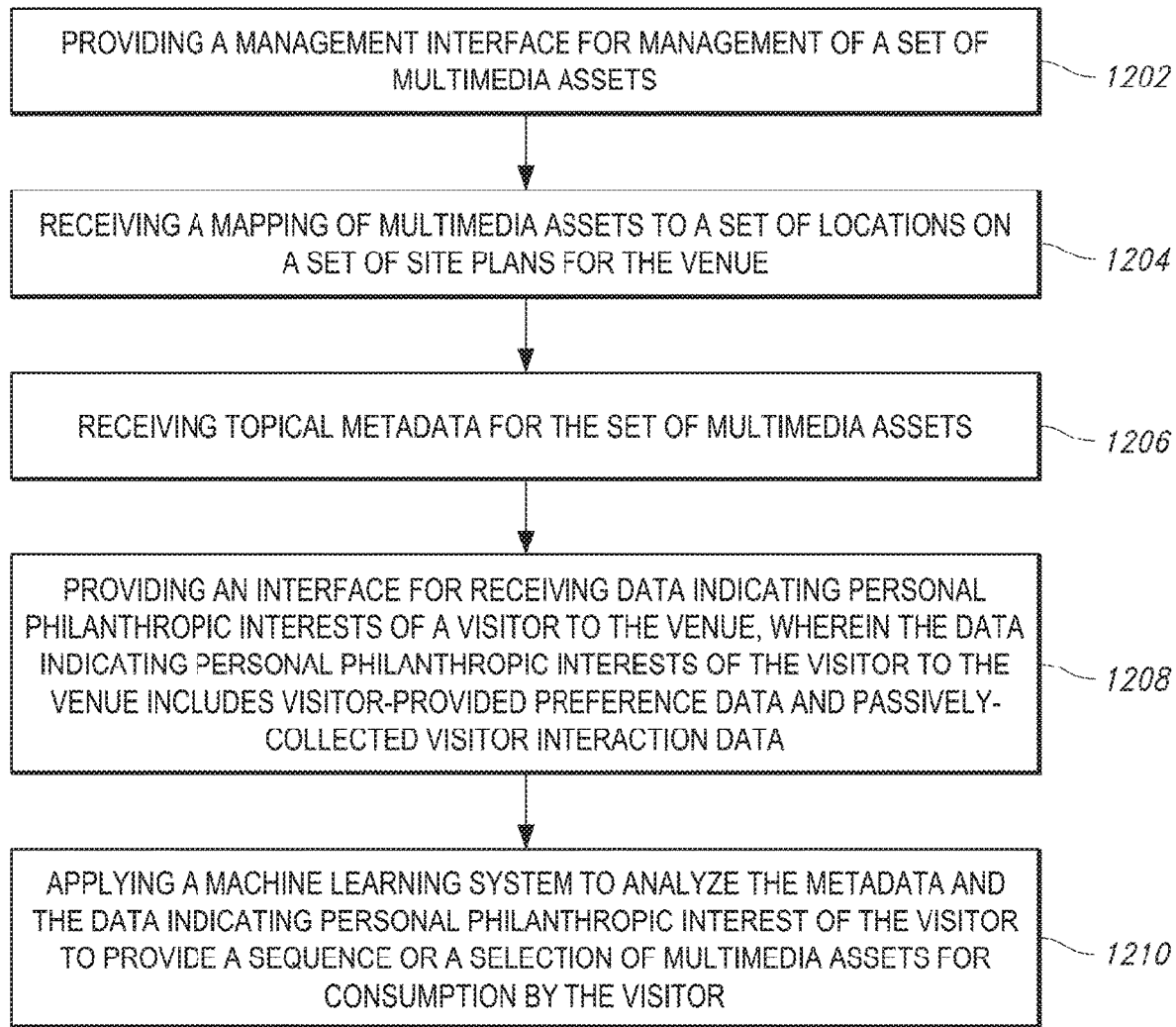
FIG. 12 is a diagrammatic view that depicts methods for providing a sequence or a selection of multimedia assets for consumption by a visitor at a museum, zoo or other non-profit venue in accordance with the present disclosure.

FIG. 12 illustrates methods and systems for developing content for personalized non-profit venue experiences using a mobile device in accordance with embodiment of the systems and methods disclosed herein. At 1202, the method includes providing a management interface for management of a set of multimedia assets. At 1204, the method includes receiving a mapping of multimedia assets to a set of locations on a set of site plans for the venue. At 1206, the method includes receiving topical metadata for the set of multimedia assets. At 1208, the method includes providing an interface for receiving data indicating personal philanthropic interests of a visitor to the venue, wherein the data indicating personal philanthropic interests of the visitor to the venue includes visitor-provided preference data and passively-collected visitor interaction data. At 1210 the method includes applying a machine learning system to analyze the metadata and the data indicating personal philanthropic interest of the visitor to provide a sequence or a selection of multimedia assets for consumption by the visitor. In embodiments, the machine learning system assembles a sequence or selection based at least in part on a personal route taken by the visitor through at least one of the site plans in the set of site plans. In embodiments, the machine learning system generates a memory book for the visitor subsequent to a visit to the venue, wherein the memory book is based in part on a personal route taken by the visitor through at least one of the site plans in the set of site plans. In embodiments, a web interface is to give the visitor access to the memory book. In embodiments, a mobile app is to give the visitor access to the memory book. In embodiments, the machine learning system assembles a sequence or selection based at least in part on visitor selections made at the venue. In embodiments, at least one of the multimedia assets is an interactive multimedia asset. In embodiments, the interactive multimedia asset is assigned to use an audio, visual, tactile, or movement capture device associated with a location in the venue. In embodiments, the management interface further provides an interface for creating an interactive campaign; information about the interactive campaign is displayed at a plurality of locations or sites; the information about the interactive campaign is displayed simultaneously at the plurality of locations or sites; and visitors at the plurality of locations or sites have access to real-time interaction or real-time communication with each other. In embodiments, a mode of the real-time communication is selected from the group consisting of audio conferencing, video conferencing, virtual reality conferencing, collaborative text chat, holographic conferencing, and combinations thereof. In embodiments, at least one location in the set of locations on the set of site plans is associated with a wireless beacon. In embodiments, the management interface further provides a heat map showing paths of visitors through the venue. In embodiments, the management interface further provides an interface for creating a plurality of templates for multimedia asset selections or sequences. In embodiments, the management interface further provides an interface for creating an interactive campaign related to at least one location in the set of locations on the set of site plans for the venue. In embodiments, the management interface further provides an interface for associating a live feed of multimedia to a site plan. In embodiments, the management interface further provides an interface for creating interactive campaigns and displaying multimedia relating to the degree of progress towards a goal in the interactive campaign. In embodiments, the management interface further provides an interface for creating an interactive campaign and displaying multimedia to convey a degree of progress towards a goal in the interactive campaign. In embodiments, the management interface further provides an interface for designing interactive content. In embodiments, the management interface further provides for the development of different assets for location-based kiosks and mobile applications. In embodiments, the management interface further provides for a simultaneous development of content for a plurality of venues. In embodiments, the machine learning system generates a memory book for the visitor subsequent to a visit to the venue; the memory book has digital assets coordinated in part based on a personal route taken by the visitor through at least one of the site plans in the set of site plans; or the memory book has digital assets coordinated in part based on visitor input.

Figure 13:
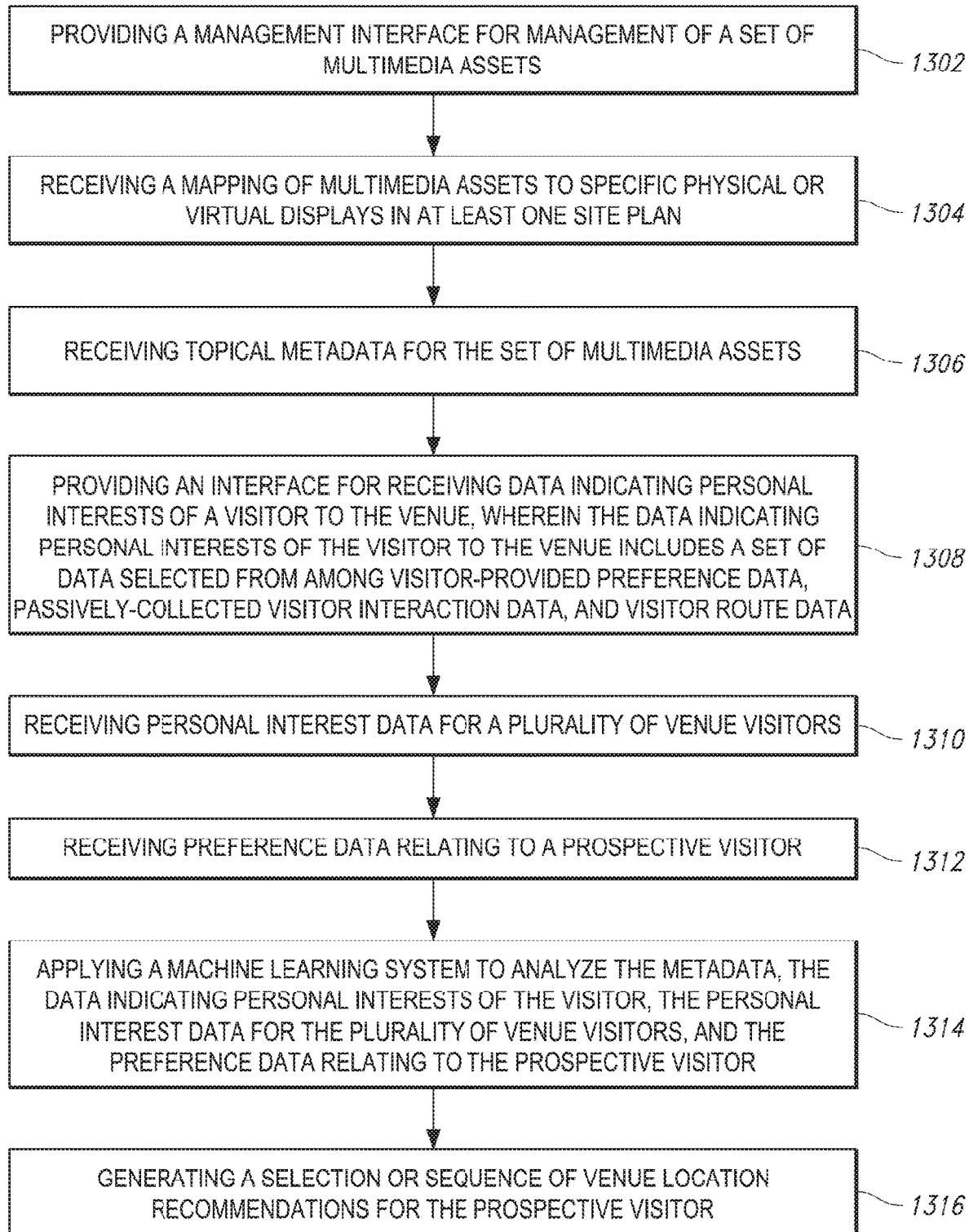
FIG. 13 is a diagrammatic view that depicts methods for developing recommendations for a personalized museum, zoo or other non-profit venue visit in accordance with the present disclosure.

FIG. 13 illustrates methods and systems for developing recommendations for a personalized venue visit at a non-profit venue, in accordance with embodiments disclosed herein. At 1302, the method includes providing a management interface for management of a set of multimedia assets. At 1304, the method includes receiving a mapping of multimedia assets to specific physical or virtual displays in at least one site plan. At 1306, the method includes receiving topical metadata for the set of multimedia assets. At 1308, the method includes providing an interface for receiving data indicating personal interests of a visitor to the venue, wherein the data indicating personal interests of the visitor to the venue includes a set of data selected from among visitor-provided preference data, passively-collected visitor interaction data, and visitor route data. At 1310, the method includes receiving personal interest data for a plurality of venue visitors. At 1312, the method includes receiving preference data relating to a prospective visitor. At 1314, the method includes applying a machine learning system to analyze the metadata, the data indicating personal interests of the visitor, the personal interest data for the plurality of venue visitors, and the preference data relating to the prospective visitor. At 1316, the method includes generating a selection or sequence of venue location recommendations for the prospective visitor. In embodiments, the personal interest data is collected from visitor visits across a plurality of non-profit venues. In embodiments, the preference data relating to the prospective visitor is collected for multiple venues. In embodiments, the preference data relating to the prospective visitor is collected at a non-profit venue. In embodiments, the preference data relating to the prospective visitor is derived from information collected on the prospective visitor based on a prior visit by the prospective visitor to a non-profit venue. In embodiments, the preference data relating to the prospective visitor is derived from information collected on the prospective visitor based on the route data of the prospective visitor through a non-profit venue during a previous visit to the non-profit venue. In embodiments, the preference data for the prospective visitor is collected using a mobile application. In embodiments, the preference data for the prospective visitor is collected based on indications of interest. In embodiments, the indications of interest are collected through gaze analysis. In embodiments, the indications of interest are collected through visual analysis via a plurality of cameras. In embodiments, the indications of interest are provided by the prospective visitor. In embodiments, the preference data for the prospective visitor is generated from visitor information collected from a visitor unrelated to the non-profit venue. In embodiments, the visitor route data is collected using a mobile application. In embodiments, the visitor route data is collected using wireless beacons. In embodiments, the visitor route data is collected using cameras. In embodiments, the visitor route data is collected using biometric sensors. The biometric sensors may include one or more wearable devices, such as wearable devices containing accelerometers, biometric sensors or other sensors. In embodiments, the visitor route data is collected using a sensor network, which may include a sensor network that includes a set of mobile devices, such as of other visitors, workers for a venue, or the like. In embodiments, the visitor route data is collected by tracking visitor interaction with venue displays. In embodiments, the visitor route data is collected by tracking visitor use of a venue guide device.

Figure 14:
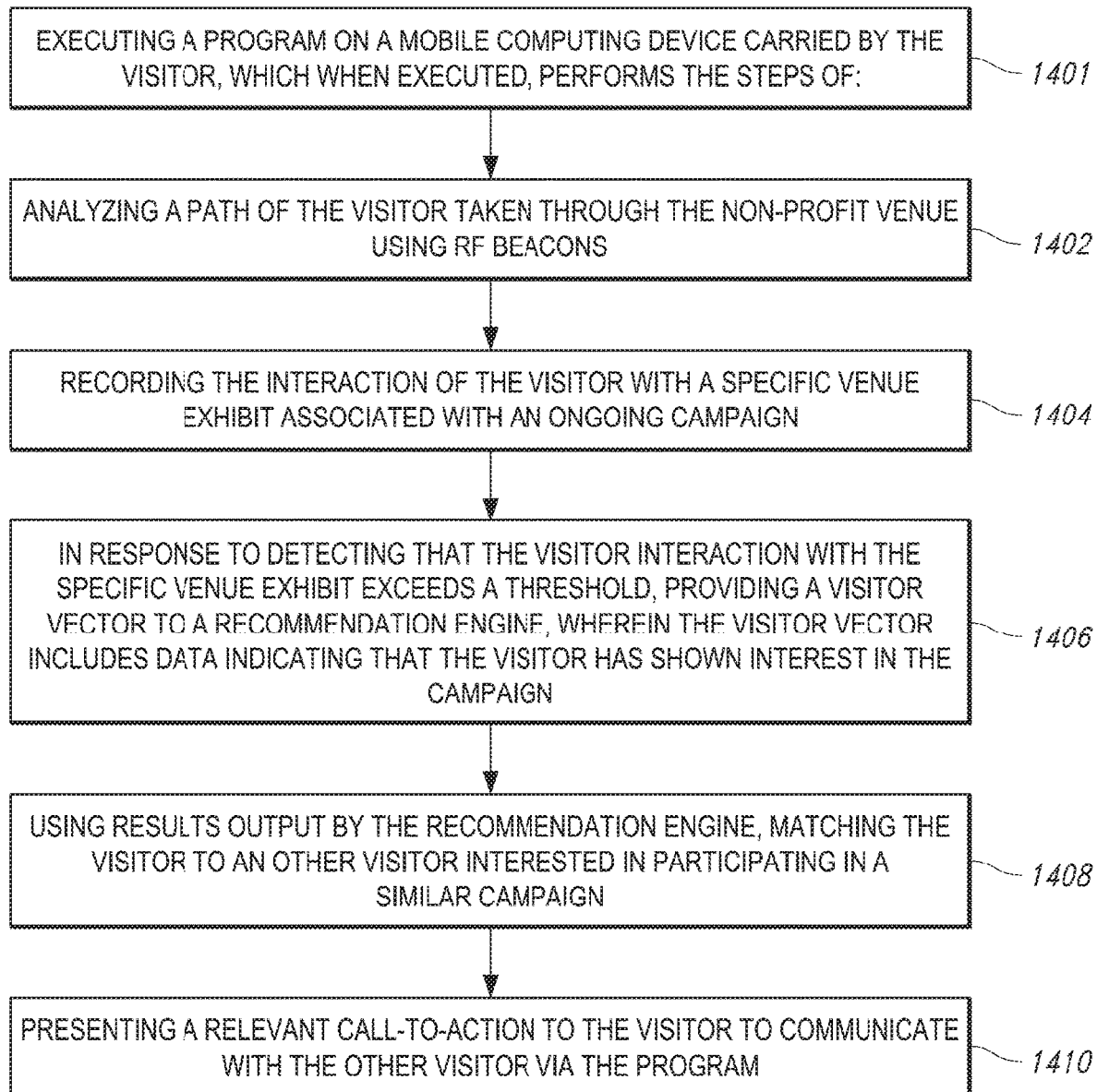
FIG. 14 is a diagrammatic view that depicts methods providing visitors of a museum, zoo or other non-profit venue campaign participation opportunities based on their interaction in accordance with the present disclosure.

FIG. 14 illustrates methods and systems providing visitors of a museum, zoo or other non-profit venue campaign participation opportunities based on their interaction in accordance with embodiments disclosed herein. As depicted at 1401, the method includes "executing a program on a mobile computing device carried by the visitor, which, when executed, performs the steps of:" At 1402, the method includes analyzing a path of the visitor taken through the non-profit venue using RF beacons or other tracking systems. At 1404, the method includes recording the interaction of the visitor with a specific venue exhibit associated with an ongoing campaign. At 1406, the method includes in response to detecting that the visitor interaction with the specific venue exhibit exceeds a threshold, providing a visitor vector to a recommendation engine 112, wherein the visitor vector includes data indicating that the visitor has shown interest in the campaign. At 1408, the method includes using results output by the recommendation engine 112, matching the visitor 102 to an other visitor interested in participating in a similar campaign. At 1410, the method includes presenting a relevant call-to-action to the visitor to communicate with the other visitor via the program.

In embodiments, communication between the visitor and the other visitor facilitates a sponsorship relationship between the visitor and the other visitor. In some examples, one visitor may offer the opportunity for the other visitor to select a campaign, or an aspect of a campaign, to which a donation by the one visitor will be directed. In embodiments, the visitor is presented with a list of potential campaign participants along with additional information about the other visitors and goals of the other visitors for the campaign. In embodiments, visitors 102 may be connected based on their similarity, such as based on a clustering algorithm, a similarity calculation, or the like, such as applied to a set of attributes for each visitor 102, such as taken as inputs by the information technology platform 100, such as at check-in to a venue, during a ticketing process, via a mobile application, or by collection from external data sources, such as social media sites of visitors. In embodiments, a collaborative filtering algorithm may be used to find campaigns, exhibits, projects, or other items that are likely to be of interest to a visitor 102 or of shared interest to a plurality of visitors. A collaborative filtering algorithm may solicit input from a visitor 102 about a range of topics, items, exhibits, campaigns, causes, or the like in order to determine likely interest in other items, such as particular exhibits or campaigns that may be presented to visitors 102 as visiting opportunities and/or as opportunities for donations or other philanthropic activity.

In embodiments, the other visitor is selected by the visitor from a list of potential campaign participants. In embodiments, the other visitor is selected by the program from a list of potential campaign participants, such as based on similarity of the visitors or similarity in the extent of the visitors' respective interactions or interest in an exhibit, a campaign, or the like. In embodiments, the campaign is selected from the group consisting of a translation project, a clean water project, an education project, a building project, a missionary project, a disaster relief project, a restoration project, an acquisition project and combinations thereof. In embodiments, the recorded interaction of the visitor with the specific venue exhibit associated with the ongoing campaign is analyzed based on video taken of a face of the visitor. In embodiments, the recorded interaction of the visitor with the specific venue exhibit is analyzed using visual affect (emotion or sentiment) detection, which may include training a machine learning system on a training set of data that has been reviewed by human reviewers, which may be subsequently further trained based on outcomes, such as success in recognizing sentiment or emotion, or overall outcomes of the information technology platform 100.

In embodiments, the call-to-action is selected from a group consisting of a request for a donation, a request for subscription, a request to share on social media, a request to provide metadata about the visitor for display on an endorsement, a request to share the campaign with others, a request to be contacted further, a request to donate on behalf of another, a request to sponsor an other campaign participant, a request for sponsorship by an other visitor to participate in a campaign. In embodiments, the program automatically queries a sponsored visitor to request an update on participation by the sponsored visitor in the campaign. In embodiments, the campaign has specific actions and the program queries a sponsored visitor whether the sponsored visitor has completed the specific actions. In embodiments, the steps further include the step of automatically subscribing the visitor to an ongoing email or push-messaging update about a status of the campaign. In embodiments, the ongoing email or push-messaging update provides a specific update on a sponsored visitor, wherein the visitor subscribed to the update is a sponsor of the sponsored visitor, and wherein the update includes a status of completion of specific actions by the sponsored visitor.

FIG. 15 illustrates methods and systems for providing a visitor to a museum, zoo or other non-profit venue a campaign participation opportunity based on an interaction of the visitor with a specific venue exhibit in accordance with embodiments disclosed herein. As depicted at 1501, the method includes "executing a program on a mobile computing device carried by the visitor, which, when executed, performs the steps of:" At 1502, the method includes analyzing a path of the visitor taken through the non-profit venue using a set of tracking systems. At 1504, the method includes recording the interaction of the visitor with a specific venue exhibit associated with an ongoing campaign. Interactions may include reactions (such as recorded by a camera, a motion tracking, a gestural recognition system, an audio system, or the like), user input (such as by voice, touch, gesture, or the like, including inputs indicating interest, ratings, sentiment, support, and the like), time-based measures of interaction (such as dwell times in proximity to an exhibit, dwell times of attention to particular portions of an exhibit (such as measured by eye tracking), and the like), interactions involving user choices (such as behavior in games, contests, puzzles and the like) and others. At 1506, the method includes in response to detecting that the visitor interaction with the specific venue exhibit exceeds a threshold, providing a visitor vector to a recommendation engine 112; the visitor vector includes data indicating that the visitor has shown interest in the specific venue exhibit associated with the campaign. At 1508, the method includes using results output by the recommendation engine 112, presenting a relevant call-to-action to the visitor to direct a portion of funds contributed by the visitor to the campaign in which the visitor has shown interest. In embodiments, the funds contributed by the visitor include a contribution in exchange for admission to the venue, and, in response to the contribution in exchange for admission, the visitor is given authority to direct a virtual credit to the campaign in further response to the relevant call-to-action. In embodiments, the steps further include communicating with a retail point-of-sale system, wherein the retail point-of-sale system presents the relevant call-to-action to the visitor, and wherein the point-of-sale system allocates a portion of funds received from the visitor by the point-of-sale system to the campaign in response to instructions from the visitor. In embodiments, the instructions include communicating a selection via the point-of-sale system. In embodiments, the instructions include communicating a selection via the mobile computing device. In embodiments, the mobile computing device includes a digital guide. In embodiments, the steps further include communicating with the visitor via a website or mobile app, wherein the visitor is outside of the venue after the visitor has exited the venue after the visitor has visited the venue; and the website or mobile app presents the relevant call-to-action to the visitor, wherein the website or mobile app allocates a portion of the funds contributed by the visitor to the campaign in response to instructions from the visitor entered via the website or mobile app. In embodiments, the steps further include communicating with the visitor via a website or mobile app, wherein the visitor is outside of the venue before the visitor has entered the venue before the visitor has visited the venue; and the website or mobile app presents the relevant call-to-action to the visitor, wherein the website or mobile app allocates a portion of the funds contributed by the visitor to the campaign in response to instructions from the visitor entered via the website or mobile app. In embodiments, the campaign is selected from the group consisting of a translation project, a clean water project, an education project, a building project, a missionary project, a disaster relief project, a restoration project, an acquisition project and combinations thereof. In embodiments the recorded interaction of the visitor with the specific venue exhibit associated with the ongoing campaign is analyzed based on video taken of a face of the visitor. In embodiments, the recorded interaction of the visitor with the specific venue exhibit is analyzed by the mobile computing device or by a platform in communication therewith using visual affect (e.g., mood, emotion or sentiment) detection, such as using a machine learning system that is trained for the purpose of detecting sentiment. In embodiment, camera-based sentiment detection is trained specifically on outcomes of a set of requests for philanthropic activity, such as donations in response to calls-to-action, so that the information technology platform 100 can recognize visitors 102 who are most likely to be willing to engage in philanthropic activity at a given time and place, thereby providing timely requests and avoiding unnecessary solicitation throughout a visitor's visit to the venue. In embodiments, the call-to-action is selected from the group consisting of a request for a donation, a request for subscription, a request to share on social media, a request to provide metadata about the visitor for display on an endorsement, a request to share the campaign with others, a request to be contacted further, a request to donate on behalf of another, a request to sponsor an other campaign participant, a request for sponsorship by an other visitor to participate in a campaign. In embodiments, a machine learning system may be trained based on outcomes (e.g., donations or other philanthropic activity) in response to different types of call-to-action in order to adjust one or more parameters, such as the type, timing, presentation and location of the call-to-action.

Figure 16:
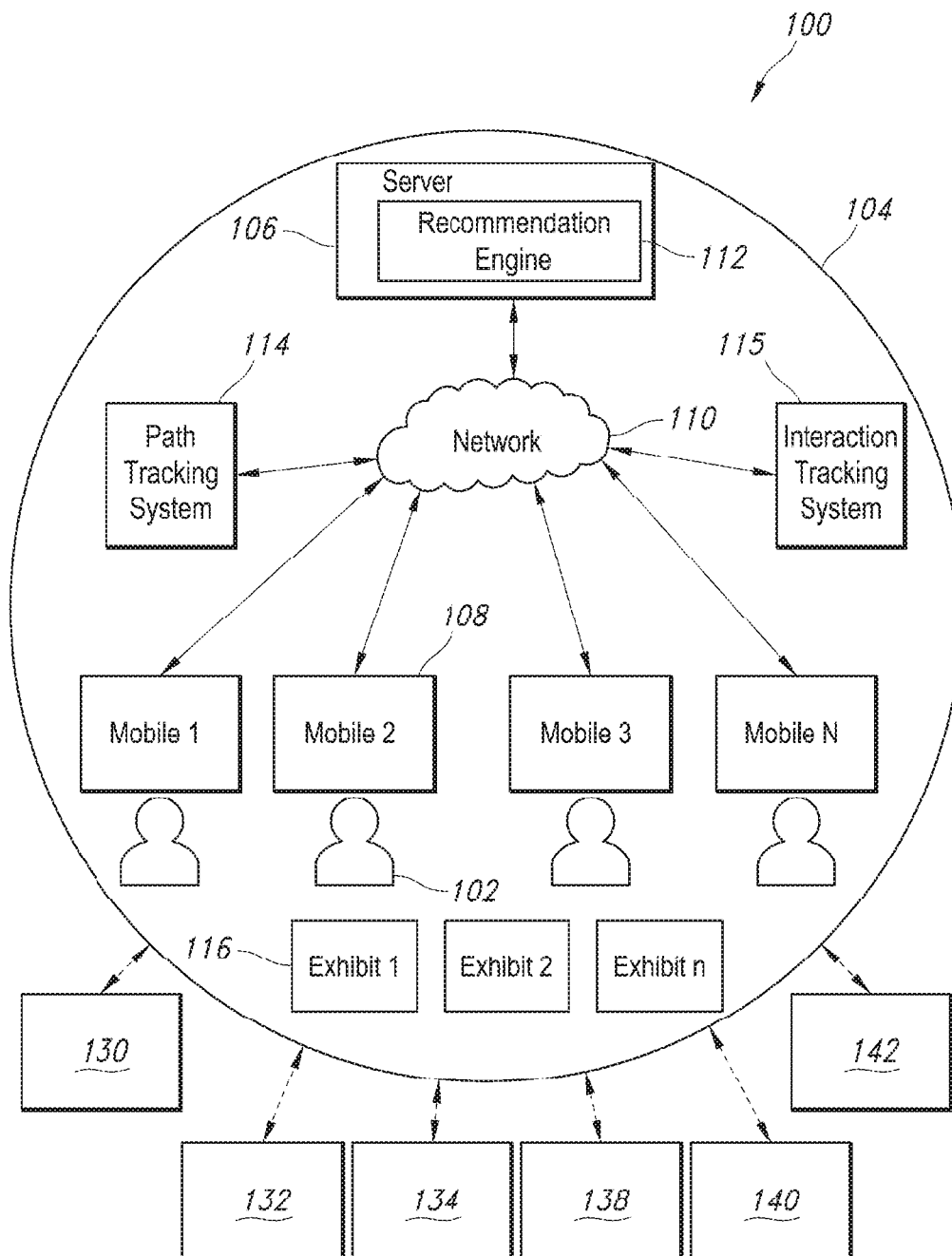
FIG. 16 is a diagrammatic view that depicts methods for providing visitors of a museum, zoo or other non-profit venues the opportunity to solicit engagement of other visitors of similar interests based on their interaction in accordance with the present disclosure.

FIG. 16 illustrates methods and systems 100 for providing to a visitor 102 of a venue 104, a campaign participation opportunity based on interactions within the venue 104 in accordance with embodiments disclosed herein. The system 100 includes a path tracking system 114 for determining a path of the visitor 102 taken through the venue 104. The system 100 includes an interaction tracking system 115 for determining at least one interaction of the visitor 102 with at least one exhibit 116 that is associated with an ongoing campaign. The system 100 includes a recommendation engine 112 for processing the interaction to provide a recommendation for an action related to the campaign. In embodiments, upon detecting that an interaction by the visitor 102 with a specific exhibit 116 exceeds a threshold level of interaction, the interaction information is provided to the recommendation engine 112. In embodiments, the recommendation engine 112 provides a relevant call-to-action to the visitor 102 to participate in a campaign that is related to the specific exhibit for which the interaction was tracked. In embodiments, the venue is a museum 130. In embodiments, the venue is a zoo 132. Examples of the venues 104 further include an exhibition 134, a park 138, a temporary venue 140, a retrofit installation 142, and the like. In embodiments, the venue is a non-profit venue. The server 106 is in communication with a mobile device 108 via the network 110. The mobile device 108 is to be carried by the visitor 102, and communicate with the network 110, for example, to determine a context, location and other personalized information about the visitor 102. In embodiments, tracking interactions of the visitor 102 with an exhibit 116 includes recording video of the face of the visitor 102 and using a machine learning system to analyze interactions based on the video of the face of the visitor 102 to determine a sentiment of the visitor 102 with respect to the exhibit 116. In embodiments, the campaign is selected from charitable projects in the group consisting of a translation project, a clean water project, an education project, a building project, a missionary project, a disaster relief project, a restoration project, an acquisition project, and combinations thereof. In embodiments, the call-to-action presented to the visitor is selected from a group consisting of a request for donation, a request for subscription, a request to share on social media, a request to provide metadata about the visitor for display on an endorsement, a request to share the campaign with others, a request to provide permission to be contacted further, a request to donate on behalf of another, a request to sponsor another campaign participant, a request for sponsorship by another to participate in the campaign, and combinations thereof. In embodiments, upon receiving input from the visitor 102 to create a campaign related to an exhibit 116, the visitor is provided with an interface to create a new campaign and provide information about the campaign. In embodiments, the campaign is uploaded to a server 106 and information about the campaign is displayed on a display device in proximity to the exhibit. In embodiments, this information is provided as an input, such as a feature vector, profile, or the like to recommendation engine 112. In embodiments, using the results of the recommendation engine 112, a relevant call-to-action is presented to a second visitor to participate in the campaign.

Figure 17:
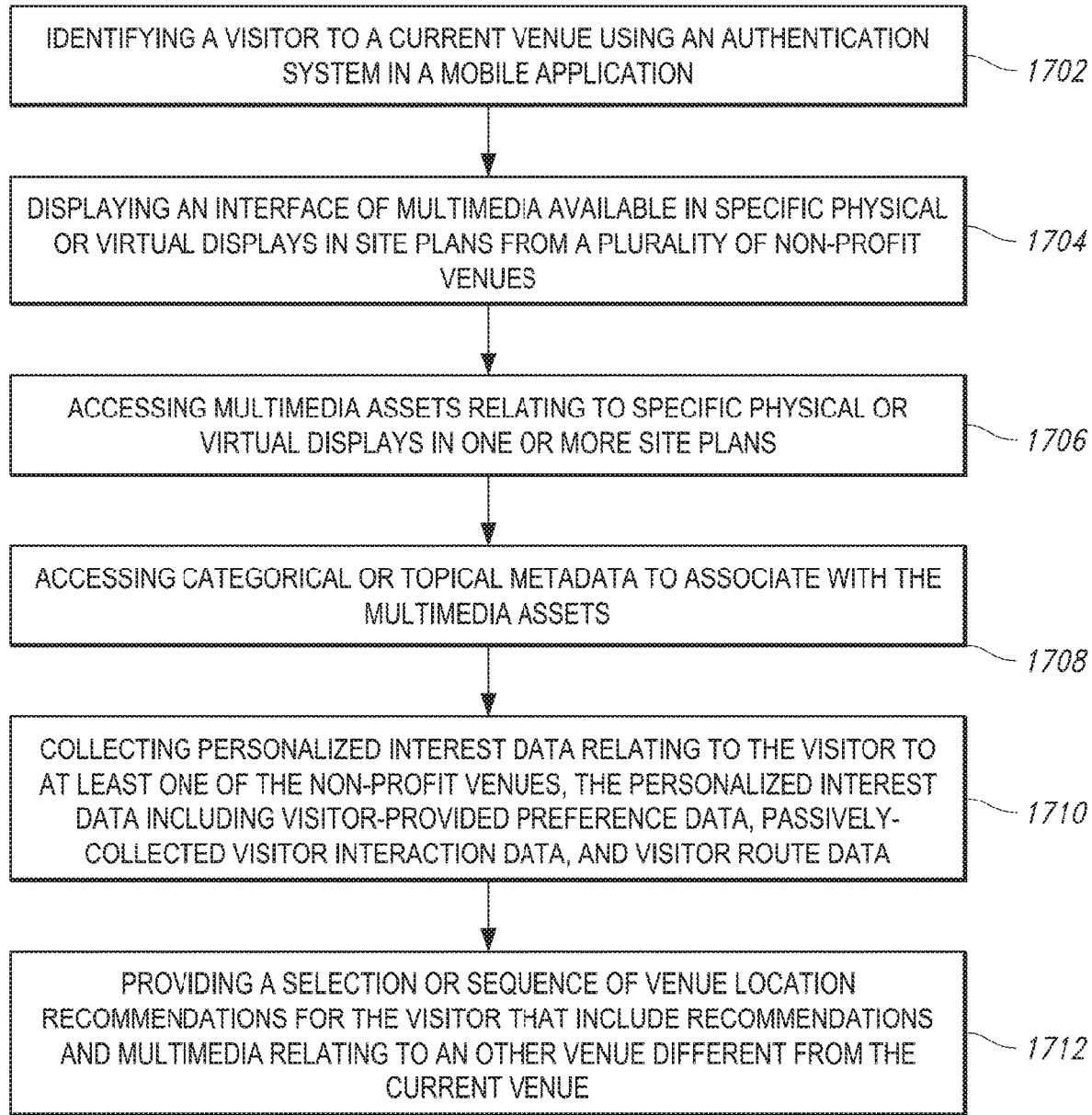
FIG. 17 is a diagrammatic view that depicts methods for coordinating personalized experiences between cooperating museum, zoo or other non-profit venues in accordance with the present disclosure.

FIG. 17 illustrates methods and systems for coordinating personalized experiences between cooperating venues, such as museums, zoos or other non-profit venues in accordance with embodiments disclosed herein. At 1702, the method includes identifying a visitor to a current venue using an authentication system in a mobile application. At 1704, the method includes displaying an interface of multimedia available in specific physical or virtual displays in site plans from a plurality of non-profit venues. At 1706, the method includes accessing multimedia assets relating to specific physical or virtual displays in one or more site plans. At 1708, the method includes accessing categorical or topical metadata to associate with the multimedia assets. At 1710, the method includes collecting personalized interest data relating to the visitor to at least one of the non-profit venues, the personalized interest data including visitor-provided preference data, passively-collected visitor interaction data, and visitor route data. At 1712, the method includes providing a selection or sequence of venue location recommendations for the visitor that include recommendations and multimedia relating to an other venue different from the current venue. In embodiments, the personalized interest data is collected from visits by the visitor to multiple non-profit venues using a plurality of capture devices. In embodiments, the personalized interest data is collected using a mobile application. In embodiments, the personalized interest data is collected using devices from the group consisting of wireless beacons, cameras, biometric sensors, a sensor network, and combinations thereof. In embodiments, the personalized interest data is collected by tracking visitor interaction with venue displays. In embodiments, the personalized interest data is collected by tracking visitor use of a venue guide device, for example, provided by a host of the venue. In embodiments, the preference data for the prospective visitor is generated from visitor information collected from a visitor unrelated to the cooperating non-profit venues.

Figure 18:
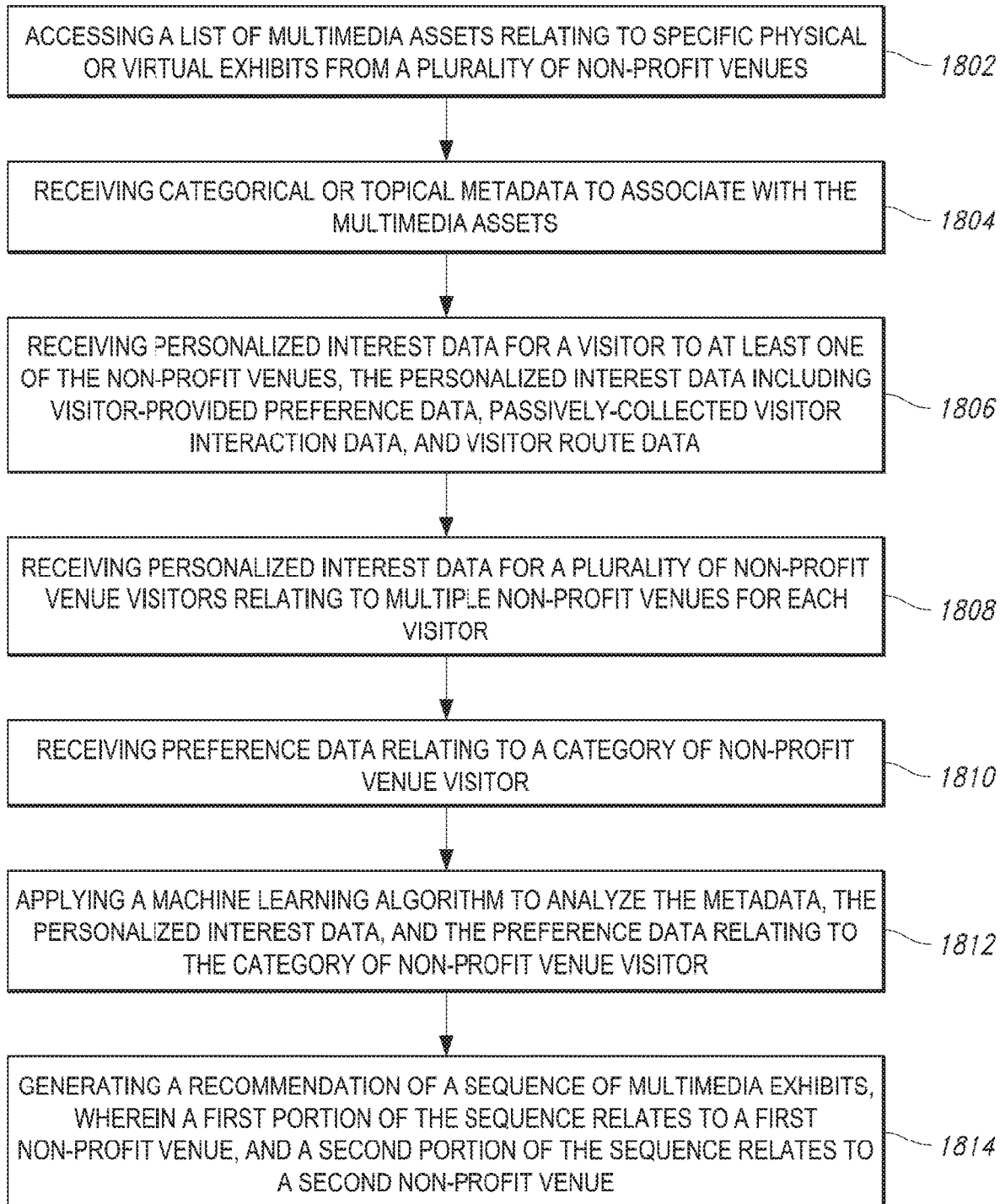
FIG. 18 is a diagrammatic view that depicts methods for creating personalized multi-venue museum, zoo or other non-profit venue experiences in accordance with the present disclosure.

FIG. 18 illustrates methods and systems for creating personalized multi-venue non-profit venue experiences in accordance with embodiments disclosed herein. At 1802, the method includes accessing a list of multimedia assets relating to specific physical or virtual exhibits from a plurality of non-profit venues. At 1804, the method includes receiving categorical or topical metadata to associate with the multimedia assets. At 1806, the method includes receiving personalized interest data for a visitor to at least one of the non-profit venues, the personalized interest data including visitor-provided preference data, passively-collected visitor interaction data, and visitor route data. At 1808, the method includes receiving personalized interest data for a plurality of non-profit venue visitors relating to multiple non-profit venues for each visitor (including situations where a single visitor visits different venues). At 1810, the method includes receiving preference data relating to a category of non-profit venue visitor. At 1812, the method includes applying a machine learning algorithm to analyze the metadata, the personalized interest data, and the preference data relating to the category of non-profit venue visitor. At 1812, the method includes generating a recommendation of a sequence of multimedia exhibits, wherein a first portion of the sequence relates to a first non-profit venue, and a second portion of the sequence relates to a second non-profit venue. In embodiments, the personalized interest data is collected from visits by visitors across multiple venues using a plurality of capture devices. In embodiments, the personalized interest data is collected using a mobile application. In embodiments, the personalized interest data is collected using a wireless beacon. In embodiments, the personalized interest data is collected using a camera. In embodiments, the personalized interest data is collected using a biometric sensor. In embodiments, the personalized interest data is collected using a sensor network. In embodiments, the personalized interest data is collected by tracking a visitor interaction with a venue display. In embodiments, the personalized interest data is collected by tracking a use by a visitor of a venue guide device. In embodiments, the machine learning system assembles a sequence or selection based at least in part on a personal route taken by the visitor through one or more site plans. In embodiments, the machine learning system assembles a sequence or selection based in part on a selection made by the visitor at a venue location.

Figure 19:
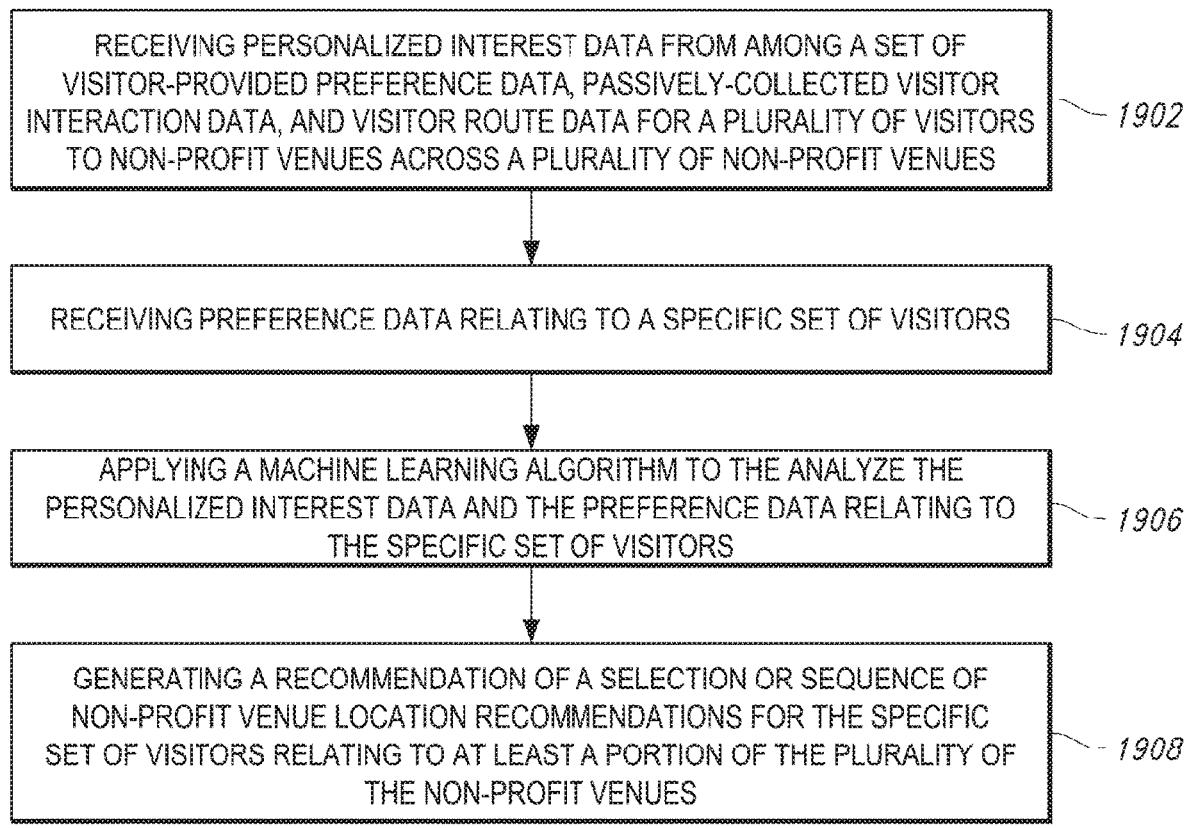
FIG. 19 is a diagrammatic view that depicts methods for cross-referral for cooperating museum, zoo or other non-profit venues in accordance with the present disclosure.

FIG. 19 illustrates methods and systems for cross-venue referral for a visitor to a non-profit venue in a group of cooperating non-profit venues in accordance with embodiments of the present disclosure. At 1902, the method includes receiving personalized interest data from among a set of visitor-provided preference data, passively-collected visitor interaction data, and visitor route data for a plurality of visitors to non-profit venues across a plurality of non-profit venues. At 1904, the method includes receiving preference data relating to a specific set of visitors. At 1906, the method includes applying a machine learning algorithm to analyze the personalized interest data and the preference data relating to the specific set of visitors. At 1908, the method includes generating a recommendation of a selection or sequence of non-profit venue locations for the specific set of visitors relating to at least a portion of the plurality of the non-profit venues. In embodiments, the recommendation includes a promotion or discount to attend an other non-profit venue. In embodiments, the recommendation is provided to the specific set of visitors via a medium selected from the group consisting of email, push messaging, virtual reality, mobile applications, augmented reality, a kiosk, an audio interface, and combinations thereof. In embodiments, the recommendation is based in part on the contribution history of the specific set of visitors. In embodiments, the venues in the group of cooperating non-profit venues are classified into categories, and the preference data for a prospective set of visitors to a venue in a first category is collected from a set of visitors to an other venue in an other category of venues.

Figure 20:
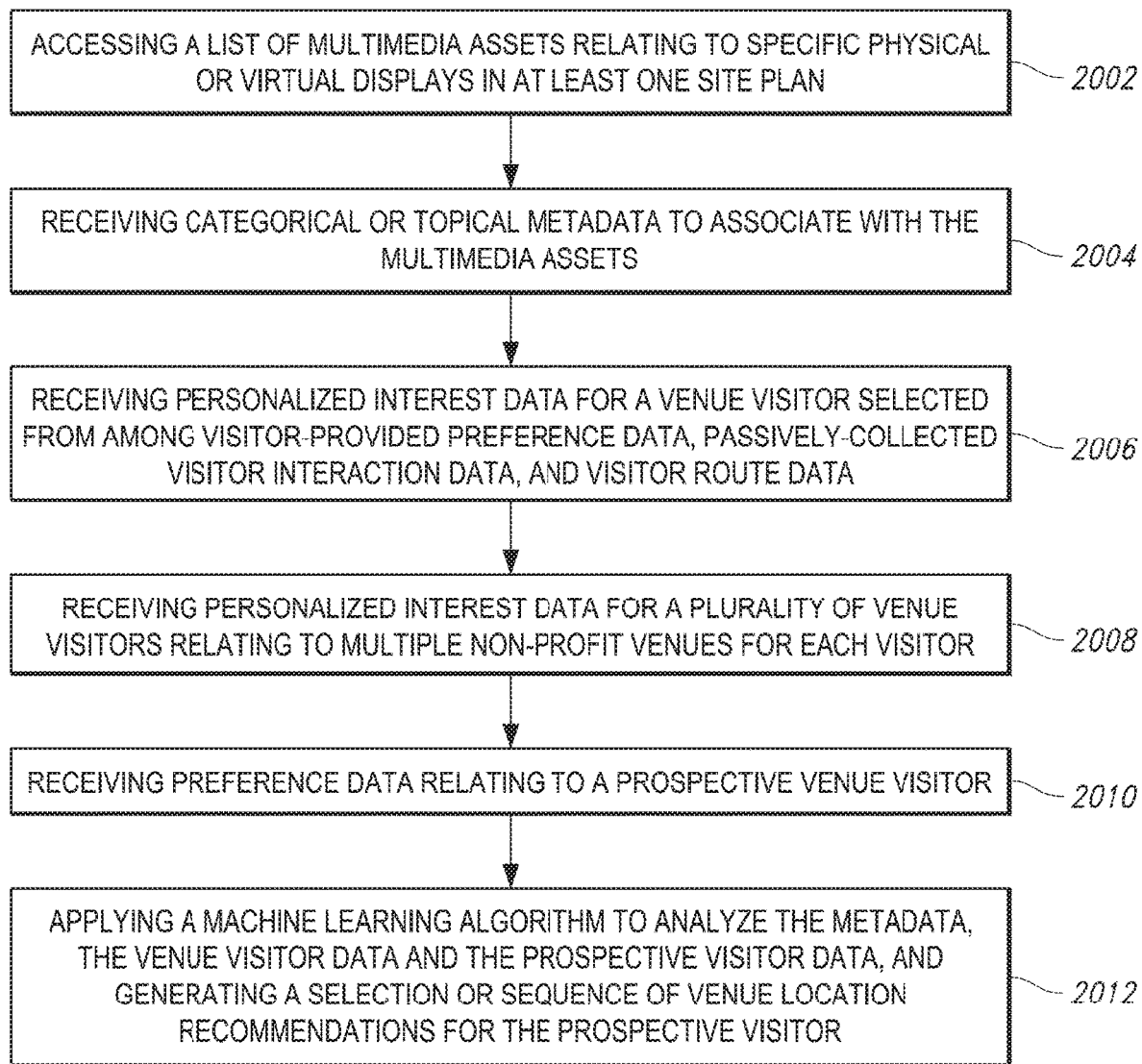
FIG. 20 is a diagrammatic view that depicts methods for automating content selection for personalized museum, zoo or other non-profit venue experiences in accordance with the present disclosure.

FIG. 20 illustrates methods and systems for automating content selection for a personalized museum, zoo or other non-profit venue experience in accordance with embodiments disclosed herein. At 2002, the method includes accessing a list of multimedia assets relating to specific physical or virtual displays in at least one site plan. At 2004, the method includes receiving categorical or topical metadata to associate with the multimedia assets. At 2006, the method includes receiving personalized interest data for a venue visitor selected from among visitor-provided preference data, passively-collected visitor interaction data, and visitor route data. At 2008, the method includes receiving personalized interest data for a plurality of venue visitors relating to multiple non-profit venues for each visitor. At 2010, the method includes receiving preference data relating to a prospective venue visitor. At 2012 the method includes applying a machine learning algorithm to analyze the metadata, the venue visitor data and the prospective visitor data, and generating a selection or sequence of museum venue location recommendations for the prospective visitor. In embodiments, the personalized interest data is collected from visits by the visitor to multiple non-profit venues using a plurality of capture devices. In embodiments, the personalized interest data is collected using a mobile application. In embodiments, the personalized interest data is collected using a wireless beacon. In embodiments, the personalized interest data is collected using a camera. In embodiments, the personalized interest data is collected using a biometric sensor. In embodiments, the personalized interest data is collected using a sensor network. In embodiments, the personalized interest data is collected by tracking a visitor interaction with a venue display. In embodiments, the personalized interest data is collected by tracking a use by a visitor of a venue guide device. In embodiments, the multiple non-profit venues are classified into categories, and preference data for a prospective visitor to a venue in a first category is collected from a visitor to an other venue in an other category of venues disrelated from the first category.

Figure 21:
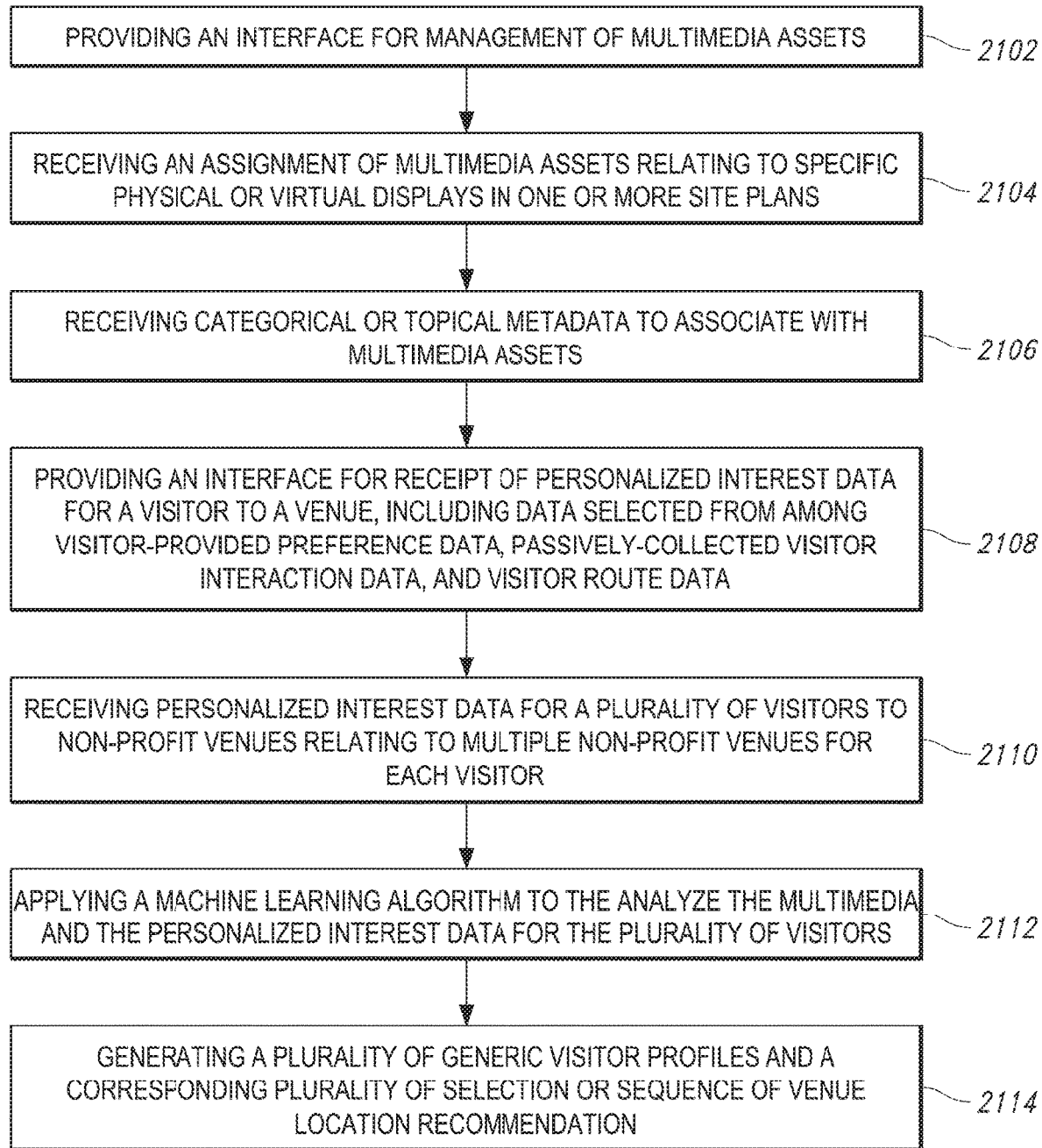
FIG. 21 is a diagrammatic view that depicts methods for providing coordinated experiences between cooperating museum, zoo or other non-profit venues in accordance with the present disclosure.

FIG. 21 illustrates methods and systems for providing a coordinated experience for a visitor to a non-profit venue in a group of cooperating non-profit venues. At 2102, the method includes providing an interface for management of multimedia assets. At 2104, the method includes receiving an assignment of multimedia assets relating to specific physical or virtual displays in one or more site plans. At 2106, the method includes receiving categorical or topical metadata to associate with multimedia assets. At 2108, the method includes providing an interface for receipt of personalized interest data for a visitor to a venue, including data selected from among visitor-provided preference data, passively-collected visitor interaction data, and visitor route data. At 2110, the method includes receiving personalized interest data for a plurality of visitors to non-profit venues relating to multiple non-profit venues for each visitor. At 2112, the method includes applying a machine learning algorithm to the analyze the multimedia and the personalized interest data for the plurality of visitors. At 2114, the method includes generating a plurality of generic visitor profiles and a corresponding plurality of selection or sequence of venue location recommendations. In embodiments, the management interface further provides a heat map showing paths of visitors through the non-profit venue. In embodiments, the heat map is further segmented according to the generic visitor profiles. In embodiments, the personalized interest data is collected from visits by visitors across multiple venues using a plurality of capture devices. In embodiments, the personalized interest data is collected using a mobile application. In embodiments, the personalized interest data is collected using a device selected from the group consisting of a wireless beacon, a camera, a biometric sensor, a sensor network, and combinations thereof. In embodiments, the personalized interest data is collected by tracking a visitor interaction with a venue display. In embodiments, the personalized interest data is collected by use by a visitor of a venue guide device, such as provided by a host of a venue. In embodiments, the machine learning system assembles a sequence or selection based at least in part on a personal route taken by the visitor through one or more site plans. In embodiments, the machine learning system assembles a sequence or selection based in part on a selection made by the visitor at a venue location. In embodiments, the multimedia assets are interactive. In embodiments, an interactive multimedia asset is assigned to use an audio, visual, tactile, or movement capture device associated with a location in the venue. In embodiments, the management interface further provides an interface for creating an interactive campaign, wherein information about the interactive campaign is displayed at a plurality of locations or sites, wherein the information about the interactive campaign is displayed simultaneously at the plurality of locations or sites, and wherein visitors at the plurality of locations have access to real-time interaction or real-time communication with each other. In embodiments, a mode of the real-time communication is selected from the group consisting of audio conferencing, video conferencing, virtual reality conferencing, collaborative text chat, holographic conferencing, and combinations thereof. In embodiments, the locations in the site plans are associated with a wireless beacon.

Figure 22:
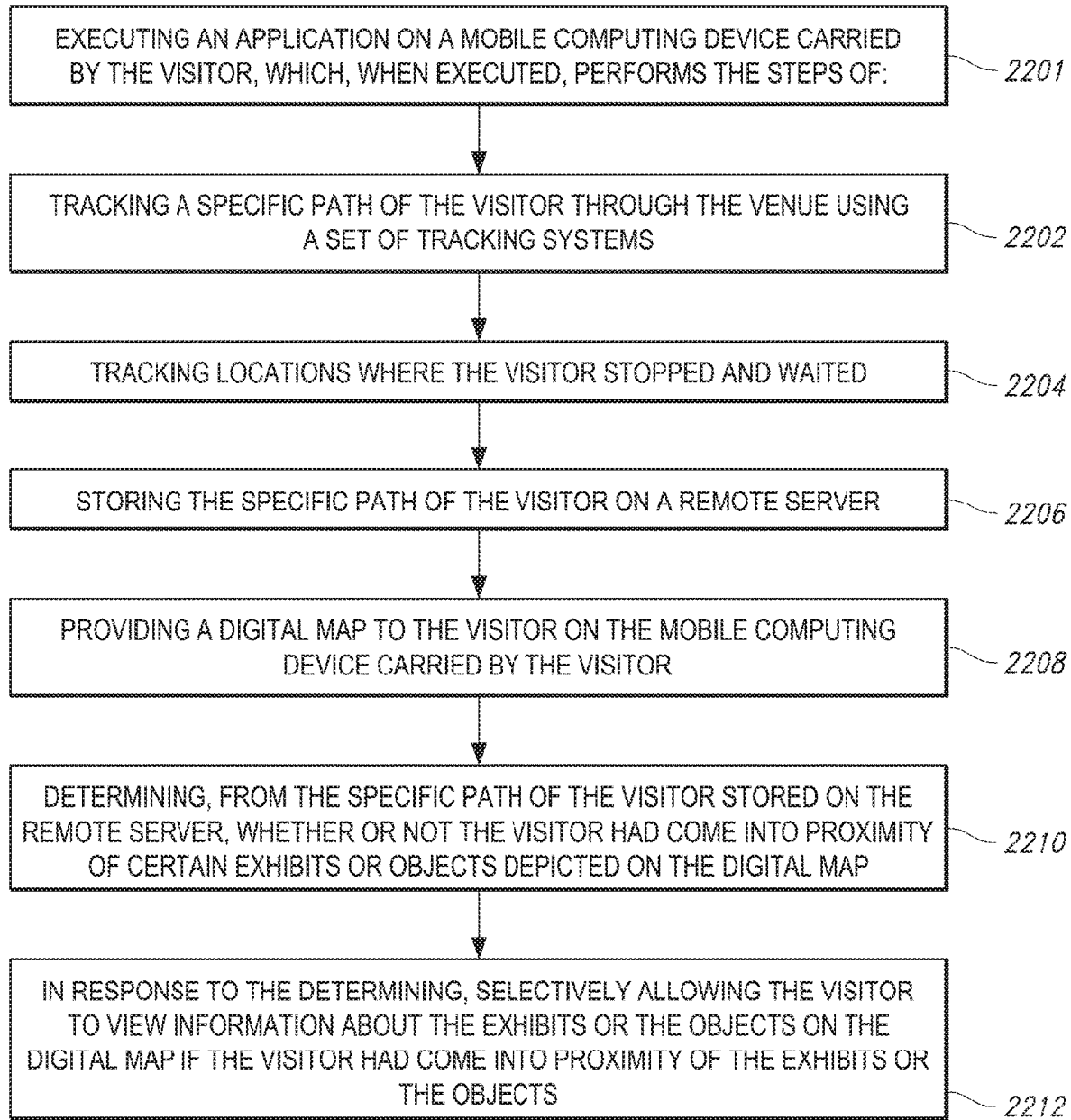
FIG. 22 is a diagrammatic view that depicts methods and systems for providing supplemental media to a visitor at a museum, zoo or other non-profit venue in accordance with embodiments disclosed herein.

FIG. 22 illustrates methods and systems for providing supplemental media to a visitor at a museum, zoo or other non-profit venue in accordance with embodiments disclosed herein. As depicted at 2201, the method includes "executing an application on a mobile computing device carried by the visitor, which, when executed, performs the steps of:" At 2202, the method includes tracking a specific path of the visitor through the venue using a set of tracking systems. At 2204, the method includes tracking locations where the visitor stopped and waited. At 2206, the method includes storing the specific path of the visitor on a remote server. At 2208, the method includes providing a digital map to the visitor on the mobile computing device carried by the visitor. At 2210, the method includes determining, from the specific path of the visitor stored on the remote server, whether or not the visitor had come into proximity of certain exhibits or objects depicted on the digital map. At 2212, the method includes, in response to the determining, selectively allowing the visitor to view information about the exhibits or the objects on the digital map if the visitor had come into proximity of the exhibits or the objects. In embodiments, the information is selected from the group consisting of high-resolution imagery, video, captioning, textual data, live video feed, donation information, and combinations thereof. In embodiments, the set of tracking systems includes a Radio Frequency (RF) beacon, an access point, an Indoor Positioning System (IPS), a Global Positioning System (GPS), a local proximity detection system, a Quick Response (QR) code scanning system, or an image recognition system. In embodiments, the local proximity detection system includes at least one of a Near-Field Communication (NFC) system, a Wi-Fi system, an RF system, a cellular system, an IoT system, and a Bluetooth system. In embodiments, the method further includes selectively preventing the visitor from viewing the information about the exhibits or the objects on the digital map if the visitor had not come into proximity of the exhibits or the objects.

Figure 23:
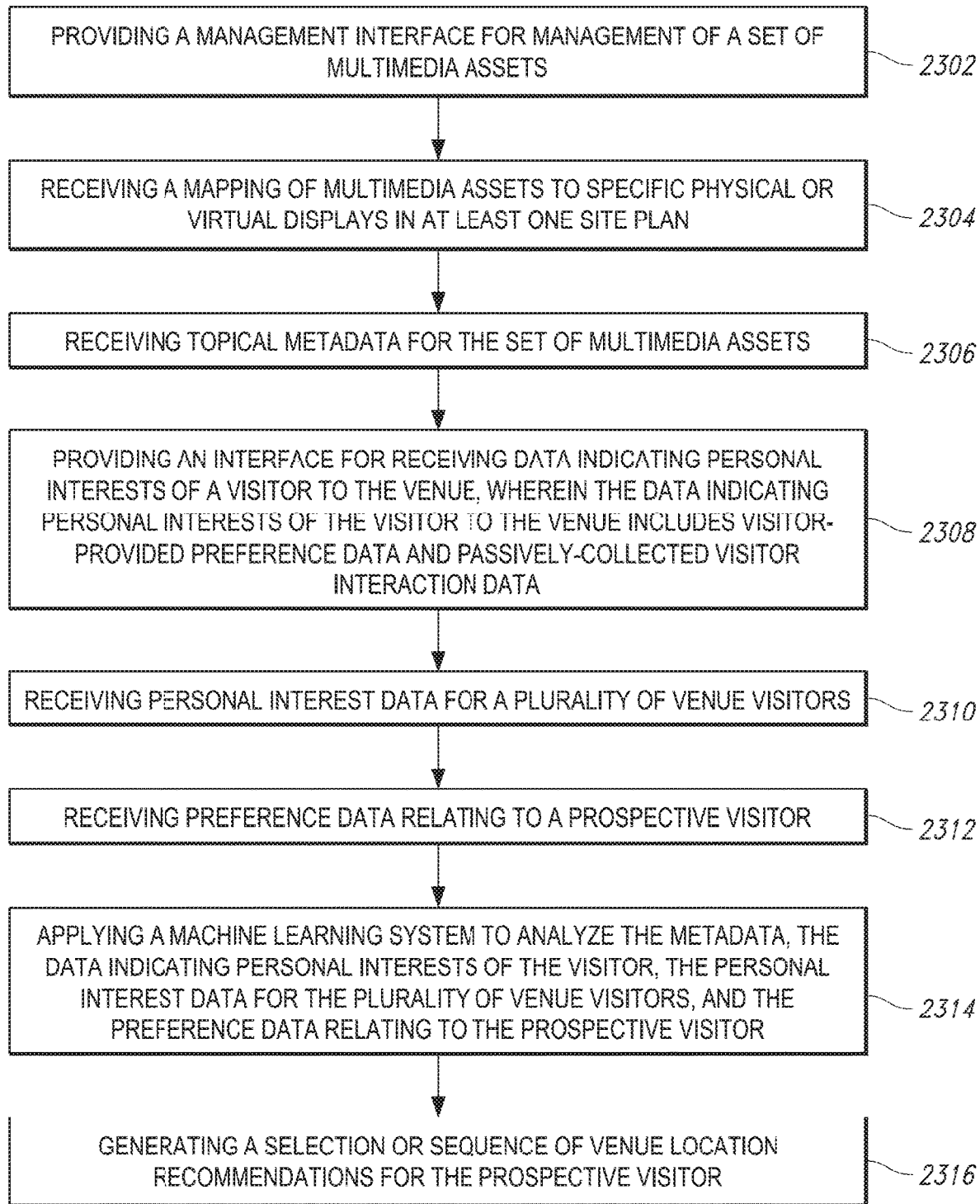
FIG. 23 illustrates methods and systems for providing personalized venue visit recommendations to a visitor at a museum, a zoo or other non-profit venue in accordance with embodiments disclosed herein.

FIG. 23 illustrates methods and systems for providing personalized venue visit recommendations to a visitor at a museum, a zoo or other non-profit venue in accordance with embodiments disclosed herein. At 2302, the method includes providing a management interface for management of a set of multimedia assets. At 2304, the method includes receiving a mapping of multimedia assets to specific physical or virtual displays in at least one site plan. At 2306, the method includes receiving topical metadata for the set of multimedia assets. At 2308, the method includes providing an interface for receiving data indicating personal interests of a visitor to the venue, wherein the data indicating personal interests of the visitor to the venue includes visitor-provided preference data and passively-collected visitor interaction data. At 2310, the method includes receiving personal interest data for a plurality of venue visitors. At 2312, the method includes receiving preference data relating to a prospective visitor. At 2314, the method includes applying a machine learning system to analyze the metadata, the data indicating personal interests of the visitor, the personal interest data for the plurality of venue visitors, and the preference data relating to the prospective visitor. At 2316, the method includes generating a selection or sequence of venue location recommendations for the prospective visitor. In embodiments, the machine learning system assembles a sequence or selection based at least in part on visitor selections made at the venue. In embodiments, the machine learning system generates recommendations based at least in part on a donation history of the prospective visitor. In embodiments, the machine learning system generates recommendations based at least in part on a donation history of visitors with similar interests to the prospective visitor. In embodiments, the management interface further provides an interface for creating an interactive campaign, wherein information about the interactive campaign is displayed at multiple locations or sites, wherein the information about the interactive campaign is displayed simultaneously at the multiple locations or sites, and wherein a visitor at one of the multiple locations or sites can interact or communicate with at least one other visitor at at least one other location or site in real time. In embodiments, the real-time communication is selected from the group consisting of audio conferencing, video conferencing, virtual reality conferencing, collaborative text chat, holographic conferencing, and combinations thereof. In embodiments, the venue locations are associated with corresponding wireless beacons.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another.

The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various portions of methods identified and described above may be varied and that the any one method or portions thereof may be adapted to particular applications of the techniques disclosed herein. All such variations and modifications are intended to fall within the scope of this disclosure. As such, the depiction and/or description of an order for various portions of methods should not be understood to require a particular order of execution, unless required by a particular application, or explicitly stated or otherwise clear from the context.

The methods and/or processes described above, and portions associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the portions of methods thereof. In another aspect, the methods may be embodied in systems that perform the portions of the methods thereof and may be distributed across devices in a number of ways, or all of the functionality may be integrated into a dedicated, standalone device or other hardware. In another aspect, the means for performing the portions of the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims, unless a different meaning is expressly provided or otherwise clear from the context. For example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

While the disclosure has been disclosed in connection with the many embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. The term "set" is to be construed as a group having one or more members. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. All documents referenced herein are hereby incorporated by reference.

What is claimed is:

1. A method for providing personalized non-profit venue visit recommendations to a visitor at a non-profit venue, comprising:
    providing a management interface for management of a set of multimedia assets;
    receiving a mapping of multimedia assets to a display in at least one site plan;
    receiving metadata for the set of multimedia assets;
    providing an interface for receiving data indicating personal interests of a visitor to a non-profit venue, wherein the data indicating personal interests of the visitor to the non-profit venue includes visitor-provided preference data and passively-collected visitor interaction data;
    receiving personal interest data for a plurality of non-profit venue visitors;
    receiving preference data relating to a prospective visitor;
    applying a machine learning system to analyze the metadata, the data indicating personal interests of the visitor, the personal interest data for the plurality of non-profit venue visitors, and the preference data relating to the prospective visitor, wherein applying the machine learning system comprises generating a plurality of generic visitor profiles and a corresponding plurality of selection or sequence of non-profit venue location recommendations;
    generating a selection or sequence of non-profit venue location recommendations for the prospective visitor by identifying a particular generic visitor profile of the plurality of generic visitor profiles based on the preference data relating to the prospective visitor, wherein the particular generic visitor profile corresponds to a particular selection or sequence of non-profit venue location recommendations of the corresponding plurality of selection or sequence of non-profit venue location recommendations;
    analyzing one or more photographs taken by the visitor;
    matching a particular photograph of the one or more photographs taken by the visitor to high-resolution digital images of the non-profit venue to identify a location in the non-profit venue of an exhibit depicted in the particular photograph;
    automatically assembling a multimedia presentation containing content relating to the location in the non-profit venue, wherein automatically assembling the multimedia presentation comprises creating a composite high-resolution digital image having a corresponding set of characteristics to those of the particular photograph based on the personal interests of the visitor to accentuate characteristics that correspond to the personal interests of the visitor, wherein the multimedia presentation includes the composite high-resolution digital image accentuating characteristics that correspond to the personal interests of the visitor; and
    presenting the multimedia presentation to the visitor,
    wherein creating the composite high-resolution digital image comprises:
        masking the particular photograph based on differences between the high-resolution digital images of the non-profit venue and the particular photograph,
        compositing the particular photograph with a portion of high-resolution imagery within the high-resolution digital images, and
        creating archivable regions in the composite high-resolution digital image, wherein, when a user activates the archivable regions, additional information about the exhibit depicted in the particular photograph is retrieved.

2. The method of claim 1, wherein the machine learning system assembles a sequence or selection based at least in part on visitor selections made at the non-profit venue.

3. The method of claim 1, wherein the machine learning system generates recommendations based at least in part on a donation history of the prospective visitor and at least in part on a donation history of visitors with similar interests to the prospective visitor.

4. The method of claim 1, wherein the management interface further provides an interface for creating an interactive campaign, wherein information about the interactive campaign is displayed at multiple locations or sites, wherein the information about the interactive campaign is displayed simultaneously at the multiple locations or sites, and wherein a visitor at one of the multiple locations or sites can interact or communicate with at least one other visitor at least one other location or site in real time.

5. The method of claim 4, wherein the real-time communication is selected from a group consisting of audio conferencing, video conferencing, virtual reality conferencing, collaborative text chat, holographic conferencing, and combinations thereof.

6. The method of claim 1, wherein the non-profit venue locations are associated with corresponding wireless beacons.

7. A method for developing recommendations for a personalized non-profit venue visit at a non-profit venue, comprising:
    providing a management interface for management of a set of multimedia assets;
    receiving a mapping of multimedia assets to a display in at least one site plan;
    receiving metadata for the set of multimedia assets;
    providing an interface for receiving data indicating personal interests of a visitor to a non-profit venue, wherein the data indicating personal interests of the visitor to the non-profit venue includes a set of data selected from among visitor-provided preference data, passively-collected visitor interaction data, and visitor route data;
    receiving personal interest data for a plurality of non-profit venue visitors;
    receiving preference data relating to a prospective visitor;
    applying a machine learning system to analyze the metadata, the data indicating personal interests of the visitor, the personal interest data for the plurality of non-profit venue visitors, and the preference data relating to the prospective visitor, wherein applying the machine learning system comprises generating a plurality of generic visitor profiles and a corresponding plurality of selection or sequence of non-profit venue location recommendations;

generating a selection or sequence of non-profit venue location recommendations for the prospective visitor by identifying a particular generic visitor profile of the plurality of generic visitor profiles based on the preference data relating to the prospective visitor, wherein the particular generic visitor profile corresponds to a particular selection or sequence of non-profit venue location recommendations of the corresponding plurality of selection or sequence of non-profit venue location recommendations;

analyzing one or more photographs taken by the visitor;

matching a particular photograph of the one or more photographs taken by the visitor to high-resolution digital images of the non-profit venue to identify a location in the non-profit venue of an exhibit depicted in the particular photograph;

automatically assembling a multimedia presentation containing content relating to the location in the non-profit venue, wherein automatically assembling the multimedia presentation comprises creating a composite high-resolution digital image having a corresponding set of characteristics to those of the particular photograph based on the personal interests of the visitor to accentuate characteristics that correspond to the personal interests of the visitor, wherein the multimedia presentation includes the composite high-resolution digital image accentuating characteristics that correspond to the personal interests of the visitor; and presenting the multimedia presentation to the visitor, wherein creating the composite high-resolution digital image comprises:

masking the particular photograph based on differences between the high-resolution digital images of the non-profit venue and the particular photograph, compositing the particular photograph with a portion of high-resolution imagery within the high-resolution digital images, and creating archivable regions in the composite high-resolution digital image, wherein, when a user activates the archivable regions, additional information about the exhibit depicted in the particular photograph is retrieved.

8. The method of claim 7, wherein the personal interest data is collected from visitor visits across a plurality of non-profit venues.

9. The method of claim 7, wherein the preference data relating to the prospective visitor is collected for multiple non-profit venues and wherein the preference data relating to the prospective visitor is collected at a non-profit venue.

10. The method of claim 7, wherein the preference data relating to the prospective visitor is derived from information collected on the prospective visitor based on a prior visit by the prospective visitor to a non-profit venue and wherein the preference data relating to the prospective visitor is derived from information collected on the prospective visitor based on the route data of the prospective visitor through a non-profit venue during a previous visit to the non-profit venue.

11. The method of claim 7, wherein the preference data for the prospective visitor is collected using a mobile application.

12. The method of claim 7, wherein the preference data for the prospective visitor is collected based on indications of interest.

13. The method of claim 12, wherein the indications of interest are collected through gaze analysis.

14. The method of claim 12, wherein the indications of interest are collected through visual analysis via a plurality of cameras.

15. The method of claim 12, wherein the indications of interest are provided by the prospective visitor.

16. The method of claim 7, wherein the preference data for the prospective visitor is generated from visitor information collected from a visitor unrelated to the non-profit venue.

17. The method of claim 7, wherein the visitor route data is collected using a mobile application.

18. The method of claim 7, wherein the visitor route data is collected using wireless beacons and wherein the visitor route data is collected using a sensor network.

19. The method of claim 7, wherein the visitor route data is collected using cameras and wherein the visitor route data is collected using biometric sensors.

20. The method of claim 7, wherein the visitor route data is collected by tracking visitor interaction with non-profit venue displays and wherein the visitor route data is collected by tracking visitor use of a non-profit venue guide device.

* * * * *